US012701162B2

(12) United States Patent
Andrews

(10) Patent No.: US 12,701,162 B2
(45) Date of Patent: Aug. 4, 2026

(54) COMPUTING SYSTEMS AND METHODS FOR MANAGING AND MONITORING MESH-BASED COMMUNICATION SYSTEMS

(71) Applicant: WeLink Communications, Inc., Lehi, UT (US)

(72) Inventor: Clinton Andrews, Norcross, GA (US)

(73) Assignee: WeLink Communications, Inc., Lehi, UT (US)

( * ) Notice: Subject to any disclaimer, the term of this patent is extended or adjusted under 35 U.S.C. 154(b) by 309 days.

(21) Appl. No.: 18/333,367

(22) Filed: Jun. 12, 2023

(65) Prior Publication Data

US 2023/0344906 A1      Oct. 26, 2023

Related U.S. Application Data

(63) Continuation of application No. PCT/US2023/019311, filed on Apr. 20, 2023.

(60) Provisional application No. 63/333,097, filed on Apr. 20, 2022.

(51) Int. Cl.
| | |
|---|---|
| *H04W 24/00* | (2009.01) |
| *H04L 67/12* | (2022.01) |
| *H04W 84/18* | (2009.01) |
| *H04W 88/08* | (2009.01) |
| *H04W 40/24* | (2009.01) |

(52) U.S. Cl.
CPC ............. *H04L 67/12* (2013.01); *H04W 24/00* (2013.01); *H04W 84/18* (2013.01); *H04W 88/08* (2013.01); *H04W 40/24* (2013.01)

(58) Field of Classification Search
None
See application file for complete search history.

(56) References Cited

U.S. PATENT DOCUMENTS

| | | | |
|---|---|---|---|
| 7,508,787 | B2 | 3/2009 | Doshi et al. |
| 8,385,921 | B1 | 2/2013 | Shousterman et al. |
| 8,406,126 | B1 | 3/2013 | Leiba et al. |

(Continued)

FOREIGN PATENT DOCUMENTS

| | | |
|---|---|---|
| CN | 115696503 A | 2/2023 |
| WO | 2018083548 A1 | 5/2018 |

OTHER PUBLICATIONS

Non-Final Office Action mailed on Jul. 1, 2025, issued in connection with U.S. Appl. No. 18/304,300, filed Apr. 20, 2023, 19 pages.

(Continued)

*Primary Examiner* — Jason D Cardone

(74) *Attorney, Agent, or Firm* — Lee Sullivan Shea & Smith LLP

(57) ABSTRACT

Systems and methods for monitoring and managing mesh-based communication systems include providing an interactive network map of a mesh-based communication system and wireless communication nodes of the mesh-based communication system, facilitating selection of and actioning for one or more of the wireless communication nodes, generating, managing, and visualizing alerts related to operation and performance of the mesh-based communication system, and evaluating operational performance of wireless communication nodes of the mesh-based communication system in order to identify points of failure and determine remedial action.

20 Claims, 33 Drawing Sheets

(56) References Cited

U.S. PATENT DOCUMENTS

| | | | |
|---|---|---|---|
| 8,448,015 | B2 | 5/2013 | Gerhart |
| 8,522,167 | B2 | 8/2013 | Zhang et al. |
| 9,425,985 | B1 | 8/2016 | Shousterman et al. |
| 9,538,331 | B2 | 1/2017 | Ross |
| 9,621,465 | B2 | 4/2017 | Ross |
| 9,860,179 | B2 | 1/2018 | Ross |
| 9,942,776 | B2 | 4/2018 | Ross et al. |
| 9,973,939 | B2 | 5/2018 | Ross |
| 10,027,508 | B2 | 7/2018 | Leiba et al. |
| D856,962 | S | 8/2019 | Hart et al. |
| 10,530,851 | B1 | 1/2020 | Hart |
| 10,530,882 | B2 | 1/2020 | Ross |
| 11,368,537 | B2 * | 6/2022 | DaCosta ............. H04W 40/248 |
| 11,606,260 | B1 * | 3/2023 | Chibon ............... H04L 41/5009 |
| 12,373,497 | B1 * | 7/2025 | Fletcher ............. G06F 9/45533 |
| 2006/0026509 | A1 | 2/2006 | Porter |
| 2007/0013548 | A1 * | 1/2007 | Sendrowicz ......... G08B 25/009 |
| | | | 340/870.02 |
| 2007/0280165 | A1 * | 12/2007 | Doshi ................... H04W 24/00 |
| | | | 370/331 |
| 2011/0188452 | A1 * | 8/2011 | Borleske ............... H04W 40/04 |
| | | | 370/328 |
| 2013/0163407 | A1 | 6/2013 | Sinha et al. |
| 2014/0057570 | A1 | 2/2014 | Leiba |
| 2015/0358082 | A1 | 12/2015 | Ross |
| 2016/0191357 | A1 * | 6/2016 | Orner .................... H04W 24/02 |
| | | | 370/328 |
| 2017/0013547 | A1 * | 1/2017 | Skaaksrud ........... H04B 17/318 |
| 2018/0331935 | A1 | 11/2018 | Ross et al. |
| 2018/0343200 | A1 | 11/2018 | Jana et al. |
| 2018/0343685 | A1 | 11/2018 | Hart et al. |
| 2020/0204457 | A1 * | 6/2020 | Hu .......................... H04L 41/12 |
| 2021/0014770 | A1 * | 1/2021 | Qi ........................... H04L 45/48 |
| 2023/0262494 | A1 * | 8/2023 | Dai .................... H04W 64/006 |
| | | | 370/252 |
| 2023/0345277 | A1 * | 10/2023 | Barrand ................ H04W 24/08 |
| 2025/0212020 | A1 * | 6/2025 | Foxworthy .......... H04W 60/00 |

OTHER PUBLICATIONS

Oracle Corporation, Oracle Enterprise Manager Concepts, 11g Release 11.1.0.1, May 31, 2011, 262 pages. [retrieved on Jun. 19, 2018], Retrieved from the Internet: URL: <https://docs.oracle.com/cd/E11857_01/em.111/e11982.pdf>.

European Patent Office, European Extended Search Report mailed on Mar. 10, 2026, issued in connection with European Application No. 23792553.2, 10 pages.

* cited by examiner

430

404

403

470

404

500

510

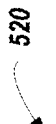
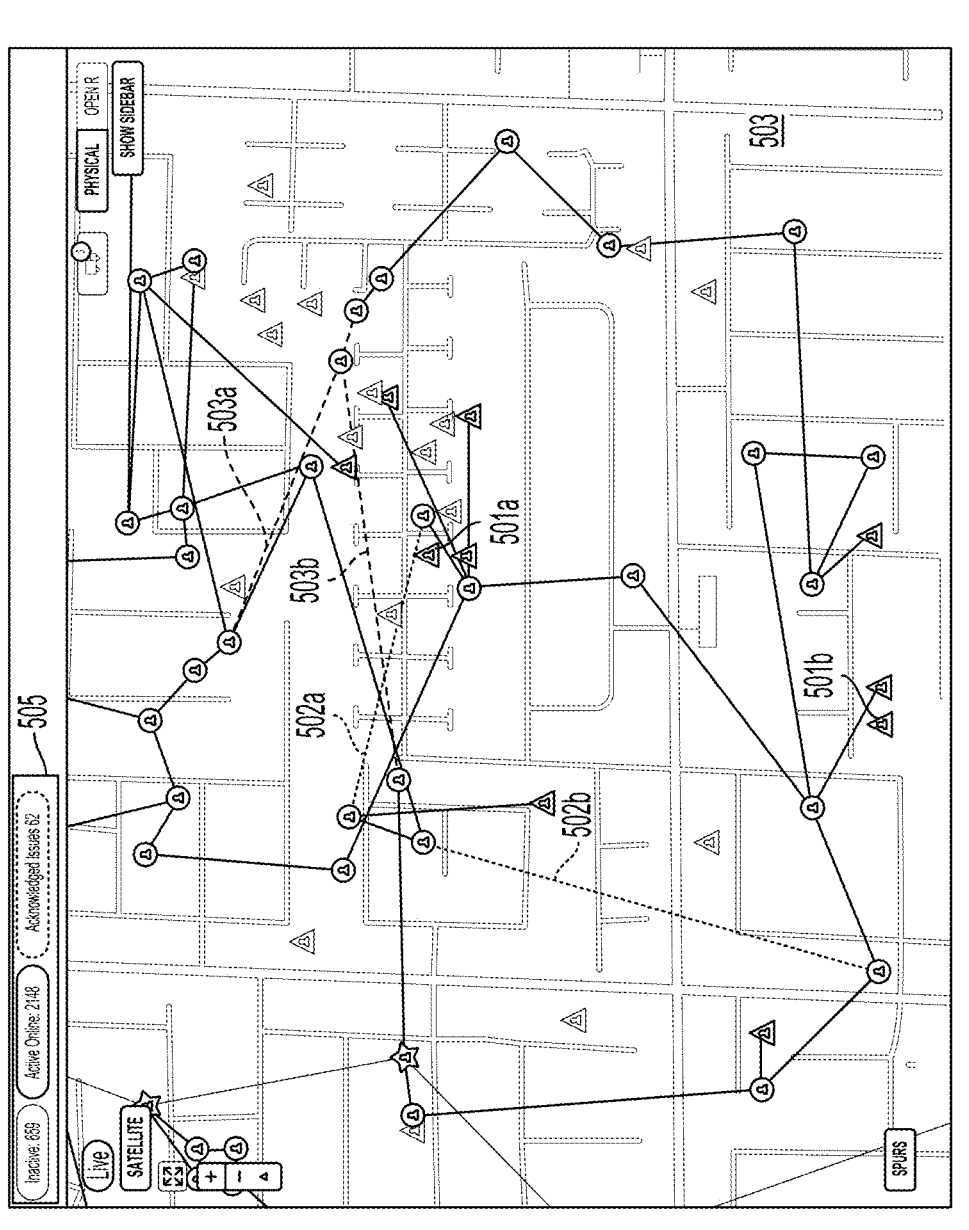
FIG. 5C

530

540

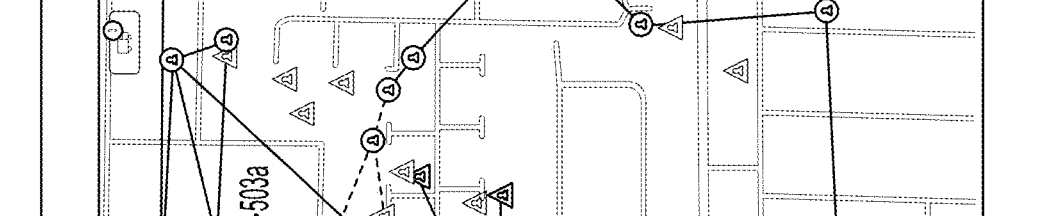

Inactive: 659 | Active Online: 2148 | Acknowledged Issues 62 — 505

Live

PHYSICAL | OPEN:R

SHOW SIDEBAR

503

503a

01a

507

60 Ghz Wireless Link

Status: Connected
Connected since: 8 minutes ago
Distance: ~230m (104° ESE)

SSID: 12345
Channel: 1
Channel size: 2160 Mhz

○ radio2

CUB-MD01   A1:23:00:96:6J:B3     456 Main Street
Las Vegas, NV 89123

INFO | RX | TX

Mode: master
MBU port: eth3
Uptime: an hour
Status Updated: 4
minutes ago

RSSI: -56 dBm
Target RSSI: -43 dBm
MCS rate: MCS 6
Throughput: 4.612
Mb/s

Power: 0 dB
Throughput: 143.8
kb/s

MCS Rate Warning: This value should be MCS 7 or higher

Link Reconnecting Frequently

○ radio2

CUB-MD01   A1:23:00:96:6J:B4     789 Main Street
Las Vegas, NV 89123

INFO | RX | TX

Mode: ptp-slave
MBU port: eth2
Uptime: an hour
Status Updated: 3
minutes ago

RSSI: -60 dBm
Target RSSI: -43 dBm
MCS rate: MCS8
Throughput: 130.6
kb/s

Power: 0 dB
Throughput: 3.917
Mb/s

Link Reconnecting Frequently

Alerts ⇧

 Active Alerst Only

Active Alerts ↻

| Created At ↓ | Severity ↓ | Type ↓ | Area ↓ | Customer ↓ | Site / Link ↓ |
|---|---|---|---|---|---|
| March 17, 2022 8:10:36 AM MDT | ◉ Critical | Physical Link Down | LVG1.LVG2.R01_A004 | Aaron Aaronson 123 Apple Road | ⇄ Site_Id_1 Site_Id_2 |
| March 17, 2022 8:10:36 AM MDT | ◉ Critical | Physical Link Down | LVG1.LVG2.R01_A004 | Boris Black 123 Banana Lane | ⇄ Site_Id_3 Site_Id_4 |
| March 17, 2022 8:10:36 AM MDT | ◉ Critical | Physical Link Down | LVG1.LVG2.R01_A004 | Charles Cobb 123 Corn Court | ⇄ Site_Id_5 Site_Id_6 |
| March 17, 2022 8:10:36 AM MDT | ◉ Critical | Device Offline | LVG1.LVG2.R01_A004 | David Door 123 Delta Avenue | Site_Id_7 Radio_ID_10 |
| March 17, 2022 8:10:36 AM MDT | ◉ Critical | Device Offline | LVG1.LVG2.R01_A004 | David Door 123 Delta Avenue | Site_Id_7 Radio_ID_10 |
| March 17, 2022 8:10:36 AM MDT | ◉ Critical | Device Offline | LVG1.LVG2.R01_A004 | David Door 123 Delta Avenue | Site_Id_7 Radio_ID_10 |
| March 17, 2022 8:10:11 AM MDT | ○ Warning | RSSI Warning | LVG1.HEN1.R05_A018 | Boris Black 123 Banana Lane | ⇄ Site_Id_3 Site_Id_4 View details |
| March 17, 2022 8:09:35 AM MDT | ○ Warning | Open/R Link Down | LVG1.HEN2.R02_A008 | Elaine Eagle 123 Echo Street | ⇄ Site_Id_8 Site_Id_9 |
| March 17, 2022 8:09:35 AM MDT | ○ Warning | Open/R Link Down | LVG1.HEN2.R02_A008 | Aaron Aaronson 123 Apple Road | ⇄ Site_Id_1 Site_Id_2 |

FIG. 5G

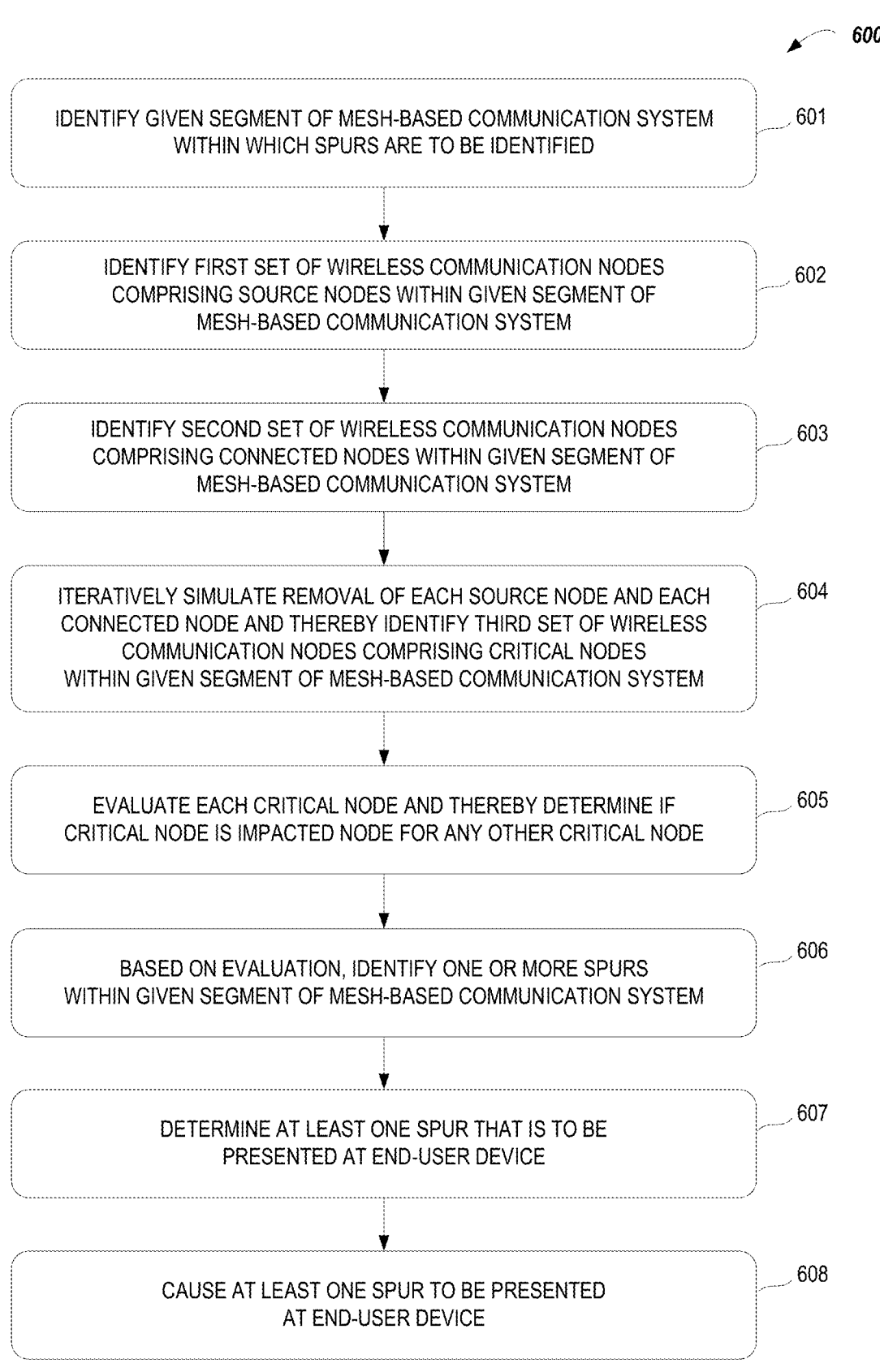

*600*

IDENTIFY GIVEN SEGMENT OF MESH-BASED COMMUNICATION SYSTEM
WITHIN WHICH SPURS ARE TO BE IDENTIFIED — 601

IDENTIFY FIRST SET OF WIRELESS COMMUNICATION NODES
COMPRISING SOURCE NODES WITHIN GIVEN SEGMENT OF
MESH-BASED COMMUNICATION SYSTEM — 602

IDENTIFY SECOND SET OF WIRELESS COMMUNICATION NODES
COMPRISING CONNECTED NODES WITHIN GIVEN SEGMENT OF
MESH-BASED COMMUNICATION SYSTEM — 603

ITERATIVELY SIMULATE REMOVAL OF EACH SOURCE NODE AND EACH
CONNECTED NODE AND THEREBY IDENTIFY THIRD SET OF WIRELESS
COMMUNICATION NODES COMPRISING CRITICAL NODES
WITHIN GIVEN SEGMENT OF MESH-BASED COMMUNICATION SYSTEM — 604

EVALUATE EACH CRITICAL NODE AND THEREBY DETERMINE IF
CRITICAL NODE IS IMPACTED NODE FOR ANY OTHER CRITICAL NODE — 605

BASED ON EVALUATION, IDENTIFY ONE OR MORE SPURS
WITHIN GIVEN SEGMENT OF MESH-BASED COMMUNICATION SYSTEM — 606

DETERMINE AT LEAST ONE SPUR THAT IS TO BE
PRESENTED AT END-USER DEVICE — 607

CAUSE AT LEAST ONE SPUR TO BE PRESENTED
AT END-USER DEVICE — 608

PHYSICAL    OPEN R

SHOW SIDEBAR

Live
SATELLITE

Inactive 659    Active Online: 2148    Acknowledged Issues: 62

SPURS

COMPUTING SYSTEMS AND METHODS FOR MANAGING AND MONITORING MESH-BASED COMMUNICATION SYSTEMS

CROSS-REFERENCE TO RELATED APPLICATIONS

This application claims priority under 35 U.S.C. §§ 120 and 365(c) as a continuation of International Application No. PCT/US2023/019311 filed on Apr. 20, 2023, and titled "Computing Systems and Methods for Managing and Monitoring Mesh-Based Communication Systems," which claims priority to U.S. Provisional Application No. 63/333,097, filed on Apr. 20, 2022, and titled "Software Tools for Facilitating Management and Monitoring of Mesh-Based Communication Systems," the contents of each of which are incorporated by reference herein in their entirety.

BACKGROUND

In today's world, the demand for network-based services that are delivered to end users in a fast and reliable way continues to grow. This includes the demand for high-speed internet service that is capable of delivering upload and download speeds of several hundreds of Megabits per second (Mbps) or perhaps even 1 Gigabit per second (Gbps) or more.

OVERVIEW

Disclosed herein are example architectures for communication systems that are based on fixed wireless mesh networks and are configured to provide any of various types of services to end users, including but not limited to telecommunication services such as high-speed internet that has speeds of several Gigabits per second (Gbps) or more. At times, these communication systems are referred to herein as "mesh-based communication systems."

The task of managing a mesh-based communication system such as this presents a number of challenges. For example, a mesh-based communication system typically needs to be monitored and managed on a regular basis to ensure that each communication node in the mesh-based communication system is functioning as intended, and when the mesh-based communication system experiences any disruptions, that those disruptions are identified and mitigated as expediently as possible. However, given that a mesh-based communication system typically includes a large number of communication nodes (e.g., several hundreds or even thousands of nodes), monitoring each node, identifying disruptions, and coordinating mitigation can be time consuming and labor intensive, which can result in prolonged network downtime and customer frustration.

Disclosed herein are various software tools that help to facilitate the task of managing a mesh-based communication system. In accordance with the present disclosure, the software tools for managing a mesh-based communication system may include any of (i) a first software tool for selectively taking action on communication nodes within a mesh-based communication system, which may also be referred to herein as a "selective-actioning" tool, (ii) a second software tool for generating, managing, and visualizing alerts related to a mesh-based communication system, which may also be referred to herein as a "network alerts" tool, and (iii) a third software tool for identifying communication nodes representing single points of failure within a mesh-based communication system, which may also be referred to herein as a "spur finder" tool.

For instance, according to one aspect, disclosed herein is a method carried out by a computing platform that involves (i) receiving, from an end-user device associated with a user, a request to view spurs within a given segment of a mesh-based wireless communication system, wherein the given segment of the mesh-based wireless communication system comprises a given set of wireless communication nodes, (ii) after receiving the request to view spurs within the given segment of the mesh-based wireless communication system, analyzing the given set of wireless communication nodes and thereby identify one or more spurs within the given segment of the mesh-based wireless communication system, and (iii) causing the end-user device to display an interface comprising a respective visual representation of each identified spur.

In one example embodiment, each identified spur may comprise a parent node and at least one child node. Further, the respective visual representation of each identified spur may include indications of (i) a parent node of the spur, and (ii) one or more child nodes of the spur.

In another example embodiment, the request to view the spurs within the given segment of the mesh-based wireless communication system may comprise a request to filter the given set of wireless communication nodes to include only wireless communication nodes that are associated with active customers of a service provided by the mesh-based wireless communication system. In yet another example embodiment, the request to view the spurs within the given segment of the mesh-based wireless communication system may comprise a request to filter out, from the given set of wireless communication nodes, any wireless communication nodes for which a service provided by the mesh-based wireless communication system has been canceled. Further, in another example embodiment, the request to view the spurs within the given segment of the mesh-based wireless communication system may comprise a request to view spurs having a given minimum size.

Further yet, in some example embodiments, the interface may comprise an interactive network map of the given segment of the mesh-based communication system, and displaying the respective visual representation of each identified spur may comprise causing the end-user device to update the interactive network map to show the respective visual representation of each identified spur.

In some example embodiments, the method may further comprise (i) receiving, from the end-user device, an indication of a selection of a given node within a spur, (ii) obtaining a set of information for the given node, and (iii) causing the end-user device to update the interface to include the set of information for the given node.

Further, in example embodiments, analyzing the given set of wireless communication nodes and thereby identifying the one or more spurs may comprise (i) from the given set of wireless communication nodes, identifying a first subset of wireless communication nodes comprising any wireless communication node that is connected to at least one source wireless communication node of the mesh-based communication system, (ii) from the first subset of nodes, identifying a second subset of wireless communication nodes comprising any wireless communication node that (a) serves as a critical node for at least one other impacted node but (b) is not an impacted node for any other critical node, and (iii) identifying a respective spur corresponding to each wireless communication node in the second subset.

According to another aspect, disclosed herein is a computing platform that includes a network interface, at least one processor, a non-transitory computer-readable medium, and program instructions stored on the non-transitory computer-readable medium that are executable by the at least one processor to cause the computing platform to carry out one or more of the functions disclosed herein, including but not limited to the functions of the foregoing methods.

In yet another aspect, disclosed herein is non-transitory computer-readable storage medium that is provisioned with program instructions that, when executed by at least one processor, cause a computing platform to carry out one or more of the functions disclosed herein, including but not limited to the functions of the foregoing methods.

The foregoing has outlined rather broadly the features and technical advantages of examples according to this disclosure so that the following detailed description may be better understood. Additional features and advantages will be described below. It should be understood that the specific examples disclosed herein may be readily utilized as a basis for modifying or designing other structures for carrying out the same operations disclosed herein. Characteristics of the concepts disclosed herein including their organization and method of operation together with associated advantages will be better understood from the following description when considered in connection with the accompanying figures. It should be understood that the figures are provided for the purpose of illustration and description only.

One of ordinary skill in the art will appreciate these as well as numerous other aspects in reading the following disclosure.

BRIEF DESCRIPTION OF THE DRAWINGS

A further understanding of the nature and advantages the present disclosure may be realized by reference to the following drawings.

FIG. 5A through 5G depict example GUI views that may be displayed at an end-user device to facilitate user interaction with a second software tool for managing and monitoring aspects of a mesh-based communication system in accordance with aspects of the disclosed technology.

FIG. 6 depicts a flow chart of an example process for identifying spurs within a segment of a mesh-based communication system according to one embodiment of the disclosed technology.

Figure 1A:
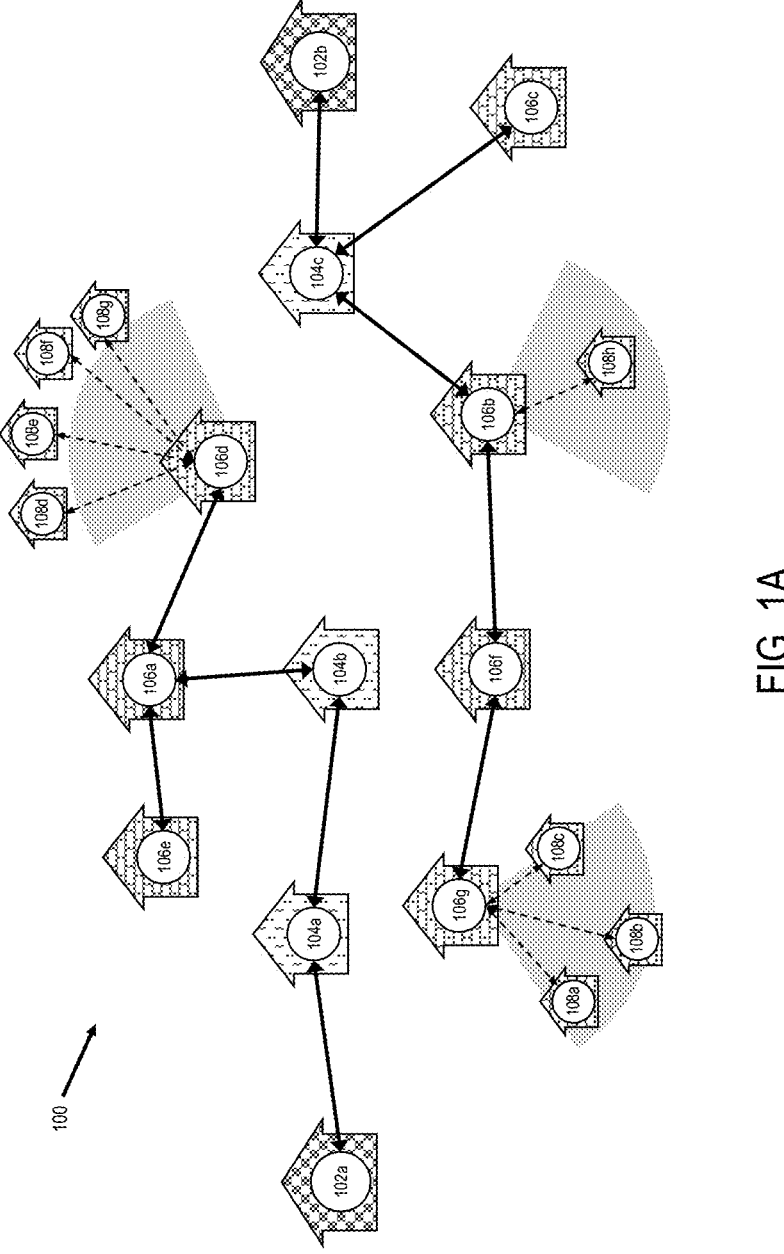
FIG. 1A depicts a simplified illustrative diagram of an example portion of an example mesh-based communication system that may be designed, implemented, and managed in accordance with aspects of the disclosed technology.

Features, aspects, and advantages of the presently disclosed technology may be better understood with regard to the following description, appended claims, and accompanying drawings, as listed below. The drawings are for the purpose of illustrating example embodiments, but those of ordinary skill in the art will understand that the technology disclosed herein is not limited to the arrangements and/or instrumentality shown in the drawings.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

I. Mesh-Based Communication System Architectures

Disclosed herein are example architectures for communication systems that are based on fixed wireless mesh networks and are configured to provide any of various types of services to end users, including but not limited to telecommunication services such as high-speed internet that has speeds of several Gigabits per second (Gbps) or more. At times, these communication systems are referred to herein as "mesh-based communication systems."

In accordance with the example architectures disclosed herein, a mesh-based communication system may comprise a plurality of wireless communication nodes that are interconnected together via bi-directional point-to-point (ptp) and/or point-to-multipoint (ptmp) wireless links in order to form a wireless mesh network, where each such wireless communication node comprises respective equipment for operating as part of the wireless mesh network (e.g., equipment for establishing and communicating over one or more bi-directional ptp and/or ptmp wireless links) that has been installed at a respective infrastructure site. Further, in at least some embodiments, the plurality of wireless communication nodes may comprise multiple different "tiers" of wireless communication nodes, where the wireless communication nodes in the different "tiers" serve different roles within the wireless mesh network, such as by performing different functionality within the wireless mesh network and/or establishing and communicating over different types of ptp and/or ptmp wireless links within the wireless mesh network, and may thus be installed with different kinds of equipment for operating as part of the wireless mesh network (e.g., different hardware and/or software).

For instance, in such a mesh-based communication system, the wireless mesh network may include (i) a first tier of wireless communication nodes (which may be referred to herein as "first-tier nodes") that are each installed at a respective infrastructure site that serves as a Point of Presence ("PoP") (or sometimes referred to as an access point) that has high-capacity access to a core network, (ii) a second tier of wireless communication nodes (which may be referred to herein as "second-tier nodes") that are each installed at a respective infrastructure site and primarily serve to extend the high-capacity access to the core network from the first-tier nodes to other geographic locations by forming a high-capacity pathway (e.g., in the range of 10 Gbps) for routing aggregated network traffic that originated from or is destined to the core network, (iii) a third tier of wireless communication nodes (which may be referred to herein as "third-tier nodes") that are each installed at a respective infrastructure site and primarily serve to form discrete sub-meshes extending from second-tier nodes that are to route aggregated network traffic to and from endpoints within a particular geographic area, and (iv) a fourth tier of wireless communication nodes (which may be referred to herein as "fourth-tier nodes") that are each installed at a respective infrastructure site and primarily serve to extend the discrete sub-meshes formed by the second-tier and third-tier nodes to other endpoints by exchanging individual (i.e., endpoint-specific) network traffic to and from the third-tier nodes.

However, it should be understood that the tiers of wireless communication nodes could take various other forms as well, including but not limited to the possibility that a mesh-based communication system may have not have all four of the tiers described above and/or that a mesh-based communication system may have one or more other tiers of wireless communication nodes that serve other roles within the wireless mesh network. Further, it should be understood that each tier of wireless communication nodes could include any number of wireless communication nodes, including but not limited to the possibility that in some implementations, one of more of the tiers could include as little as a single wireless communication node (e.g., a wireless mesh network deployed in a sparsely-populated area), while in other implementations, one of more of the tiers could include many thousands of nodes (e.g., a wireless mesh network deployed in a densely-populated area or a wireless mesh network that spans a large geographic area).

The wireless communication nodes in each of the foregoing tiers will now be described in further detail.

Beginning with the mesh-based communication system's first tier of wireless communication nodes, in line with the discussion above, each first-tier node is installed at an infrastructure site equipped to serve as a PoP that provides high-capacity access to a core network, and may also be directly connected downstream to one or more other wireless communication nodes in another tier of the wireless mesh network via one or more bi-directional ptp or ptmp wireless links. In this respect, each first-tier node may function to (i) exchange bi-directional network traffic with the core network via a high-capacity fiber connection (e.g., dark or lit fiber) between the infrastructure site and the core network, such as a fiber link having a capacity in the range of tens or even hundreds of Gbps, and (ii) exchange bi-directional network traffic with one or more other wireless communication node in another tier of the wireless mesh network via one or more ptp or ptmp wireless links, such as one or more second-tier node that serve to extend the first-tier node's high-capacity access the core network to other geographic locations. Further, in at least some implementations, a first-tier node may function to deliver the service being provided by the mesh-based communication system (e.g., a high-speed internet service) to the first-tier node's infrastructure site, such that individuals present at the first-tier node's infrastructure site can utilize that service. A first-tier node may perform other functions as well.

The infrastructure site at which each first-tier node is installed may take any of various forms. For instance, as one possibility, a first-tier node's infrastructure site could be a commercial building that has fiber connectivity to a core network and also provides a suitable location for installation of equipment for establishing and communicating over wireless links with other wireless communication nodes (e.g., a location that has sufficient line-of-sight (LOS) to other infrastructure sites), such as a particular section of the building's rooftop or a particular spot along the side of the building. In such an implementation, in addition to exchanging bi-directional network traffic with the core network and other nodes of the wireless mesh network, the first-tier node installed at the commercial building may also function to deliver the service being provided by the mesh-based communication system (e.g., a high-speed internet service) to the commercial building such that individuals in the commercial building can make use of that service. As another possibility, a first-tier node's infrastructure site could be a support structure such as a tower (e.g., a cell tower) or a pole that has fiber connectivity to a core network and provides a suitable location for installation of equipment for operating as part of the wireless mesh network. A first-tier node's infrastructure site could take some other form as well, including but not limited to the possibility that a first-tier node's infrastructure site could be a residential building to the extent that the residential building has fiber connectivity to a core network and provides a suitable location for installation of equipment for operating as part of the wireless mesh network.

The equipment for each first-tier node may also take any of various forms. To begin, a first-tier node's equipment may include wireless mesh equipment for establishing a wireless connection with one or more second-tier nodes. For instance, a first-tier node's wireless mesh equipment may be configured to establish and communicate over either (i) a respective bi-directional ptp wireless link with each of the one or more wireless communication nodes in another tier or (ii) a bi-directional ptmp wireless link (or perhaps multiple bi-directional ptmp wireless links) with the one or more wireless communication nodes in another tier. Other implementations of a first-tier node's wireless mesh equipment are possible as well, including but not limited to the possibility that a first-tier node's wireless mesh equipment may be configured to establish and communicate with the one or more wireless communication nodes in another tier over a combination of ptp and ptmp wireless links (e.g., a ptp wireless link with one particular node and a ptmp wireless link with one or more other nodes) and/or that a first-tier node's wireless mesh equipment may additionally be configured to interface and communicate with a core network via the PoP's high-capacity fiber connection. Additionally, a first-tier node's equipment may include networking equipment (e.g., one or more modems, routers, switches, or the like) that facilitates communication between the first-tier node's wireless mesh equipment and other devices or systems located at the first-tier node's infrastructure site, and perhaps also facilitates communication between the first-tier node's wireless mesh equipment and the core network via the PoP's high-capacity fiber connection (to the extent that the such communication is not handled directly by the wireless mesh equipment). Additionally yet, a first-tier node's equipment may include power equipment for supplying power to the wireless mesh equipment and/or the networking equipment, such as power and/or battery units. A first-tier node's equipment may take various other forms as well.

A first-tier node of the wireless mesh network may take various other forms as well.

Turning to the mesh-based communication system's second tier of wireless communication nodes, as noted above, each second-tier node is installed at a respective infrastructure site and primarily serves to extend the high-capacity access to the core network from the first-tier nodes to other geographic locations by forming a high-capacity pathway (e.g., in the range of 10 Gbps) for routing aggregated network traffic that originated from or is destined to the core network. In this respect, such a high-capacity pathway extending from a first-tier node could take various forms. As one possibility, a high-capacity pathway extending from a given first-tier node could be a single-hop pathway comprising a single high-capacity wireless link that is established between the given first-tier node and one given second-tier node. As another possibility, a high-capacity pathway extending from a given first-tier node could be a multi-hop pathway comprising a chain of multiple high-capacity wireless links (which may also referred to herein as a "spine") that includes a first high-capacity wireless link established between the given first-tier node and a first second-tier node as well as one or more additional high-capacity wireless links that are each established between a successive pair of second-tier nodes (e.g., a second high-capacity wireless link established between the first second-tier node and a second second-tier node, a third high-capacity wireless link established between the second second-tier node and a third second-tier node, and so on). Further, in some implementations, such a multi-hop pathway could be connected to one first-tier node a first end of the multi-hop pathway (e.g., via a first high-capacity wireless link between first-tier and second-tier nodes) and be connected to another first-tier node on a second end of the multi-hop pathway (e.g., via a first high-capacity wireless link between first-tier and second-tier nodes). Further yet, in some implementations, a given first-tier node's high-capacity access to the core network could be extended via multiple different high-capacity pathways formed by second-tier nodes, where each respective high-capacity pathway could either be a single-hop pathway or a multi-hop pathway.

Thus, depending on where a second-tier node is situated within such a pathway, the second-tier node could either be (i) directly connected to a first-tier node via a bi-directional ptp or ptmp wireless link but not directly connected to any other second-tier node (e.g., if the high-capacity pathway is a single-hop pathway), (ii) directly connected to a first-tier node via a first bi-directional ptp or ptmp wireless link and also directly connected to another second-tier node via a second bi-directional ptp or ptmp wireless link, or (iii) directly connected to two other second-tier nodes via respective bi-directional ptp or ptmp wireless links. And relatedly, depending on where a second-tier node is situated within such a pathway, the second-tier node may function to exchange bi-directional network traffic along the high-capacity pathway either (i) with a single other node (e.g., a single first-tier node or a single other second-tier node) or (ii) with each of two other nodes (e.g., one first-tier node and one other second-tier node or two other second-tier nodes).

Further, in addition to each second-tier node's role in forming the one or more high-capacity pathways that extend from the one or more first-tier nodes, each of at least a subset of the second-tier nodes may also be directly connected downstream to one or more third-tier nodes via one or more bi-directional ptp or ptmp wireless links, in which case each such second-tier node may additionally function to exchange bi-directional network traffic with one or more third-tier nodes as part of a discrete sub-mesh that is configured to route aggregated network traffic to and from endpoints within a particular geographic area.

Further yet, in at least some implementations, a second-tier node may function to deliver the service being provided by the mesh-based communication system (e.g., a high-speed internet service) to the second-tier node's infrastructure site, such that individuals present at the second-tier node's infrastructure site can utilize that service. In this way, a second-tier node can serve as both a "relay" for bi-directional network traffic and also as an "access point" for the service provided by the mesh-based communication system. A second-tier node may perform other functions as well.

The infrastructure sites at which the second-tier nodes are installed may take any of various forms, and in at least some implementations, a second-tier node's infrastructure site may comprise private property associated with a respective customer of the service being provided by the mesh-based communication system. For instance, as one possibility, a second-tier node's infrastructure site could be a residential building that is associated with a customer of the service being provided by the mesh-based communication system and provides a suitable location for installation of equipment for establishing and communicating over wireless links with other wireless communication nodes (e.g., a location that has sufficient LOS to other infrastructure sites), such as a particular section of the residential building's rooftop or a particular spot along the side of the residential building. For example, such a residential building could take the form of a detached single-family home, a townhouse, or a multi-dwelling unit (MDU) where a customer of the service being provided by the mesh-based communication system resides, among other examples. In such an implementation, in addition to exchanging bi-directional network traffic with other nodes of the wireless mesh network, the second-tier node installed at the residential building may also function to deliver the service being provided by the mesh-based communication system (e.g., a high-speed internet service) to the residential building such that the customer (and/or other individuals at the residential building) can make use of that service.

As another possibility, a second-tier node's infrastructure site could be a commercial building that is associated with a customer of the service being provided by the mesh-based communication system and provides a suitable location for establishing and communicating over wireless links with other wireless communication nodes (e.g., a location that has sufficient LOS to other infrastructure sites), such as a particular section of the commercial building's rooftop or a particular spot along the side of the commercial building. For example, such a commercial building could take the form of an office building where a customer of the service being provided by the mesh-based communication system owns or leases office space, among other examples. In such an implementation, in addition to exchanging bi-directional network traffic with other nodes of the wireless mesh network, the second-tier node installed at the commercial building may also function to deliver the service being provided by the mesh-based communication system (e.g., a high-speed internet service) to the commercial building such that the customer (and/or other individuals at the commercial building) can make use of that service.

A second-tier node's infrastructure site could take some other form as well, including but not limited to the possibility that a second-tier node's infrastructure site could be a support structure such as a tower or pole that is located on private property owned or occupied by a customer of the service being provided by the mesh-based communication system.

The equipment for each second-tier node may take any of various forms. To begin, a second-tier node's equipment may include wireless mesh equipment for establishing a wireless connection with one or more other nodes of the wireless mesh network, which may take various forms depending on where the second-tier node sits within the network arrangement. For instance, if a second-tier node is of a type that is to establish a wireless connection with a first-tier node as part of forming a high-capacity pathway to that first-tier node, the second-tier node's wireless mesh equipment may be configured to establish and communicate over either (i) a high-capacity bi-directional ptp wireless link with the first-tier node or (ii) a high-capacity bi-directional ptmp wireless link with the first-tier node, among other possibilities. Further, if a second-tier node is of a type that is to establish a wireless connection with either one or two peer second-tier nodes as part of forming a high-capacity pathway to a first-tier node, the second-tier node's wireless mesh equipment may be configured to establish and communicate over either (i) a respective bi-directional ptp wireless link with each peer second-tier node or (ii) a bi-directional ptmp wireless link (or perhaps multiple bi-directional ptmp wireless links) with the one or two peer second-tier nodes, among other possibilities. Further yet, if a second-tier node is of a type that is to establish a wireless connection with one or more third-tier nodes, the second-tier node's wireless mesh equipment may be configured to establish and communicate over either (i) a respective bi-directional ptp wireless link with each of the one or more third-tier nodes or (ii) a bi-directional ptmp wireless link (or perhaps multiple bi-directional ptmp wireless links) with the one or more third-tier nodes, among other possibilities. Other implementations of a second-tier node's wireless mesh equipment are possible as well. Additionally, a second-tier node's equipment may include networking equipment (e.g., one or more modems, routers, switches, or the like) that facilitates communication between the second-tier node's wireless mesh equipment and other devices or systems located at the second-tier node's infrastructure site. Additionally yet, a second-tier node's equipment may include power equipment for supplying power to the wireless mesh equipment and/or the networking equipment, such as power and/or battery units. A second-tier node's equipment may take various other forms as well.

A second-tier node of the wireless mesh network may take various other forms as well.

Turning next to mesh-based communication system's third tier of wireless communication nodes, as noted above, each third-tier node is installed at a respective infrastructure site and primarily serves to form a discrete sub-mesh that extends from at least one second-tier node and functions to route aggregated network traffic to and from endpoints within a particular geographic area. In this respect, each third-tier node may be directly connected to one or more other nodes within the second and/or third tiers via one or more bi-directional ptp or ptmp wireless links.

For instance, as one possibility, a third-tier node could be directly connected to (i) a second-tier node via a bi-directional ptp or ptmp wireless link as well as (ii) one or more peer third-tier nodes via one or more bi-directional ptp or ptmp wireless links, in which case the third-tier node may function to exchange bi-directional network traffic with the second-tier node and each of the one or more peer third-tier nodes as part of a discrete sub-mesh. As another possibility, a third-tier node could be directly connected to one or more peer third-tier nodes via one or more bi-directional ptp or ptmp wireless links, but not be directly connected to any second-tier node, in which case the third-tier node may function to exchange bi-directional network traffic with each of the one or more peer third-tier nodes as part of a discrete sub-mesh. As yet another possibility, a third-tier node could be directly connected to a second-tier node via a bi-directional ptp or ptmp wireless link, but not be directly connected to any peer third-tier node, in which case the third-tier node may function to exchange bi-directional network traffic with the second-tier node of a discrete sub-mesh. Other configurations are possible as well.

Further, each of at least a subset of the third-tier nodes may also be directly connected downstream to one or more fourth-tier nodes via one or more bi-directional ptp or ptmp wireless links, in which case each such third-tier node may additionally function to exchange individual network traffic to and from each of the one or more fourth-tier nodes.

Further yet, in at least some implementations, a third-tier node may function to deliver the service being provided by the mesh-based communication system (e.g., a high-speed internet service) to the third-tier node's infrastructure site, such that individuals present at the third-tier node's infrastructure site can utilize that service. In this way, certain of the third-tier nodes (e.g., third-tier nodes that are connected to at least two other wireless communication nodes) can serve as both a "relay" for bi-directional network traffic and also as an "access point" for the service provided by the mesh-based communication system, while others of the third-tier nodes (e.g., third-tier nodes that are only connected to a single other wireless communication node) may only serve as an "access point" for the service provided by the mesh-based communication system. A third-tier node may perform other functions as well.

As with the second-tier nodes, the infrastructure sites at which the third-tier nodes are installed may take any of various forms, and in at least some implementations, a third-tier node's infrastructure site may comprise private property associated with a respective customer of the service being provided by the mesh-based communication system. For instance, as one possibility, a third-tier node's infra-structure site could be a residential building that is associ-ated with a customer of the service being provided by the mesh-based communication system and provides a suitable location for installation of equipment for establishing and communicating over wireless links with other wireless com-munication nodes (e.g., a location that has sufficient LOS to other infrastructure sites), such as a particular section of the residential building's rooftop or a particular spot along the side of the residential building. For example, such a resi-dential building could take the form of a detached single-family home, a townhouse, or an MDU where a customer of the service being provided by the mesh-based communica-tion system resides, among other examples. In such an implementation, in addition to exchanging bi-directional network traffic with other nodes of the wireless mesh net-work, the third-tier node installed at the residential building may also function to deliver the service being provided by the mesh-based communication system (e.g., a high-speed internet service) to the residential building such that the customer (and/or other individuals at the residential build-ing) can make use of that service.

As another possibility, a third-tier node's infrastructure site could be a commercial building that is associated with a customer of the service being provided by the mesh-based communication system and provides a suitable location for installation of equipment for establishing and communicat-ing over wireless links with other wireless communication nodes (e.g., a location that has sufficient LOS to other infrastructure sites), such as a particular section of the commercial building's rooftop or a particular spot along the side of the commercial building. For example, such a commercial building could take the form of an office build-ing where a customer of the service being provided by the mesh-based communication system owns or leases office space, among other examples. In such an implementation, in addition to exchanging bi-directional network traffic with other nodes of the wireless mesh network, the third-tier node installed at the commercial building may also function to deliver the service being provided by the mesh-based com-munication system (e.g., a high-speed internet service) to the commercial building such that the customer (and/or other individuals at the commercial building) can make use of that service.

A third-tier node's infrastructure site could take some other form as well, including but not limited to the possi-bility that a third-tier node's infrastructure site could be a support structure such as a tower or pole that is located on private property owned or occupied by a customer of the service delivered by the mesh-based communication system.

The equipment for each third-tier node may also take any of various forms. To begin, a third-tier node's equipment may include wireless mesh equipment for establishing a wireless connection with one or more other nodes of the wireless mesh network, which may take various forms depending on where the third-tier node sits within the network arrangement. For instance, if a third-tier node is of a type that is to establish a wireless connection with at least one second-tier node, the third-tier node's wireless mesh equipment may be configured to establish and communicate over either (i) a bi-directional ptp wireless link with the at least one second-tier node or (ii) a bi-directional ptmp wireless link with the at least one second-tier node, among other possibilities. Further, if a third-tier node is of a type that is to establish a wireless connection with one or more peer third-tier nodes, the third-tier node's wireless mesh equipment may be configured to establish and communicate over either (i) a respective bi-directional ptp wireless link with each of the one or more peer third-tier nodes or (ii) a bi-directional ptmp wireless link (or perhaps multiple bi-directional ptmp wireless links) with the one or more peer third-tier nodes, among other possibilities. Further yet, if a third-tier node is of a type that is to establish a wireless connection with one or more fourth-tier nodes, the third-tier node's wireless mesh equipment may be configured to establish and communicate over either (i) a respective bi-directional ptp wireless link with each of the one or more fourth-tier nodes or (ii) a bi-directional ptmp wireless link (or perhaps multiple bi-directional ptmp wireless links) with the one or more fourth-tier nodes, among other possibilities. Other implementations of a third-tier node's wireless mesh equipment are possible as well. Additionally, a third-tier node's equipment may include networking equipment (e.g., one or more modems, routers, switches, or the like) that facilitates communication between the third-tier node's wireless mesh equipment and other devices or systems located at the third-tier node's infrastructure site. Addition-ally yet, a third-tier node's equipment may include power equipment for supplying power to the wireless mesh equip-ment and/or the networking equipment, such as power and/or battery units. A third-tier node's equipment may take various other forms as well.

A third-tier node of the wireless mesh network may take various other forms as well.

Turning lastly to the wireless mesh network's fourth tier of "fourth-tier nodes," as noted above, each fourth-tier node is installed at a respective infrastructure site and primarily serves to extend a discrete sub-mesh formed by other wireless communication nodes (e.g., third-tier nodes together with one or more second-tier nodes) to another endpoint by exchanging individual network traffic to and from one of the nodes within the discrete sub-mesh. In this respect, each fourth-tier node may be directly connected upstream to at least one third-tier node via at least one bi-directional ptp or ptmp wireless link, and may function to exchange bi-directional network traffic with the at least one third-tier node. Further, in most implementations, a fourth-tier node may function to deliver the service being provided by the mesh-based communication system (e.g., a high-speed internet service) to the fourth-tier node's infrastruc-ture site, such that individuals present at the fourth-tier node's infrastructure site can utilize that service. In this way, a fourth-tier node can serve as an "access point" for the service provided by the mesh-based communication system, but unlike the second-tier and third-tier nodes, may not necessarily serve as a "relay" for bi-directional network traffic. A fourth-tier node may perform other functions as well.

The infrastructure sites at which the fourth-tier nodes are installed may take any of various forms, and in at least some implementations, a fourth-tier node's infrastructure site may comprise private property associated with a respective cus-tomer of the service being provided by the mesh-based communication system. For instance, as one possibility, a fourth-tier node's infrastructure site could be a residential building that is associated with a customer of the service being provided by the mesh-based communication system and provides a suitable location for installation of equipment for establishing and communicating over wireless links with other wireless communication nodes (e.g., a location that has sufficient LOS to other infrastructure sites), such as a particular section of the residential building's rooftop or a particular spot along the side of the residential building. For example, such a residential building could take the form of a detached single-family home, a townhouse, or a MDU where a customer of the service being provided by the mesh-based communication system resides, among other examples. In such an implementation, in addition to exchanging bi-directional network traffic with other nodes of the wireless mesh network, the fourth-tier node installed at the residential building may also function to deliver the service being provided by the mesh-based communication system (e.g., a high-speed internet service) to the residential building such that the customer (and/or other individuals at the residential building) can make use of that service.

As another possibility, a fourth-tier node's infrastructure site could be a commercial building that is associated with a customer of the service being provided by the mesh-based communication system and provides a suitable location for installation of equipment for establishing and communicat-ing over wireless links with other wireless communication nodes (e.g., a location that has sufficient LOS to other infrastructure sites), such as a particular section of the commercial building's rooftop or a particular spot along the side of the commercial building. For example, such a commercial building could take the form of an office build-ing where a customer of the service being provided by the mesh-based communication system owns or leases office space, among other examples. In such an implementation, in addition to exchanging bi-directional network traffic with other nodes of the wireless mesh network, the fourth-tier node installed at the commercial building may also function to deliver the service being provided by the mesh-based communication system (e.g., a high-speed internet service) to the commercial building such that the customer (and/or other individuals at the commercial building) can make use of that service.

A fourth-tier node's infrastructure site could take some other form as well, including but not limited to the possi-bility that a fourth-tier node's infrastructure site could be a support structure such as a tower or pole that is located on private property owned or occupied by a customer of the service being provided by the mesh-based communication system.

The equipment for each fourth-tier node may take any of various forms. To begin, a fourth-tier node's equipment may include wireless mesh equipment for establishing a wireless connection with at least one third-tier node. For instance, a fourth-tier node's wireless mesh equipment may be config-ured to establish and communicate over either (i) a bi-directional ptp wireless link with the at least one third-tier node or (ii) a bi-directional ptmp wireless link with the at least one third-tier node. Other implementations of a fourth-tier node's wireless mesh equipment are possible as well. Additionally, a fourth-tier node's equipment may include networking equipment (e.g., one or more modems, routers, switches, or the like) that facilitates communication between the fourth-tier node's wireless mesh equipment and other devices or systems located at the fourth-tier node's infra-structure site. Additionally yet, a fourth-tier node's equip-ment may include power equipment for supplying power to the wireless mesh equipment and/or the networking equipment, such as power and/or battery units. A fourth-tier node's equipment may take various other forms as well.

A fourth-tier node of the wireless mesh network may take various other forms as well.

As noted above, the wireless mesh network's tiers of wireless communication nodes may take various other forms as well. For instance, as one possibility, the wireless mesh network designed in accordance with the present disclosure may include first-tier nodes, second-tier nodes, and third-tier nodes, but not fourth-tier nodes for extending the discrete sub-meshes to other endpoints. As another possibility, the wireless mesh network designed in accordance with the present disclosure may include first-tier nodes, third-tier nodes, and fourth-tier nodes, but not second-tier nodes—in which case there may be no high-capacity pathway that extends from the first-tier nodes and discrete sub-meshes formed by third-tier nodes may extend directly from the first-tier nodes rather than extending from second-tier nodes. As yet another possibility, the wireless mesh network designed in accordance with the present disclosure may include a fifth tier of nodes that are each directly connected upstream to a respective fourth-tier node via a bi-directional ptp or ptmp wireless link. The wireless mesh network's tiers of wireless communication nodes may take various other forms as well.

As discussed above, the wireless communication nodes of the wireless mesh network may be interconnected via bi-directional wireless links that could take the form of bi-directional ptp wireless links, bi-directional ptmp wireless links, or some combination thereof. These bi-directional ptp and/or ptmp wireless links may take any of various forms.

Beginning with the bi-directional ptp wireless links, each bi-directional ptp wireless link that is established between two wireless communication nodes of the wireless mesh network may have any of various different beamwidths. For instance, as one possibility, a bi-directional ptp wireless link that is established between two wireless communication nodes of the wireless mesh network may have a 3 dB-beamwidth in both the horizontal and vertical directions that is less than 5 degrees—or in some cases, even less than 1 degree—which would generally be classified as an "extremely-narrow" beamwidth. As another possibility, a bi-directional ptp wireless link that is established between two wireless communication nodes of the wireless mesh network may have a 3 dB-beamwidth in both the horizontal and vertical directions that is within a range of 5 degrees and 10 degrees, which would generally be classified as a "nar-row" beamwidth but not necessarily an "extremely-narrow" beamwidth. As yet another possibility, a bi-directional ptp wireless link that is established between two wireless com-munication nodes of the wireless mesh network may have a 3 dB-beamwidth that is greater than 10 degrees. A bi-directional ptp wireless link having some other beamwidth could be utilized as well.

Further, each bi-directional ptp wireless link that is estab-lished between two wireless communication nodes of the wireless mesh network may operate and carry traffic at frequencies in any of various different frequency bands. For instance, in a preferred embodiment, each bi-directional ptp wireless link established between two wireless communica-tion nodes of the wireless mesh network may take the form of a millimeter-wave ptp wireless link (or an "MMWave wireless link" for short) that operates and carries traffic at frequencies in a frequency band within the millimeter-wave spectrum (e.g., between 6 gigahertz (GHz) and 300 GHz), such as the 26 GHz band, the 28 GHz band, the 39 GHz band, the 37/42 GHz band, the V band (e.g., between 57

GHz and 66 GHz), or the E Band (e.g., between 70 GHz and 90 GHz), among other possibilities. In practice, millimeter-wave ptp wireless links such as this may have a high capacity (e.g., 1 Gbps or more) and a low latency (e.g., less than 1 millisecond), which may provide an advantage over ptp wireless links operating in other frequency spectrums. However, millimeter-wave ptp wireless links such as this may also have certain limitations as compared to wireless links operating in other frequency spectrums, including a shorter maximum link length and a requirement that there be at least partial line-of-sight (LOS) between the wireless communication nodes establishing the millimeter-wave ptp wireless link in order for the link to operate properly, which may impose restrictions on which infrastructure sites can be used to host the wireless communication nodes and how the wireless mesh equipment of the wireless communication nodes must be positioned and aligned at the infrastructure sites, among other considerations that typically need to be addressed when utilizing millimeter-wave ptp wireless links.

In another embodiment, each bi-directional ptp wireless link established between two wireless communication nodes of the wireless mesh network may take the form of a sub-6 GHz ptp wireless link that operates and carries traffic at frequencies in a frequency band within the sub-6 GHz spectrum. In practice, sub-6 GHz ptp wireless links such as this may have a lower capacity (e.g., less than 1 Gbps) and perhaps also a higher latency than millimeter-wave ptp links, which may make sub-6 GHz ptp wireless links less desirable for use in at least some kinds of mesh-based communication systems (e.g., mesh-based communication systems for providing high-speed internet service). However, sub-6 GHz ptp wireless links such as this may also provide certain advantages over millimeter-wave ptp links, including a longer maximum link length and an ability to operate in environments that do not have sufficient LOS, which may make sub-6 GHz ptp wireless links more suitable for certain kinds of mesh-based communication systems and/or certain segments of mesh-based communication systems.

In yet another embodiment, some of the bi-directional ptp wireless links established between wireless communication nodes of the wireless mesh network may take the form of millimeter-wave ptp wireless links, while other of the bi-directional ptp wireless links established between wireless communication nodes of the wireless mesh network may take the form of sub-6 GHz ptp wireless links. The bi-directional ptp wireless links established between wireless communication nodes of the wireless mesh network may operate and carry traffic at frequencies in other frequency bands as well.

Further yet, each bi-directional ptp wireless link that is established between two wireless communication nodes of the wireless mesh network may utilize any of various duplexing schemes to carry bi-directional network traffic between the two wireless communication nodes, including but not limited to time division duplexing (TDD) and/or frequency division duplexing (FDD), among other possibilities, and network traffic may be exchanged over each bi-directional ptp wireless link using any of various digital transmission schemes, including but not limited to amplitude modulation (AM), phase modulation (PM), pulse amplitude modulation/quadrature amplitude modulation (PAM/QAM), ultra-wide band (UWB) pulse modulation (e.g., using pulses on the order of pico-seconds, such as pulses of 5-10 pico-seconds), multiple input multiple output (MIMO), and/or orbital angular momentum (OAM) multiplexing, and/or among other possibilities.

Still further, each bi-directional ptp wireless link that is established between two wireless communication nodes of the wireless mesh network may have any of various capacities, which may depend in part on certain of the other attributes described above (e.g., the ptp wireless link's beamwidth, frequency band, etc.) and/or the particular equipment used to establish the ptp wireless link. For instance, in a preferred embodiment, each bi-directional ptp wireless link that is established between two wireless communication nodes may have a capacity of at least 1 Gbps, which is generally considered to be a "high-capacity" ptp wireless link in the context of the present disclosure. Within this class of "high-capacity" ptp wireless links, each ptp wireless link may have a capacity level that falls within any of various ranges, examples of which may include a capacity between 1 and 5 Gbps, a capacity between 5 and 10 Gbps, a capacity between 10 and 20 Gbps, a capacity that exceeds 20 Gbps, or perhaps even a capacity that exceeds 100 Gbps (which may be referred to as an "ultra-high-capacity" ptp wireless link), among other possible examples of capacity ranges. Further, in other embodiments, some or all of the bi-directional ptp wireless links may have a capacity that is less than 1 Gbps. It some implementations, ptp wireless links having differing levels of high capacity may also be utilized at different points within the wireless mesh network (e.g., utilizing ptp wireless links having a first capacity level between first-tier and second-tier nodes and between peer second-tier nodes and utilizing ptp wireless links having a second capacity level between second-tier and third-tier nodes and between peer third-tier nodes). The capacities of the bi-directional ptp wireless links may take other forms as well.

Each bi-directional ptp wireless link that is established between two wireless communication nodes of the wireless mesh network may also have any of various lengths, which may depend on the location of the two wireless communication nodes, but the maximum link length of each such wireless link may also depend in part on certain of the other attributes described above (e.g., the ptp wireless link's beamwidth, frequency band, etc.) and/or the particular equipment used to establish the ptp wireless link. As examples, a bi-directional ptp wireless link that is established between two wireless communication nodes of the wireless mesh network could have a shorter maximum link length (e.g., less than 100 meters), an intermediate maximum link length (e.g., between 100 meters and 500 meters), a longer maximum link length (e.g., between 500 meters and 1000 meters), or a very long maximum link length (e.g., more than 1000 meters), among other possibilities. It some implementations, ptp wireless links having differing maximum lengths may also be utilized at different points within the wireless mesh network (e.g., utilizing ptp wireless links having a first maximum length between first-tier and second-tier nodes and between peer second-tier nodes and utilizing ptp wireless links having a second maximum length between second-tier and third-tier nodes and between peer third-tier nodes). The lengths of the bi-directional ptp wireless links may take other forms as well.

Each bi-directional ptp wireless link that is established between two wireless communication nodes of the wireless mesh network may take various other forms as well.

Turning to the bi-directional ptmp wireless links, each bi-directional ptmp wireless link that originates from a given wireless communication node of the wireless mesh network and is established with one or more other wireless communication nodes may have any of various different beamwidths, which may define a "ptmp coverage area" of the originating wireless communication node. For instance, as one possibility, a bi-directional ptmp wireless link that originates from a given wireless communication node of the wireless mesh network may have a beamwidth in the horizontal direction that is within a range of 60 degrees to 180 degrees (e.g., 120 degrees). As another possibility, a bi-directional ptmp wireless link that originates from a given wireless communication node of the wireless mesh network may have a beamwidth in the horizontal direction that is either less than 60 degrees (in which case the wireless communication node's ptmp coverage area would be smaller) or greater than 180 degrees (in which case the wireless communication node's ptmp coverage area would be larger). A bi-directional ptmp wireless link having some other beamwidth could be utilized as well.

Further, each bi-directional ptmp wireless link that originates from a given wireless communication node of the wireless mesh network and is established with one or more other wireless communication nodes may operate and carry traffic at frequencies in any of various different frequency bands. For instance, in a preferred embodiment, each bi-directional ptmp wireless link that originates from a given wireless communication node of the wireless mesh network may take the form of a millimeter-wave wireless link that operates and carries traffic at frequencies in a frequency band within the millimeter-wave spectrum, such as the 26 GHz band, the 28 GHz band, the 39 GHz band, the 37/42 GHz band, the V band, or the E Band, among other possibilities. Millimeter-wave ptmp wireless links such as this may have a high capacity (e.g., at least 1 Gbps) and a low latency (e.g., less than 4 milliseconds), which may provide an advantage over wireless links operating in other frequency spectrums, but may also have certain limitations as compared to ptmp wireless links operating in other frequency spectrums, including a shorter maximum link length and a need for sufficient LOS between wireless communication nodes, which may impose restrictions on which infrastructure sites can be used to host the wireless communication nodes and how the wireless mesh equipment of the wireless communication nodes must be positioned and aligned at the infrastructure sites, among other considerations that typically need to be addressed when utilizing millimeter-wave wireless links.

In another embodiment, each bi-directional ptmp wireless link that originates from a given wireless communication node of the wireless mesh network may take the form of a sub-6 GHz wireless link that operates and carries traffic at frequencies in a frequency band within the sub-6 GHz spectrum. Sub-6 GHz ptmp wireless links such as this may have a lower capacity (e.g., less than 1 Gbps) and perhaps also a higher latency than millimeter-wave ptmp wireless links, which may make sub-6 GHz ptmp wireless links less desirable for use in at least some kinds of mesh-based communication systems, but sub-6 GHz ptmp wireless links such as this may also provide certain advantages over millimeter-wave ptmp links, including a longer maximum link length and an ability to operate in environments that do not have sufficient LOS, which may make sub-6 GHz ptmp wireless links more suitable for certain kinds of mesh-based communication systems and/or certain segments of mesh-based communication systems.

In yet another embodiment, some of the bi-directional ptmp wireless links established between wireless communication nodes of the wireless mesh network may take the form of millimeter-wave ptmp wireless links while other of the bi-directional ptmp wireless links established between wireless communication nodes of the wireless mesh network may take the form of sub-6 GHz ptmp wireless links. The bi-directional ptmp wireless links established between wireless communication nodes of the wireless mesh network may operate and carry traffic at frequencies in other frequency bands as well.

Further yet, each bi-directional ptmp wireless link that originates from a given wireless communication node of the wireless mesh network and is established with one or more other wireless communication nodes may utilize any of various duplexing schemes to carry bi-directional network traffic between the given wireless node and one of the other wireless communication nodes, including but not limited to TDD and/or FDD, as well as any of various multiple access schemes to enable the bi-directional ptmp wireless link originating from the given wireless communication node to be shared between the one or one or more other wireless communication nodes, including but not limited to frequency division multiple access (FDMA), time division multiple access (TDMA), single carrier FDMA (SC-FDMA), single carrier TDMA (SC-TDMA), code division multiple access (CDMA), orthogonal frequency division multiple access (OFDMA), non-orthogonal multiple access (NOMA), and/or Multiuser Superposition Transmission (MUST), among other possibilities. Further, as with the bi-directional ptp wireless links, network traffic may be exchanged over each bi-directional ptp wireless link using any of various digital transmission schemes, including but not limited to AM, PM, PAM/QAM, UWB pulse modulation, MIMO, and/or OAM multiplexing, among other possibilities.

Still further, each bi-directional ptmp wireless link that originates from a given wireless communication node of the wireless mesh network and is established with one or more other wireless communication nodes may have any of various capacities, which may depend in part on certain of the other attributes described above (e.g., the ptmp wireless link's beamwidth, frequency band, etc.) and/or the particular equipment used to establish the ptmp wireless link. For instance, in a preferred embodiment, each bi-directional ptmp wireless link that originates from a given wireless communication node of the wireless mesh network and is established with one or more other wireless communication nodes may have a capacity of at least 1 Gbps, which is generally considered to be a "high-capacity" ptmp wireless link in the context of the present disclosure. Within this class of "high-capacity" ptmp wireless links, each ptmp wireless link may have a capacity level that falls within any of various ranges, examples of which may include a capacity between 1 and 5 Gbps, a capacity between 5 and 10 Gbps, a capacity between 10 and 20 Gbps, a capacity that exceeds 20 Gbps, or perhaps even a capacity that exceeds 100 Gbps (which may be referred to as an "ultra-high-capacity" ptp wireless link), among other possible examples of capacity ranges. Further, in other embodiments, some or all of the bi-directional ptmp wireless links may have a capacity that is less than 1 Gbps. It some implementations, ptmp wireless links having differing levels of high capacity may also be utilized at different points within the wireless mesh network. The capacities of the ptmp wireless links may take other forms as well.

Each bi-directional ptmp wireless link that originates from a given wireless communication node of the wireless mesh network and is established with one or more other wireless communication nodes may also have any of various lengths, which may depend on the location of the wireless communication nodes, but the maximum link length of each such wireless link may also depend in part on certain of the other attributes described above (e.g., the ptmp wireless link's beamwidth, frequency band, etc.) and/or the particular equipment used to establish the ptmp wireless link. As examples, each bi-directional ptmp wireless link that originates from a given wireless communication node could have a shorter maximum link length (e.g., less than 100 meters), an intermediate maximum link length (e.g., between 100 meters and 500 meters), a longer maximum link length (e.g., between 500 meters and 1000 meters), or a very long maximum link length (e.g., more than 1000 meters), among other possibilities. It some implementations, ptmp wireless links having differing maximum lengths may also be utilized at different points within the wireless mesh network. The lengths of the ptmp wireless links may take other forms as well.

Each bi-directional ptmp wireless link that originates from a given wireless communication node of the wireless mesh network and is established with one or more other wireless communication nodes may take various other forms as well.

In practice, bi-directional ptp wireless links and bi-directional ptmp wireless links of the type described above typically provide different respective advantages and disadvantages that can be considered when implementing a mesh-based communication system in accordance with the example architecture disclosed herein. For instance, bi-directional ptp wireless links are typically less susceptible to interference than bi-directional ptmp wireless links, and in most cases, bi-directional ptp wireless links are unlikely to cause interference with one another once established even if such ptp wireless links do not have an extremely-narrow beamwidth. Conversely, the process of installing and configuring equipment for establishing a bi-directional ptp wireless link between two wireless communication nodes tends to be more time consuming and labor intensive than the process of installing and configuring equipment for establishing a bi-directional ptmp wireless link, as it generally requires the ptp radios at both of the wireless communication nodes to be carefully positioned and aligned with one another in a manner that provides sufficient LOS between the ptp radios. This is particularly the case for bi-directional ptp wireless links having narrower beamwidths, which increases the level of precision needed for the positioning and alignment of the ptp radios. As such, bi-directional ptp wireless links are typically better suited for establishing wireless connections between wireless communication nodes that have pre-planned, fixed locations and are expected to require minimal coordination after the initial deployment of the wireless mesh network, which typically is the case for first-tier nodes, second-tier nodes, and most third-tier nodes.

On the other hand, because a bi-directional ptmp wireless link originating from a given wireless communication node typically has a wider beamwidth (e.g., within a range of 120 degrees to 180 degrees) and can be established with one or more other wireless communication nodes in a wider coverage area, the process of installing and configuring equipment for establishing a bi-directional ptmp wireless link tends to be less time consuming or labor intensive—the ptmp radio of the given wireless communication node can be positioned and aligned to point in a general direction where other ptmp radios are expected to be located as opposed to a more precise direction of one specific ptp radio. As such, bi-directional ptmp wireless links are typically better suited for establishing wireless connections with wireless communication nodes that do not have pre-planned locations, which may be the case for fourth-tier nodes (and perhaps some third-tier nodes) because those nodes may not be added until after the initial deployment of the wireless mesh network. However, because bi-directional ptmp wireless links are generally more susceptible to interference, the use of bi-directional ptmp wireless links typically imposes an ongoing need to engage in coordination for frequency planning, interference mitigation, or the like after the initial deployment of the wireless mesh network. In this respect, the coordination that may be required for ptmp wireless links may involve intra-link coordination between multiple wireless communication nodes that are communicating over the same ptmp wireless link and/or inter-link coordination between multiple ptmp wireless links operating on the same frequency, among other possibilities.

These differences in the respective interference profiles of ptp and ptmp wireless links, the respective amount of time and effort required to install and configure equipment for establishing ptp and ptmp wireless links, and the respective amount of time and effort required to maintain the ptp and ptmp links may all be factors that can be considered when implementing a mesh-based communication system in accordance with the example architecture disclosed herein. Additionally, in practice, equipment for establishing bi-directional ptp wireless links tends to be more expensive than equipment for establishing bi-directional ptmp wireless links (e.g., due to the fact that multiple ptp radios are required when there is a need to communicate with multiple other wireless communication nodes via respective ptp wireless links whereas only a single ptmp radio is typically required to communicate with multiple other wireless communication nodes via a ptmp wireless link), which is another factor that can be considered when implementing a mesh-based communication system in accordance with the example architecture disclosed herein.

Based on these (and other) factors, a designer of a mesh-based communication system having the example architecture disclosed herein could choose to interconnect the wireless communication nodes of the wireless mesh network using bi-directional ptp wireless links exclusively, bi-directional ptmp wireless links exclusively, or some combination of bi-directional ptp wireless links and bi-directional ptmp wireless links.

For instance, in one embodiment, every wireless link that is established between and among the wireless communication nodes in the different tiers of the wireless mesh network—which may include wireless links between first-tier and second-tier nodes, wireless links between peer second-tier nodes, wireless links between second-tier and third-tier nodes, wireless links between peer third-tier nodes, and wireless links between third-tier and fourth-tier nodes, among others—may take the form of a bi-directional ptp wireless link that is established between two wireless communication nodes' ptp radios.

In another embodiment, every wireless link that is established between and among the wireless communication nodes in the different tiers of the wireless mesh network—which as just noted may include wireless links between first-tier and second-tier nodes, wireless links between peer second-tier nodes, wireless links between second-tier and third-tier nodes, wireless links between peer third-tier nodes, and wireless links between third-tier and fourth-tier nodes, among others—may take the form of a bi-directional ptmp wireless link that originates from one wireless communication node's ptmp radio and is established with a respective ptmp radio at each of one or more other wireless communication nodes.

In yet another embodiment, the bi-directional wireless links that are established between and among the wireless communication nodes in certain tiers of the wireless mesh network may take the form of bi-directional ptp wireless links, while the bi-directional wireless links that are established between and among the wireless communication nodes in other tiers of the wireless mesh network may take the form of bi-directional ptmp wireless links.

For instance, as one possible implementation of this embodiment, the wireless links between first-tier and second-tier nodes, between peer second-tier nodes, between second-tier and third-tier nodes, and between peer third-tier nodes may each take the form of a bi-directional ptp wireless link that is established between two nodes' ptp radios, while the wireless links between third-tier and fourth-tier nodes may each take the form of a bi-directional ptmp wireless link that originates from a given third-tier node's ptmp radio and is established with a respective ptmp radio at each of one or more other fourth-tier nodes—which may allow the wireless mesh network to be extended to additional endpoints at a lower cost and may also be well suited for scenarios where there is an expectation that fourth-tier nodes may be added to the wireless mesh network after its initial deployment (among other considerations).

As another possible implementation of this embodiment, the wireless links between first-tier and second-tier nodes and between peer second-tier nodes may each take the form of a bi-directional ptp wireless link that is established between two nodes' ptp radios, while the wireless links between second-tier and third-tier nodes, between peer third-tier nodes, and between third-tier and fourth-tier nodes may each take the form of a bi-directional ptmp wireless link that originates from a given node's ptmp radio and is established with a respective ptmp radio at each of one or more other nodes—which may allow the wireless mesh network to be extended to third-tier nodes and/or fourth-tier nodes at a lower cost and may also be well suited for scenarios where there is an expectation that additional third-tier nodes and/or fourth-tier nodes may be added to the wireless mesh network after its initial deployment (among other considerations).

As yet another possible implementation of this embodiment where the wireless mesh network additionally includes a fifth tier of nodes, the wireless links between first-tier and second-tier nodes, between peer second-tier nodes, between second-tier and third-tier nodes, and between peer third-tier nodes may each take the form of a bi-directional ptp wireless link that is established between two nodes' ptp radios, while the wireless links between third-tier and fourth-tier nodes and between the fourth-tier and fifth-tier nodes may each take the form of a bi-directional ptmp wireless link that originates from a ptmp radio of one node and is established with a respective ptmp radio at each of one or more other nodes—which may allow the wireless mesh network to be extended to multiple tiers of additional endpoints at a lower cost and may also be well suited for scenarios where there is an expectation that multiple tiers of additional endpoints may be added to the wireless mesh network after its initial deployment (among other considerations).

In the foregoing implementations, the wireless mesh network may be considered to have two different "layers" (or "segments") of bi-directional wireless links: (1) a first layer comprising the bi-directional ptp wireless links, which may be referred to as a "ptp layer," and (2) a second layer comprising the bi-directional ptmp wireless links, which may be referred to as a "ptmp layer."

Various other implementations of the embodiment where the wireless mesh network includes both bi-directional ptp wireless links and bi-directional ptmp wireless links are possible as well, including but not limited to implementations where the bi-directional wireless links among the wireless communication nodes within a single tier of the wireless mesh network (e.g., the anchor-to-anchor wireless links) comprise a mix of bi-directional ptp wireless links and bi-directional ptmp wireless and/or implementations where the bi-directional wireless links between wireless communication nodes in two adjacent tiers of the wireless mesh network (e.g., the seed-to-anchor wireless links or the anchor-to-leaf wireless links) comprise a mix of bi-directional ptp wireless links and bi-directional ptmp wireless.

Further, in line with the discussion, the bi-directional ptp and/or ptmp wireless links between and among the different tiers of wireless communication nodes in the foregoing embodiments may also have differing levels of capacity. For instance, in one example implementation, the wireless links between first-tier and second-tier nodes and between peer second-tier nodes (which form the high-capacity pathways extending from the first-tier nodes) may each comprise a high-capacity wireless link having a highest capacity level (e.g., at or near 10 Gbps or perhaps even higher), the wireless links between second-tier and third-tier nodes and between peer third-tier nodes (which may form the discrete sub-meshes for routing aggregated network traffic to and from endpoints in a particular geographic area) may each comprise a high-capacity wireless link having a second highest capacity level (e.g., at or near 2.5 Gbps), and the wireless links between third-tier and fourth-tier nodes may each comprise a high-capacity wireless link having a third highest capacity level (e.g., at or near 1 Gbps). Various other implementations that utilize wireless links having differing levels of capacity at different points within the network arrangement are possible as well.

Returning to the overall architecture of the mesh-based communication system, in at least some implementations, the mesh-based communication system may additionally include a tier of wired communication nodes that are each installed at an infrastructure site and directly connected to at least one wireless communication node of the wireless mesh network via at least one bi-directional wired link, in which case each such wired communication node may function to exchange bi-directional network traffic with the at least one wireless communication node of the wireless mesh network. For instance, a wired communication node could potentially be connected to any of a first-tier node, a second-tier node, a third-tier node, or a fourth-tier node, although in some network arrangements, wired communication nodes may only be directly connected to nodes in certain tiers (e.g., only third-tier and/or fourth-tier nodes). Further, in most implementations, a wired communication node may function to deliver the service being provided by the mesh-based communication system (e.g., a high-speed internet service) to the wired communication node's infrastructure site, such that individuals present at the wired communication node's infrastructure site can utilize that service. A wired communication node may perform other functions as well.

The infrastructure sites at which the wired communication nodes are installed may take any of various forms, and in at least some implementations, a wired communication node's infrastructure site may comprise private property associated with a respective customer of the service being provided by the mesh-based communication system. For instance, as one possibility, a wired communication node's infrastructure site could be a residential building that is associated with a customer of the service being provided by the mesh-based communication system and provides a suitable location for installation of equipment for establishing a wired connection to at least one wireless communication node within the mesh-based communication system. For example, such a residential building could take the form of a detached single-family home, a townhouse, or a MDU where a customer of the service being provided by the mesh-based communication system resides, among other examples. In such an implementation, in addition to exchanging bi-directional network traffic with the at least one wireless communication node to which it is connected, the wired communication node installed at the residential building may also function to deliver the service being provided by the mesh-based communication system (e.g., a high-speed internet service) to the residential building such that the customer (and/or other individuals at the residential building) can make use of that service.

As another possibility, a wired communication node's infrastructure site could be a commercial building that is associated with a customer of the service being provided by the mesh-based communication system and provides a suitable location for installation of equipment for establishing a wired connection to at least one wireless communication node within the mesh-based communication system. For example, such a commercial building could take the form of an office building where a customer of the service being provided by the mesh-based communication system owns or leases office space, among other examples. In such an implementation, in addition to exchanging bi-directional network traffic with the at least one wireless communication node to which it is connected, the wired communication node installed at the commercial building may also function to deliver the service being provided by the mesh-based communication system (e.g., a high-speed internet service) to the commercial building such that the customer (and/or other individuals at the commercial building) can make use of that service.

A wired communication node's infrastructure site could take some other form as well.

Further, the equipment for each wired communication node may take any of various forms. To begin, a wired communication node's equipment may include networking equipment (e.g., one or more modems, routers, switches, or the like) that facilitates communication between (i) any wireless communication node to which the wired communication node is connected via the at least one bi-directional wired link and (ii) other devices or systems located at the second-tier node's infrastructure site. In this respect, a wired communication node's networking equipment may be configured to establish a wired connection with the networking equipment of at least one wireless communication node via a bi-directional wired link, and correspondingly, the networking equipment of each wireless communication node that is connected to a wired communication node may be configured to facilitate communication between the wireless communication node's wireless mesh equipment and the wired communication node's networking equipment via the bi-directional wired link. Additionally, a wired communication node's equipment may include power equipment for supplying power to the networking equipment, such as power and/or battery units. A wired communication node's equipment may take various other forms as well.

Further yet, each bi-directional wired link between a wired communication node and a wireless communication node may take any of various forms. As one possibility, a bi-directional wired link between a wired communication node and a wireless communication node may take the form of a copper-based wired link, such as a coaxial cable or an Ethernet cable (e.g., an unshielded or shielded twisted-pair copper cable designed in accordance with a given Ethernet cable category), among other possibilities. As another possibility, a bi-directional wired link between a wired communication node and a wireless communication node may take the form of a fiber-based wired link, such as a glass optical fiber cable or a plastic optical fiber cable. A bi-directional wired link between a wired communication node and a wireless communication node could take other forms as well.

The communication nodes included within the mesh-based communication system may take various other forms as well.

Along with the communication nodes described above, which comprise equipment installed at infrastructure sites, the mesh-based communication system may further include end-user devices that are each capable of (i) connecting to a wireless or wired communication node of the mesh-based communication system and (ii) exchanging bi-directional network traffic over the connection with the communication node so as to enable the end-user device and its end user to utilize the service being provided by the mesh-based communication system (e.g., a high-speed internet service). These end-user devices may take any of various forms.

As one possibility, an end-user device may take the form of a computer, tablet, mobile phone, or smart home device located at an infrastructure site for a communication node of the mesh-based communication system that is connected to the communication node via networking equipment at the infrastructure site (e.g., a modem/router that provides an interface between the node's wireless mesh equipment and the end-user devices).

As another possibility, an end-user device may take the form of a mobile or customer-premises device that is capable of establishing and communicating over a direct wireless connection (e.g., via a bi-directional ptp or ptmp wireless link) with a wireless communication node of the wireless mesh network. In this respect, an end-user device may establish a direct wireless connection with any of various wireless communication nodes of the wireless mesh network, including but not limited to the wireless communication node of the wireless mesh network with which the end-user device is able to establish the strongest wireless connection regardless of tier (e.g., the wireless communication node that is physically closest to the end-user device) or the wireless communication node in a particular tier or subset of tiers (e.g., the third and/or fourth tiers) with which the end-user device is able to establish the strongest wireless connection, among other possibilities. To facilitate this functionality, at least a subset of the wireless communication nodes of the wireless mesh network may have wireless mesh equipment that, in addition to establishing and communicating over a wireless connection with one or more other wireless communication nodes, is also capable of establishing and communicating over wireless connections with end-user devices. Further, it should be understood that the particular wireless communication node of the wireless mesh network to which an end-user device is wirelessly connected may change over the course of time (e.g., if the end-user device is a mobile device that moves to a different location).

An end-user device may take other forms as well.

Turning now to FIGS. 1A-D, some simplified examples of portions of mesh-based communication systems designed and implemented in accordance with the present disclosure are shown. It should be understood that these simplified examples are shown for purposes of illustration only, and that in line with the discussion above, numerous other arrangements of mesh-based communication systems designed and implemented in accordance with the present disclosure are possible and contemplated herein.

To begin, FIG. 1A illustrates one simplified example 100 of a portion of a mesh-based communication system designed and implemented in accordance with the present disclosure. In line with the discussion above, this example mesh-based communication system 100 may be utilized to provide a high-speed internet service to end users, although it is possible that the mesh-based communication system could be utilized to deliver some other type of network-based service to end users as well. As shown, the example mesh-based communication system 100 may include four different tiers of wireless communication nodes that are interconnected together in order to form a wireless mesh network: (i) a first tier of nodes 102, (ii) a second tier of nodes 104, (iii) a third tier of nodes 106, and (iv) a fourth tier of nodes 108.

For instance, beginning with the first tier of nodes 102, the example mesh-based communication system 100 of FIG. 1A is shown to include two first-tier nodes 102a and 102b, each of which is installed at a commercial building that has high-capacity fiber connectivity to a core network and is connected downstream to a respective second-tier node 104 via a respective inter-tier wireless link that takes the form of a bi-directional ptp wireless link. In this respect, each of the first-tier nodes 102a and 102b may function to exchange bi-directional network traffic with (i) the core network via the high-capacity fiber connection and (ii) the respective second-tier node 104 to which the first-tier node 102 is connected over the respective wireless link. Further, one or both of the first-tier nodes 102 may function to deliver high-speed internet service to the commercial building(s) hosting the first-tier node(s) 102, which may enable one or more end-user devices at the commercial building(s) to access the high-speed internet service.

While the example mesh-based communication system 100 of FIG. 1A is shown to include two first-tier nodes 102a and 102b, it should also be understood that this is merely for purposes of illustration, and that in practice, the first tier of nodes 102 could include any number of first-tier nodes—including as little as a single first-tier node. Further, while each of the first-tier nodes 102a and 102b is shown to be connected to a single second-tier node 104, it should also be understood that this is merely for purposes of illustration, and that in practice, a first-tier node 102 could be connected to multiple second-tier nodes 104. Further yet, while each of the first-tier nodes 102a and 102b is shown to be connected downstream to a respective second-tier node 104 via a bi-directional ptp wireless link, it should be understood that a first-tier node 102 could alternatively be connected downstream to a second-tier node 104 (or perhaps multiple second-tier nodes 104) via a bi-directional ptmp wireless link.

Turning to the second tier of nodes 104, the example mesh-based communication system 100 of FIG. 1A is shown to include three second-tier nodes 104a, 104b, and 104c, each of which is installed at a residential building associated with a customer of the high-speed internet service and primarily serves to extend the high-capacity access to the core network from the first-tier nodes 102 to other geographic locations by forming high-capacity pathways (e.g., in the range of 10 Gbps) for routing aggregated network traffic that originated from or is destined to the core network.

In particular, second-tier nodes 104a and 104b are shown to form a multi-hop pathway extending from first-tier node 102a, and second-tier node 104c is shown to form a single-hop pathway extending from first-tier node 102b. In this respect, (i) second-tier node 104a is connected to (and exchanges bi-directional network traffic with) first-tier node 102a via an inter-tier wireless link that takes the form of a bi-directional ptp wireless link and is connected to (and exchanges bi-directional network traffic with) peer second-tier node 102b via an intra-tier wireless link that takes the form of a bi-directional ptp wireless link, (ii) second-tier node 104b is connected to (and exchanges bi-directional network traffic with) peer second-tier node 104a via an intra-tier wireless link that takes the form of a bi-directional ptp wireless link, and (iii) second-tier node 104c is connected to (and exchanges bi-directional network traffic with) first-tier node 102b via an inter-tier wireless link that takes the form of a bi-directional ptp wireless link.

Additionally, as shown in FIG. 1A, each of at least a subset of the second-tier nodes 104a, 104b, and 104c may be directly connected downstream to one or more third-tier nodes 106. In particular, (i) second-tier node 104b is shown to be connected downstream to third-tier node 106a via an inter-tier wireless link that takes the form of a bi-directional ptmp wireless link and (ii) second-tier node 104c is shown to be connected downstream to third-tier node 106b and third-tier node 106c via respective inter-tier wireless links that each take the form of a bi-directional ptmp wireless link. In this respect, each of third-tier nodes 106b and 106c may additionally function to exchange bi-directional network traffic with one or more third-tier nodes.

Additionally, each of the second-tier nodes 104a, 104b, and 104c (or at least one of them) may function to deliver the high-speed internet service to the residential building hosting the second-tier node, which may enable one or more end-user devices at the residential building to access the high-speed internet service.

While the example mesh-based communication system 100 of FIG. 1A is shown to include three second-tier nodes 104a, 104b, and 104c, it should also be understood that this is merely for purposes of illustration, and that in practice, the second tier of nodes 104 could include any number of second-tier nodes—including as little as a single second-tier node. Further, while each of the second-tier nodes 104a, 104b, and 104c is shown to be connected to a particular set of one or more other wireless communication nodes (e.g., first-tier, second-tier, and/or third-tier nodes), it should also be understood that this is merely for purposes of illustration, and that in practice, a second-tier node 104 could be connected to any combination of one or more first-tier, second-tier, and/or third-tier nodes. Further yet, while each of the second-tier nodes 104a and 104b is shown to be connected to each other wireless communication node via a respective bi-directional ptp wireless link, it should be understood that a second-tier node 104 could alternatively be connected to one or more other wireless communication nodes via a bi-directional ptmp wireless link (or perhaps multiple bi-directional ptmp wireless links). Still further, while the second-tier nodes 104 in example mesh-based communication system 100 of FIG. 1A are shown to form one respective pathway extending from each of the first-tier nodes 102, it should be understood that example mesh-based communication system 100 of FIG. 1A could include additional second-tier nodes 104 that form additional pathways extending from either or both of the first-tier nodes 102.

Turning next to the third tier of nodes 106, the example mesh-based communication system 100 of FIG. 1A is shown to include seven third-tier nodes 106a, 106b, 106c, 106d, 106e, 106f, and 106g, each of which is installed at a residential building associated with a customer of the high-speed internet service and is connected to a second-tier node 104, one or more peer third-tier nodes 106, or a combination thereof. In particular, (i) third-tier node 106a is shown to be connected upstream to second-tier node 104b via an inter-tier wireless link that takes the form of a bi-directional ptp wireless link and is also shown to be connected to peer third-tier nodes 106d and 106e via respective intra-tier wireless links that each take the form of a bi-directional ptp wireless link, (ii) third-tier node 106b is shown to be connected upstream to second-tier node 104c via an inter-tier wireless link that takes the form of a bi-directional ptp wireless link and is also shown to be connected to peer third-tier node 106f via an intra-tier wireless link that takes the form of a bi-directional ptp wireless link, (iii) third-tier node 106c is shown to be connected upstream to second-tier node 104c via an inter-tier wireless link that takes the form of a bi-directional ptp wireless link, (iv) third-tier node 106d is shown to be connected to peer third-tier node 106a via an intra-tier wireless link that takes the form of a bi-directional ptp wireless link, (v) third-tier node 106e is shown to be connected to peer third-tier node 106a via an intra-tier wireless link that takes the form of a bi-directional ptp wireless link, (vi) third-tier node 106f is shown to be connected to peer third-tier node 106b via one intra-tier wireless link that takes the form of a bi-directional ptp wireless link and to peer third-tier node 106g via another intra-tier wireless link that takes the form of a bi-directional ptp wireless link, and (vii) third-tier node 106g is shown to be connected to peer third-tier node 106f via an intra-tier wireless link that takes the form of a bi-directional ptp wireless link. In this respect, each of the third-tier nodes 106a, 106b, 106c, 106d, 106e, 106f, and 106g may function to exchange bi-directional network traffic with a second-tier node 104, one or more peer third-tier nodes 106, or a combination thereof as part of a given sub-mesh for routing aggregated network traffic to and from endpoints within a given geographic area.

Additionally, as shown in FIG. 1A, each of at least a subset of the third-tier nodes 106a, 106b, 106c, 106d, 106e, 106f, and 106g may be directly connected downstream to one or more fourth-tier nodes 108. In particular, (i) third-tier node 106g is shown to be connected downstream to three fourth-tier nodes 108 (fourth-tier nodes 108a, 108b, and 108c) via an inter-tier wireless link that takes the form of a bi-directional ptmp wireless link, (ii) third-tier node 106d is shown to be connected downstream to four fourth-tier nodes 108 (fourth-tier nodes 108d, 108e, 108f, and 108g) via an inter-tier wireless link that takes the form of a bi-directional ptmp wireless link, and (iii) third-tier node 106b is shown to be connected downstream to a single fourth-tier node 108 (fourth-tier node 108h) via an inter-tier wireless link that takes the form of a bi-directional ptmp wireless link. In this respect, each of third-tier nodes 106g, 106d, and 106b may additionally function to exchange bi-directional network traffic with one or more fourth-tier nodes 108, which may take the form of individual network traffic that originates from or is destinated to the one or more fourth-tier nodes 108.

Additionally yet, each of the third-tier nodes 106a, 106b, 106c, 106d, 106e, 106f, and 106g (or at least a subset thereof) may function to deliver the high-speed internet service to the residential building hosting the third-tier node, which may enable one or more end-user devices at the residential building to access the high-speed internet service.

While the example mesh-based communication system 100 of FIG. 1A is shown to include six third-tier nodes 106a, 106b, 106c, 106d, 106e, 106f, and 106g, it should also be understood that this is merely for purposes of illustration, and that in practice, the third tier of third-tier nodes 106 could include any number of third-tier nodes—including as little as a single third-tier node. Further, while each of the third-tier nodes 106a, 106b, 106c, 106d, 106e, 106f, and 106g is shown to be connected to a particular set of one or more other wireless communication nodes (e.g., second-tier, third-tier, and/or fourth-tier nodes), it should also be understood that this is merely for purposes of illustration, and that in practice, a third-tier node 106 could be connected to any combination of one or more second-tier, third-tier, and/or fourth-tier nodes. Further yet, while each of at least a subset of the third-tier nodes 106a, 106b, 106c, 106d, 106e, 106f, and 106g is shown to be connected downstream to one or more fourth-tier nodes 108 via a bi-directional ptmp wireless link, it should be understood that a third-tier node 106 could alternatively be connected downstream to one or more fourth-tier nodes 108 via one or more bi-directional ptp wireless links.

Turning lastly to the fourth tier of nodes 108, the example mesh-based communication system 100 of FIG. 1A is shown to include eight fourth-tier nodes 108a, 108b, 108c, 108d, 108e, 108f, 108g, and 108h, each of which is installed at a residential building associated with a customer of the high-speed internet service and is directly connected upstream to a respective third-tier node 106 via a respective bi-direction ptmp wireless link. In particular, (i) fourth-tier nodes 108a, 108b, and 108c are shown to be connected upstream to the third-tier node 106g via an inter-tier wireless link that takes the form of a bi-direction ptmp wireless link, (ii) fourth-tier nodes 108d, 108e, 108f, and 108g are shown to be connected upstream to the third-tier node 106d via an inter-tier wireless link that takes the form of a bi-direction ptmp wireless link, and (iii) fourth-tier node 108h is shown to be connected upstream to the third-tier node 106b via an inter-tier wireless link that takes the form of a bi-direction ptmp wireless link. In this respect, each of fourth-tier nodes 108a, 108b, 108c, 108d, 108e, 108f, 108g, and 108h may function to exchange bi-directional network traffic with a given third-tier node 106, which may take the form of individual network traffic that originates from or is destinated to the fourth-tier node 108.

Further, each of the fourth-tier nodes 108a, 108b, 108c, 108d, 108e, 108f, 108g, and 108h (or at least a subset thereof) may function to deliver the high-speed internet service to the residential building hosting the fourth-tier node, which may enable one or more end-user devices at the residential building to access the high-speed internet service.

While the example mesh-based communication system 100 of FIG. 1A is shown to include eight fourth-tier nodes 108a, 108b, 108c, 108d, 108e, 108f, 108g, and 108h, it should also be understood that this is merely for purposes of illustration, and that in practice, the fourth tier of fourth-tier nodes 108 could include any number of fourth-tier nodes—including as little as a single fourth-tier node (or perhaps no fourth-tier nodes at all in some implementations). Further, while FIG. 1A shows each of the fourth-tier nodes 108a, 108b, 108c, 108d, 108e, 108f, 108g, and 108h being connected to a single third-tier node and no other wireless communication node, it should also be understood that this is merely for purposes of illustration, and that in practice, a fourth-tier node 108 could be connected to one or more other wireless communication nodes as well (e.g., another third-tier node or a downstream fourth-tier node).

In line with the discussion above, each of the bi-directional ptp and ptmp wireless links established between the wireless communication nodes in FIG. 1A may take any of various forms, and in at least one implementation, each of the bi-directional ptp and ptmp wireless links may take the form of a millimeter-wave wireless link that operates and carries traffic at frequencies in a frequency band within the millimeter-wave spectrum, which as noted above may advantageously provide both a high capacity (e.g., at least 1 Gbps) and a low latency (e.g., less than 1 millisecond for ptp wireless links and less than 4 milliseconds for ptmp wireless links). However, the bi-directional ptp and ptmp wireless links may take other forms as well.

Further, in line with the discussion above, the bi-directional wireless links between and among the different tiers of nodes within the example mesh-based communication system 100 of FIG. 1A may have differing levels of capacity (and perhaps also differing maximum lengths). For instance, the ptp wireless links between first-tier nodes 102 and second-tier nodes 104 as well as between peer second-tier nodes 104 may each comprise a high-capacity wireless link having a highest capacity level (e.g., at or near 10 Gbps or perhaps even higher), the ptp wireless links between second-tier nodes 104 and third-tier nodes 106 as well as between peer third-tier nodes 106 may each comprise a high-capacity wireless link having a second highest capacity level (e.g., at or near 2.5 Gbps), and the ptmp wireless links between third-tier nodes 106 and fourth-tier nodes 108 may each comprise a high-capacity wireless link having a third highest capacity level (e.g., at or near 1 Gbps). However, the bi-directional ptp and ptmp wireless links may have different capacity levels as well.

Further yet, in line with the discussion above, the wireless mesh network of the example mesh-based communication system 100 of FIG. 1A may be considered to have two different "layers" (or "segments") of bi-directional wireless links: (1) a ptp layer comprising the mesh of bi-directional ptp wireless links between and among the first-tier nodes, second-tier nodes, and third-tier nodes, and (2) a ptmp layer comprising the bi-directional ptmp wireless links between the third tier of nodes and the fourth tier of nodes. In this respect, the ptp layer of the example mesh-based communication system 100 of FIG. 1A may serve as a "backbone" for the wireless mesh network that is configured to carry network traffic that takes the form of aggregated mesh access traffic (e.g., network traffic that originates from or is destined to multiple different endpoints), whereas the ptmp layer of the example mesh-based communication system 100 of FIG. 1A may serve to extend the mesh of bi-directional ptp wireless links by carrying network traffic that takes the form of individual mesh access traffic (e.g., network traffic intended for an individual endpoint node within the wireless mesh network).

The example mesh-based communication system 100 may include various other communication nodes and/or take various other forms as well.

Figure 1B:
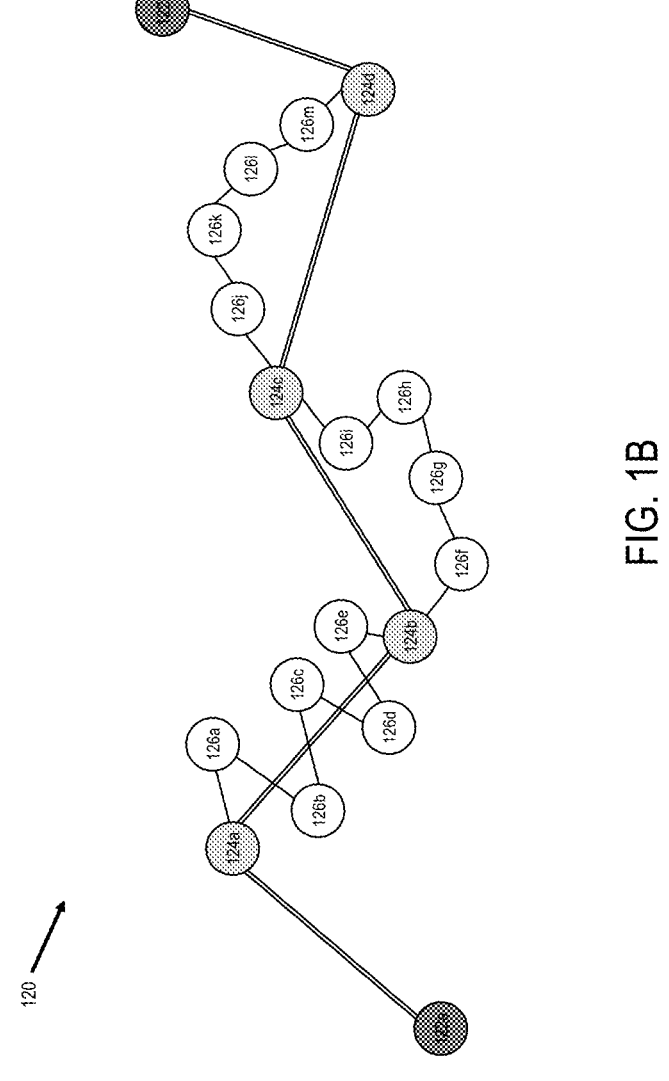
FIG. 1B depicts a simplified illustrative diagram of another example portion of an example mesh-based communication system that may be designed, implemented, and managed in accordance with aspects of the disclosed technology.

FIG. 1B illustrates another simplified example 120 of a portion of a mesh-based communication system designed and implemented in accordance with the present disclosure. As shown, the example mesh-based communication system 120 may include three different tiers of wireless communication nodes that are interconnected together in order to form a wireless mesh network: (i) a first tier of nodes 122 shown in dark gray, (ii) a second tier of nodes 124 shown in light gray, and (iii) a third tier of nodes 126 shown in white. However, it should be understood that the example mesh-based communication system 120 may could be extended to include a fourth tier of wireless communication nodes. In line with the discussion above, each of depicted wireless communication nodes comprises equipment installed at a respective infrastructure site, but to simplify the illustration, the respective infrastructure sites of the nodes are not depicted in FIG. 1B.

As shown in FIG. 1B, this portion of the example mesh-based communication system 120 may include (i) two first-tier nodes 122a and 122b that have high-capacity fiber connectivity to a core network, (ii) a set of four second-tier nodes 124a-d that form a high-capacity, multi-hop pathway comprising a chain of 5 bi-directional ptp wireless links (i.e., a spine) that extends between the two first-tier nodes 122a and 122b and serves to route aggregated network traffic originating from or destined to the core network, where each of the second-tier nodes 124a-d functions to route network traffic in either of two direction along the multi-hop pathway (e.g., either to the left or to the right in FIG. 1B depending on the origin and destination of the network traffic), and (iii) a number of third-tier nodes 126a-m that, together with the second-tier nodes 124a-d, form one or more discrete sub-meshes of bi-directional ptp wireless links for routing aggregated network traffic to and from endpoints in one or more geographic areas, which in FIG. 1B may be co-extensive with the third-tier nodes 126a-m given that the example mesh-based communication system 120 is not shown to include any other downstream nodes such as fourth-tier nodes.

In line with the discussion above, each of the bi-directional ptp wireless links established between the wireless communication nodes in FIG. 1B may take any of various forms, and in at least one implementation, each of the bi-directional ptp wireless links may take the form of a millimeter-wave wireless link that operates and carries traffic at frequencies in a frequency band within the millimeter-wave spectrum. Further, in line with the discussion above, the bi-directional ptp wireless links at different points within the example mesh-based communication system 160 could have differing levels of capacity (and perhaps also differing maximum lengths). For instance, the bi-directional ptp wireless links included in the chain of bi-directional ptp wireless links extending between first-tier nodes 122a and 122b through second-tier nodes 124a-d may each comprise a high-capacity wireless link having a first capacity level (e.g., at or near 10 Gbps or perhaps even higher) and a first maximum length, while the ptp wireless links that form the one or more sub-meshes between and among the second-tier nodes 124 and third-tier nodes 126 may each comprise a high-capacity wireless link having a second capacity level that is lower than the first capacity level (e.g., at or near 2.5 Gbps) and a second maximum length that is lower than the first maximum length. However, the bi-directional wireless links established between the wireless communication nodes in FIG. 1B may take various other forms as well—including but not limited to the possibility that some or all of the bi-directional wireless links between the wireless communication nodes may comprise ptmp wireless links rather than ptp wireless links.

The example mesh-based communication system 120 may include various other communication nodes and/or take various other forms as well.

Figure 1C:
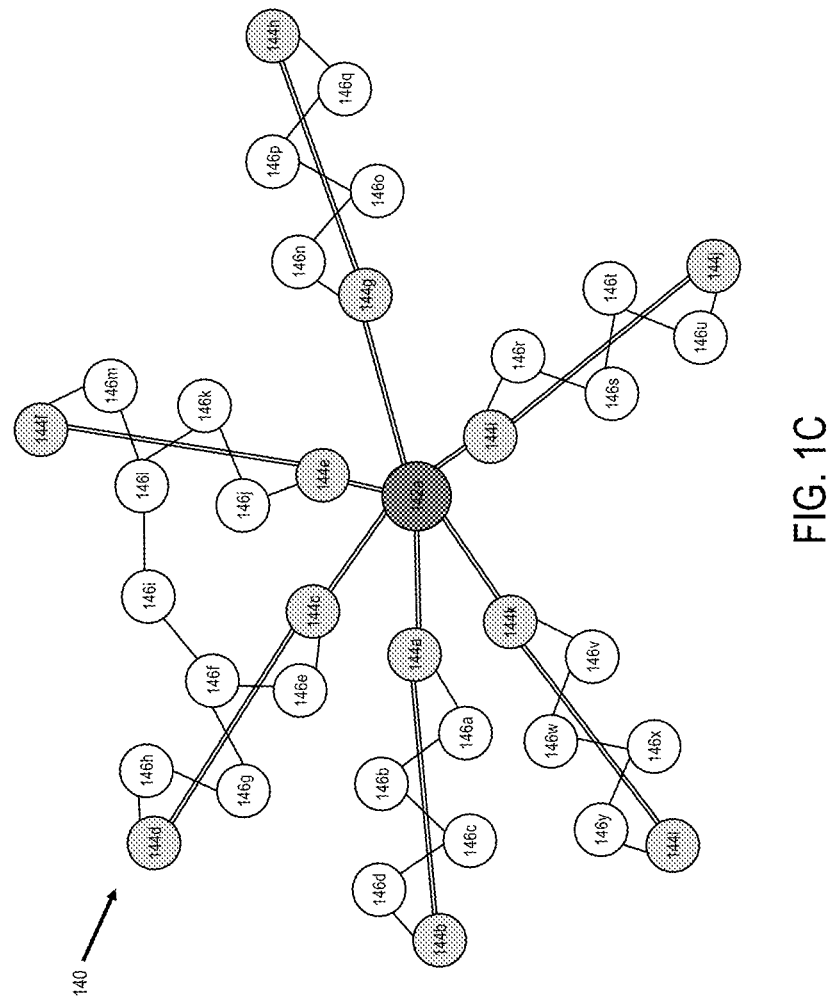
FIG. 1C depicts a simplified illustrative diagram of yet another example portion of an example mesh-based communication system that may be designed, implemented, and managed in accordance with aspects of the disclosed technology.

FIG. 1C illustrates another simplified example 140 of a portion of a mesh-based communication system designed and implemented in accordance with the present disclosure. As shown, similar to the example mesh-based communication system 120 of FIG. 1B, the example mesh-based communication system 140 of FIG. 1C may include three different tiers of wireless communication nodes that are interconnected together in order to form a wireless mesh network: (i) a first tier of nodes 142 shown in dark gray, (ii) a second tier of nodes 144 shown in light gray, and (iii) a third tier of nodes 146 shown in white. However, it should be understood that the example mesh-based communication system 140 could also be extended to include a fourth tier of wireless communication nodes. In line with the discussion above, each of the depicted nodes comprises equipment installed at a respective infrastructure site, but to simplify the illustration, the respective infrastructure sites of the nodes are not depicted in FIG. 1C.

As shown in FIG. 1C, this portion of the example mesh-based communication system 140 may include (i) one first-tier node 142a that has high-capacity fiber connectivity to a core network, (ii) six different subsets of second-tier nodes 144 (e.g., 144a-b, 144c-d, 144e-f, 144g-h, 144i-j, and 144k-1) that form six high-capacity, multi-hop pathways extending from first-tier node 142a (i.e., six "spines"), where each such pathway comprises a chain of bi-directional ptp wireless links, and (iii) a number of third-tier nodes 146a-y that, together with the second-tier nodes 144a-1, form discrete sub-meshes of bi-directional ptp wireless links for routing aggregated network traffic to and from endpoints in one or more geographic areas, which in FIG. 1C may be co-extensive with the third-tier nodes 146a-y given that the example mesh-based communication system 140 is not shown to include any other downstream nodes such as fourth-tier nodes.

As further shown in FIG. 1C, certain of the high-capacity, multi-hop pathways may also be interconnected to one another via a sub-mesh of second-tier 144 and third-tier nodes 146 that extends from second-tier nodes 144 along both pathways. In particular, the two high-capacity, multi-hop pathways formed by second-tier nodes 144c-d and second-tier nodes 144e-f are shown to be interconnected to one another via a sub-mesh comprising those second-tier nodes as well as third-tier nodes 146e-m, which enables bi-directional network traffic originating from or destined to the core network to be exchanged with the third-tier nodes 146e-m in this sub-mesh along either of these two high-capacity pathways and also allows bi-directional network traffic to be exchanged between these two high-capacity pathways, which may provide redundancy, reduce latency, and/or allow load balancing to be applied between the two high-capacity pathways, among other advantages. Although not shown in FIG. 1C, it is also possible that second-tier nodes 144 along different high-capacity pathways may also be directed connected via a ptp wireless link.

In line with the discussion above, each of the bi-directional ptp wireless links established between the wireless communication nodes in FIG. 1C may take any of various forms, and in at least one implementation, each of the bi-directional ptp wireless links may take the form of a millimeter-wave wireless link that operates and carries traffic at frequencies in a frequency band within the millimeter-wave spectrum. Further, in line with the discussion above, the bi-directional ptp wireless links at different points within the example mesh-based communication system 160 could have differing levels of capacity (and perhaps also differing maximum lengths). For instance, the bi-directional ptp wireless links included in each chain of bi-directional ptp wireless links extending from first-tier node 142a through a respective subset of second-tier nodes 144 may each comprise a high-capacity wireless link having a first capacity level (e.g., at or near 10 Gbps or perhaps even higher) and a first maximum length, while the ptp wireless links that form the sub-meshes between and among the second-tier nodes 144 and third-tier nodes 146 may each comprise a high-capacity wireless link having a second capacity level that is lower than the first capacity level (e.g., at or near 2.5 Gbps) and a second maximum length that is lower than the first maximum length. However, the bi-directional wireless links established between the wireless communication nodes in FIG. 1C may take various other forms as well—including but not limited to the possibility that some or all of the bi-directional wireless links between the wireless communication nodes may comprise ptmp wireless links rather than ptp wireless links.

The example mesh-based communication system 140 may include various other communication nodes and/or take various other forms as well.

Figure 1D:
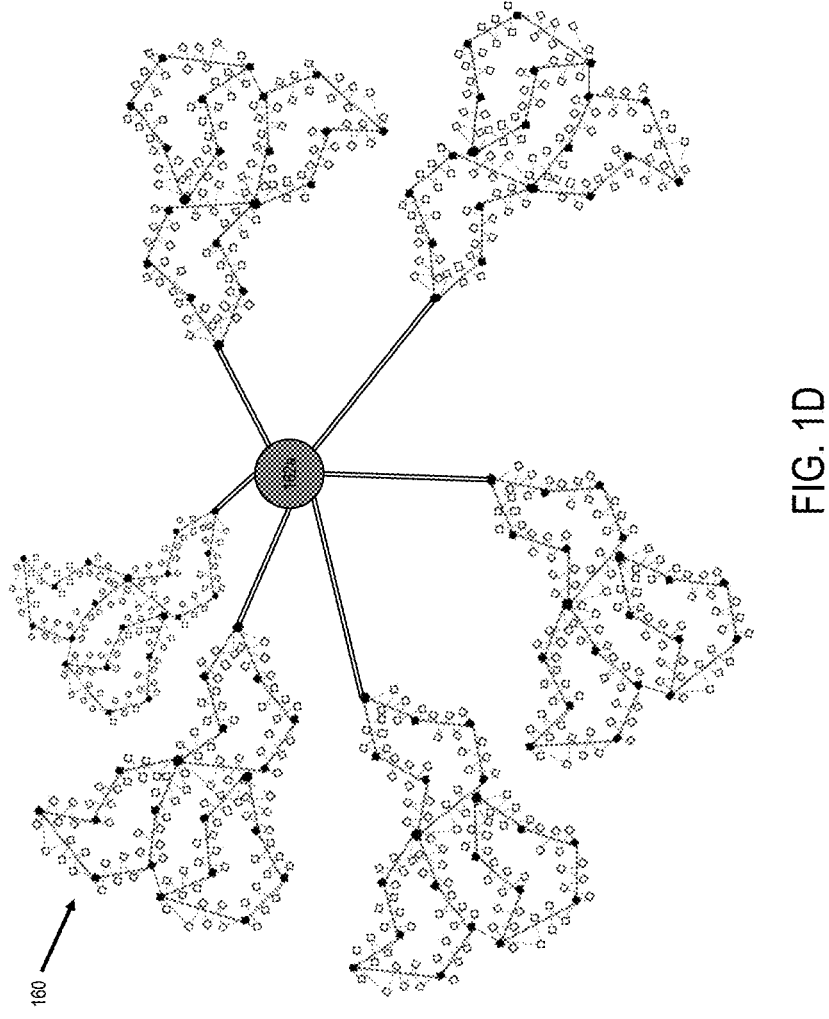
FIG. 1D depicts a simplified illustrative diagram of another example portion of an example mesh-based communication system that may be designed, implemented, and managed in accordance with aspects of the disclosed technology.

FIG. 1D illustrates another simplified example 160 of a portion of a mesh-based communication system designed and implemented in accordance with the present disclosure. As shown, similar to the example mesh-based communication systems 120 and 140 of FIGS. 1B-1C, the example mesh-based communication system 160 of FIG. 1D may include three different tiers of wireless communication nodes that are interconnected together in order to form a wireless mesh network: (i) a first tier of nodes shown in dark gray, (ii) a second tier of nodes shown as black circles or squares, and (iii) a third tier of nodes shown as white squares. However, it should be understood that the example mesh-based communication system 160 could also be extended to include a fourth tier of wireless communication nodes. In line with the discussion above, each of the depicted nodes comprises equipment installed at a respective infrastructure site, but to simplify the illustration, the respective infrastructure sites of the nodes are not depicted in FIG. 1D.

As shown in FIG. 1D, this portion of the example mesh-based communication system 120 may include (i) one first-tier node 162a that has high-capacity fiber connectivity to a core network, (ii) six different clusters of second-tier nodes that form six clusters of high-capacity, multi-hop pathways extending from first-tier node 162a, where each such pathway comprises a chain of bi-directional ptp wireless links and may overlap in part with another pathway in the same cluster (e.g., the first portion of two pathways may comprise the same bi-directional ptp wireless links established by the same second-tier nodes but may then branch out into different directions and thereby form separate but overlapping high-capacity pathways for routing aggregated network traffic originating from or destined to the core network), and (iii) six different clusters of third-tier nodes that, together with the second-tier nodes in the respective clusters, form discrete sub-meshes of bi-directional ptp wireless links for routing aggregated network traffic to and from endpoints in one or more geographic areas, which in FIG. 1D may be co-extensive with the third-tier nodes given that the example mesh-based communication system 160 is not shown to include any other downstream nodes such as fourth-tier nodes.

In line with the discussion above, each of the bi-directional ptp wireless links established between the wireless communication nodes in FIG. 1D may take any of various forms, and in at least one implementation, each of the bi-directional ptp wireless links may take the form of a millimeter-wave wireless link that operates and carries traffic at frequencies in a frequency band within the millimeter-wave spectrum.

Further, in line with the discussion above, the bi-directional ptp wireless links at different points within the example mesh-based communication system 160 could have differing levels of capacity (and perhaps also differing maximum lengths). For instance, in one implementation, the ptp wireless links established between first-tier node 162*a* and a first second-tier node in each subset (shown as a black circle) may each comprise a high-capacity wireless link having a first capacity level (e.g., a capacity greater than 10 Gbps) and a first maximum length (e.g., a length within a range of 1-2 miles), the other ptp wireless links included in each high-capacity pathway extending from first-tier node 162*a* through a respective subset of second-tier nodes may each comprise a high-capacity wireless link having a second capacity level that is lower than the first capacity level (e.g. at or near 10 Gbps) and perhaps also a second maximum length that is lower than the first maximum length, and the ptp wireless links that form the sub-meshes between and among the second-tier nodes and third-tier nodes may each comprise a high-capacity wireless link having a third capacity level that is lower than the first and second capacity levels (e.g. at or near 2.5 Gbps) and perhaps also a third maximum length that is lower than the first and second maximum lengths. However, in other implementations, the first and second capacity levels and/or the first and second maximum lengths could be the same. The bi-directional wireless links established between the wireless communication nodes in FIG. 1D may take various other forms as well—including but not limited to the possibility that some or all of the bi-directional wireless links between the wireless communication nodes may comprise ptmp wireless links rather than ptp wireless links.

Further yet, although not shown in FIG. 1D, the wireless communication nodes in the example mesh-based communication system 160 may be interconnected in other manners as well. For instance, as one possibility, certain second-tier and/or third-tier nodes from the different clusters could be interconnected together via bi-directional ptp wireless links. As another possibility, first-tier node 162*a* could be connected to one or more additional second-tier nodes in a given cluster via one or more bi-directional ptp wireless links, such as second-tier node that is situated at different place within the cluster, which may provide redundancy, reduce latency, and/or allow load balancing to be applied for aggregated network traffic between the given cluster and first-tier node 162*a*, among other advantages. In such an implementation, it is possible that, in order to reach an additional second-tier node in a cluster, the additional bi-directional ptp wireless link between first-tier node 162*a* and the additional second-tier node may need to exceed a maximum length threshold at which bi-directional ptp wireless link is expected to reliably carry network traffic and may be liable to degrade below and acceptable in certain scenarios (e.g., when certain environmental conditions such as rain or snow are present), in which case first-tier node 162*a* and a given subset of the second-tier and third-tier nodes in the given cluster may function to exchange network traffic utilizing the bi-directional ptp wireless link with the additional second-tier node in the given cluster when it is available and to exchange network traffic utilizing the bi-directional ptp wireless link with the first second-tier node in the given cluster.

The example mesh-based communication system 160 may include various other communication nodes and/or take various other forms as well.

II. Wireless Communication Nodes

As discussed above, each wireless communication node in a mesh-based communication system may comprise respective equipment for operating as part of the wireless mesh network that has been installed at a respective infrastructure site. For instance, as discussed above, a wireless communication node may include (i) wireless mesh equipment for establishing and communicating over one or more bi-directional ptp and/or ptmp wireless links with one or more other wireless communication nodes, (ii) networking equipment that facilitates communication between the node's wireless mesh equipment and other devices or systems located at the node's infrastructure site, and (iii) power equipment for supplying power to the node's wireless mesh equipment and/or the node's networking equipment, among other possibilities.

Figure 2A:
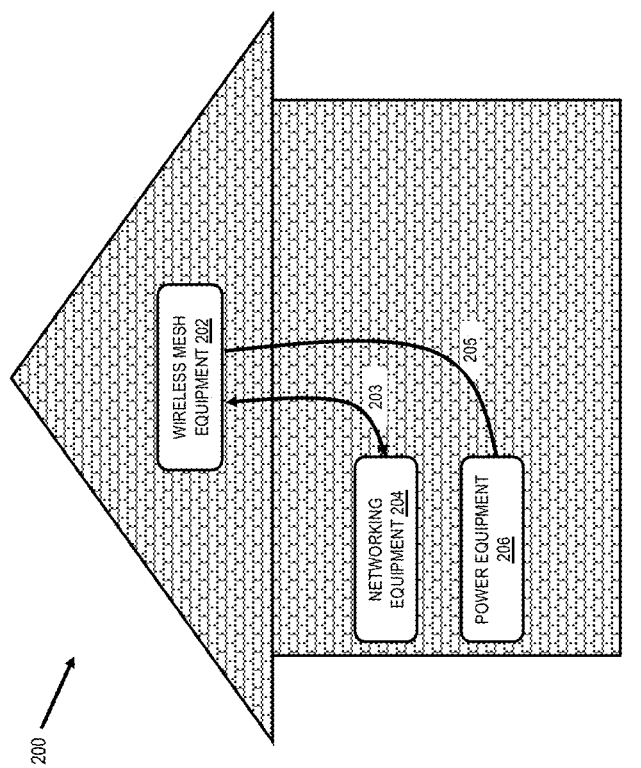
FIG. 2A depicts an example wireless communication node of an example mesh-based communication system in accordance with aspects of the disclosed technology.

One illustrative example of a wireless communication node 200 in a mesh-based communication system is depicted in FIG. 2A. As shown in FIG. 2A, the example wireless communication node 200 comprises equipment installed at commercial or residential building (among other possible examples of an infrastructure site) that takes the form of (i) wireless mesh equipment 202 installed on a roof of the building, (ii) networking equipment 204 installed inside the building that is connected to wireless mesh equipment 202 via a communication link 203, and (iii) power equipment 206 installed inside the building that is connected to the wireless mesh equipment 202 (and perhaps also the networking equipment 204) via a power cable 205. Although not shown, the example wireless communication node 200 may comprise other types of equipment installed at an infrastructure site as well.

In line with the discussion above, the wireless mesh equipment 202 may generally comprise equipment for establishing and communicating over one or more bi-directional ptp and/or ptmp wireless links with one or more other wireless communication nodes of a wireless mesh network. Such wireless mesh equipment 202 may take any of various forms, which may depend in part on where the wireless communication node 200 is situated within a mesh-based communication system's architecture. However, at a high level, the wireless mesh equipment 202 for each wireless communication node of a mesh-based communication system may include at least (i) one or more wireless radios and (ii) at least one network processing unit (NPU).

The example wireless communication node's one or more wireless radios may each comprise a ptp or ptmp radio that is generally configured to establish a respective bi-directional ptp or ptmp wireless link with at least one other ptp or ptmp radio and then wirelessly transmit and receive network traffic over the respective bi-directional ptp or ptmp wireless link. For instance, the node's one or more wireless radios may comprise (i) one or more ptp radios that are each configured to establish and wirelessly exchange bi-directional network traffic over a respective bi-directional ptp wireless link, (ii) one or more ptmp radios that are each configured to establish and wirelessly exchange bi-directional network traffic over a respective bi-directional ptmp wireless link, or (iii) some combination of one or more ptp radios and one or more ptmp radios.

To illustrate with an example in the context of the example mesh-based communication system 100 of FIG. 1A, (i) a first subset of the wireless communication nodes may be equipped with one or more ptp radios only, including first-tier nodes 102*a* and 102*b* (one ptp radio each), second-tier nodes 104*a* and 104*b* (two ptp radios each), second-tier node 104*c* (three ptp radios), and third-tier nodes 106*a* (three ptp radios), 106*c* (one ptp radio), 106*e* (one ptp radio), and 106*f* (two ptp radios), (ii) a second subset of the wireless communication nodes may be equipped with a combination of one or more ptp radios and one or more ptmp radios, including third-tier node 106*b* (two ptp radios and one ptmp radio), third-tier node 106*d* (one ptp radio and one ptmp radio), and third-tier node 106*g* (one ptp radio and one ptmp radio), and (iii) a third subset of the wireless communication nodes may be equipped with one or more ptmp radios only, including each of the fourth-tier nodes 108.

In turn, the example wireless communication node's at least one NPU may generally be configured to perform various functions in order to facilitate the node's operation as part of the wireless mesh network. For instance, as one possibility, the node's at least one NPU may be configured to process network traffic that is received from one or more other wireless communication nodes via the node's one or more wireless radios (e.g., by performing baseband processing) and then cause that received network traffic to be routed in the appropriate manner. For example, if the received network traffic comprises aggregated network traffic destined for another endpoint, the node's at least one NPU may process the received network traffic and then cause the node's one or more wireless radios to transmit the received network traffic to the one or more other wireless communication nodes. As another example, if the received network traffic comprises individual network traffic destined for an end-user device within the building, the node's at least one NPU may process the received network traffic and then cause it to be delivered to the end-user device via the node's networking equipment 204. As yet another example, if the node 200 comprises a first-tier node and the received network traffic comprises aggregated network traffic that is to be sent over a wired link between the first-tier node and the core network, the node's at least one NPU may process the received network traffic and then cause it to be sent to the core network over the fiber link between the first-tier node and the core network (e.g., via the node's networking equipment 204 or via a core-network interface included within the at least one NPU itself). As still another example, if the received network traffic comprises network traffic destined for a wired communication node connected to the node 200, the node's at least one NPU may process the received network traffic and then cause it to be sent to the wired communication node over the wired link between the node 200 and the wired communication node (e.g., either via the node's networking equipment 204 or via a wired interface included within the at least one NPU itself). The at least one NPU's processing and routing of network traffic that is received from one or more other wireless communication nodes via the node's one or more wireless radios may take other forms as well.

As another possibility, the node's at least one NPU may be configured to process network traffic that is received from the node's networking equipment 204 (e.g., by performing baseband processing) and then cause that received network traffic to be routed in the appropriate manner. For example, if the network traffic received from the node's networking equipment 204 comprises network traffic that originated from an end-user device within the building, the node's at least one NPU may process the received network traffic and then cause the node's one or more wireless radios to transmit the received network traffic to the one or more other wireless communication nodes. As another example, if the node 200 comprises a first-tier node and the network traffic received from the node's networking equipment 204 comprises network traffic that was received over a fiber link with the core network, the node's at least one NPU may process the received network traffic and then cause the node's one or more wireless radios to transmit the received network traffic to the one or more other wireless communication nodes. As yet another example, if the network traffic received from the node's networking equipment 204 comprises network traffic that was received over a wired link with a wired communication link, the node's at least one NPU may process the received network traffic and then cause the node's one or more wireless radios to transmit the received network traffic to the one or more other wireless communication nodes. Other examples are possible as well.

As yet another possibility, the node's at least one NPU may be configured to engage in communication with a centralized computing platform, such as a network management system (NMS) or the like, in order to facilitate any of various network management operations for the mesh-based communication system. For instance, the node's at least one NPU may be configured to transmit information about the configuration and/or operation of the node to the centralized platform via the wireless mesh network and/or receive information about the configuration and/or operation of the node from the centralized platform via the wireless mesh network, among other possibilities.

The example wireless communication node's at least one NPU may be configured to perform other functions in order to facilitate the node's operation as part of the wireless mesh network as well.

In a preferred embodiment, a wireless communication node's at least one NPU may comprise one centralized NPU that is physically separate from the node's one or more wireless radios and interfaces with each of the node's one or more wireless radios via a respective wired link that extends from the centralized NPU to each physically-separate wireless radio, which may take the form of a copper-based wired link (e.g., a coaxial cable, Ethernet cable, a serial bus cable, or the like) or a fiber-based wired link (e.g., a glass optical fiber cable, a plastic optical fiber cable, or the like). To illustrate with an example, if a wireless communication node's wireless mesh equipment 200 includes three wireless radios, such a centralized NPU may connect to a first one of the wireless radios via a first wired link, connect to a second one of the wireless radios via a second wired link, and connect to a third one of the wireless radios via a third wired link. Many other examples are possible as well. In such embodiment, the centralized NPU may be housed in one enclosure, and each of the one or more wireless radios may be housed in a separate enclosure, where each such enclosure may be designed for outdoor placement (e.g., on a roof of a building) and the wired links may likewise be designed for outdoor placement. However, other physical arrangements are possible as well.

In other embodiments, a wireless communication node's at least one NPU may comprise one centralized NPU that is included within the same physical housing as the node's one or more wireless radios and interfaces with each of the node's one or more wireless radios via a respective wired link that extends from the centralized NPU to each wireless radio within the shared housing, which may take the form of a copper-based wired link (e.g., a coaxial cable, Ethernet cable, serial bus cable, or the like) or a fiber-based wired link (e.g., a glass optical fiber cable, a plastic optical fiber cable, or the like). In such embodiment, the centralized NPU and the one or more wireless radios may all be housed in a single enclosure, which may be designed for outdoor placement (e.g., on a roof of a building). However, other physical arrangements are possible as well.

In still other embodiments, instead of a centralized NPU, a wireless communication node's at least one NPU could comprise a collection of radio-specific NPUs that are each integrated into a respective one of the node's one or more wireless radios, in which case the collection of radio-specific NPUs may be interconnected with one another in some manner (e.g., via wired links) and may coordinate with one another in order to carry out the NPU functionality described above for the wireless communication node 200. In such embodiment, each of the one or more wireless radios may be housed in a separate enclosure, where each such enclosure may be designed for outdoor placement (e.g., on a roof of a building). However, other physical arrangements are possible as well.

Other embodiments of the example wireless communication node's at least one NPU may be possible as well—including but not limited to embodiments in which the example wireless communication node includes multiple physically-separate, centralized NPUs that collectively interface with the node's one or more wireless radios and are configured to collectively carry out the NPU functionality described above for the wireless communication node 200 (e.g., in scenarios where additional processing power is needed).

Figure 2B:
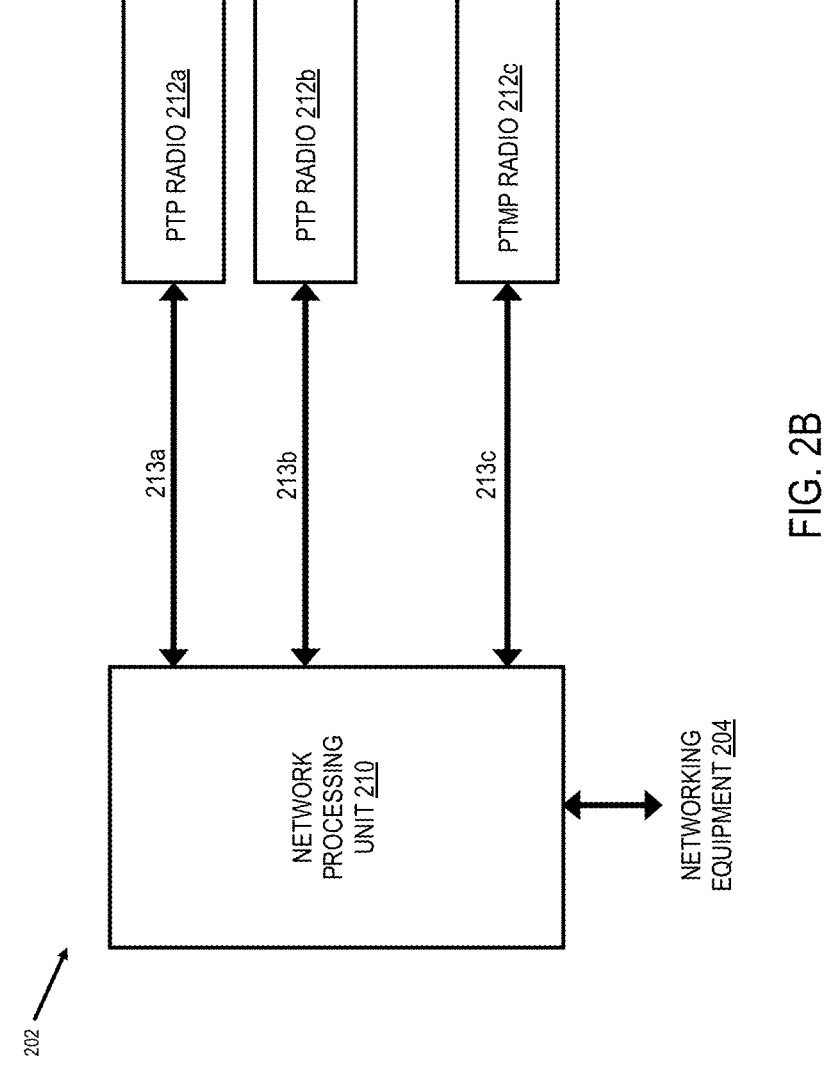
FIG. 2B depicts a block diagram of example wireless mesh equipment that may be included in the example wireless communication node of FIG. 2A in accordance with aspects of the disclosed technology.

One illustrative example of the wireless mesh equipment 202 of FIG. 2A is depicted in FIG. 2B. As shown in FIG. 2B, the example wireless mesh equipment 202 may include a centralized NPU 210 that is connected to multiple physically-separate wireless radios 212 via respective wired links 213, which are shown to include (i) a first ptp radio 212a that is connected to centralized NPU 210 via a first wired link 213a, (ii) a second ptp radio 212b that is connected to centralized NPU 210 via a second wired link 213b, and (iii) a ptmp radio 212c that is connected to centralized NPU 210 via a third wired link 213c. In practice, such an arrangement of wireless radios may be most applicable to a third-tier node that is connected to two second-tier and/or peer third-tier nodes via two bi-directional ptp wireless links and is also connected to one or more fourth-tier nodes via a bi-directional ptmp wireless link. However, as discussed above, the example wireless mesh equipment 202 could include any number of ptp and/or ptmp radios, which may depend in part on where the example wireless communication node 200 is situated with the mesh-based communication system's architecture.

Figure 2C:
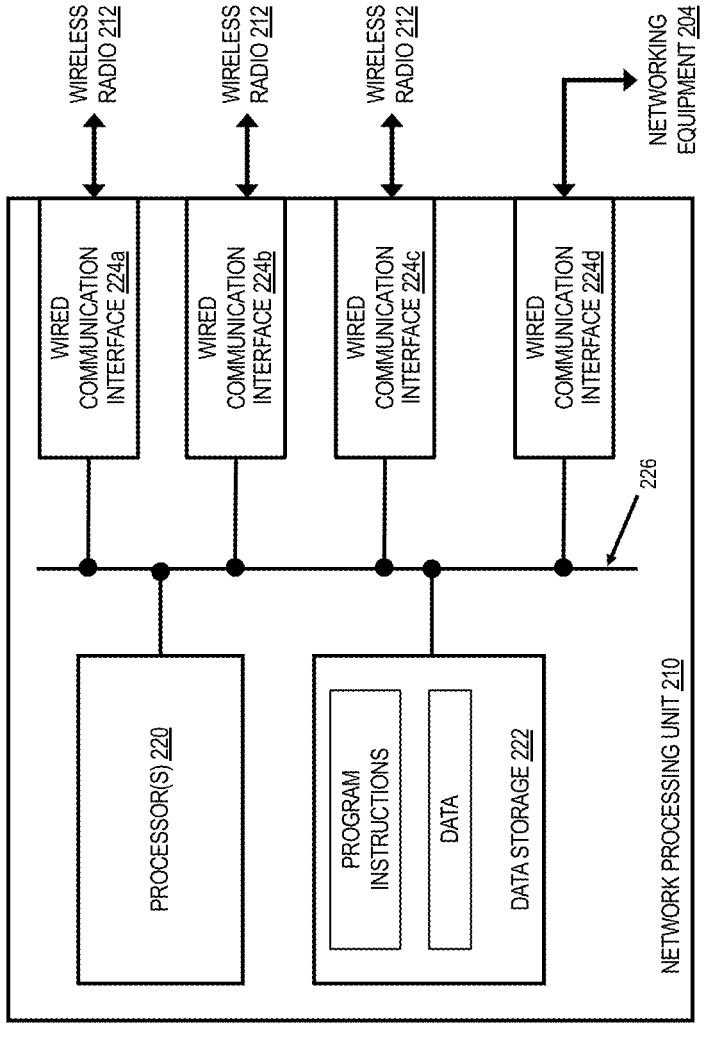
FIG. 2C depicts a block diagram of an example network processing unit of the example wireless communication node of FIG. 2A in accordance with aspects of the disclosed technology.

In general, centralized NPU 210 may comprise a set of compute resources (e.g., one or more processors and data storage) that is installed with executable program instructions for carrying out the NPU functions discussed above, along with a set of communication interfaces that are configured to facilitate the centralized NPU's communication with the wireless radios 212 and the node's network equipment 204. One possible example of such a centralized NPU 210 is depicted in FIG. 2C. As shown in FIG. 2C, example centralized NPU 210 may include one or more processors 220, data storage 222, and a set of communication interfaces 224, all of which may be communicatively linked by a communication link 226 that may take the form of a system bus, a communication network such as a public, private, or hybrid cloud, or some other connection mechanism. Each of these components may take various forms.

The one or more processors 220 may each comprise one or more processing components, such as general-purpose processors (e.g., a single- or a multi-core central processing unit (CPU)), special-purpose processors (e.g., a graphics processing unit (GPU), application-specific integrated circuit, or digital-signal processor), programmable logic devices (e.g., a field programmable gate array), controllers (e.g., microcontrollers), and/or any other processor components now known or later developed.

In turn, the data storage 222 may comprise one or more non-transitory computer-readable storage mediums that are collectively configured to store (i) program instructions that are executable by one or more processors 220 such that centralized NPU 210 is configured to perform any of the various NPU functions disclosed herein, and (ii) data that may be received, derived, or otherwise stored, for example, in one or more databases, file systems, repositories, or the like, by centralized NPU 210, in connection with performing any of the various functions disclosed herein. In this respect, the one or more non-transitory computer-readable storage mediums of the data storage 222 may take various forms, examples of which may include volatile storage mediums such as random-access memory, registers, cache, or the like, and non-volatile storage mediums such as read-only memory, a hard-disk drive, a solid-state drive, flash memory, an optical-storage device, or the like, among other possibilities. It should also be understood that certain aspects of the data storage 222 may be integrated in whole or in part with the one or more processors 220.

Turning now to the set of communication interfaces 224, in general, each such communication interface 224 may be configured to facilitate wireless or wired communication with some other aspect of the example wireless communication node's equipment, such as a wireless radio 212 or the node's network equipment 204. For instance, FIG. 2C shows the set of communication interfaces 224 of the centralized NPU 210 to include at least (i) a first wired communication interface 224a for interfacing with a first wireless radio 212 via a first wired link, (ii) a second wired communication interface 224b for interfacing with a second wireless radio 212 via a second wired link, (iii) a third wired communication interface 224c for interfacing with a third wireless radio 212 via a third wired link, and (iv) a fourth wired communication interface 224d for interfacing with the node's networking equipment 204 via a fourth wired link. However, the set of communication interfaces 224 may include various other arrangements of wired interfaces as well, including more or fewer communication interfaces for wireless radios and/or other communication interfaces for networking equipment. In line with the discussion above, each of these wired communication interfaces 224 may take any of various forms, examples of which may include a coaxial interface, an Ethernet interface, a serial bus interface (e.g., PCI/PCIe, Firewire, USB, Thunderbolt, etc.), a glass optical fiber interface, or a plastic optical fiber interface, among other possibilities. Further, in some embodiments, certain of these wired communication interfaces 224 could be replaced with a wireless communication interface, which may take the form of a chipset and antenna adapted to facilitate wireless communication according to any of various wireless protocols (e.g., Wi-Fi or point-to-point protocols). Further yet, if the node 200 is a first-tier node, the set of communication interfaces 224 may include an additional wired interface for communicating with the core network, which may take any of various forms, including but not limited to an SFP/SFP+ interface. The set of communication interfaces 224 may include other numbers of wired communication interfaces and/or may take various other forms as well.

Although not shown in FIG. 2C, centralized NPU 210 may also include or have an interface for connecting to one or more user-interface components that facilitate user interaction with centralized NPU 210, such as a keyboard, a mouse, a trackpad, a display screen, a touch-sensitive interface, a stylus, a virtual-reality headset, and/or one or more speaker components, among other possibilities.

Example centralized NPU 210 may include various other components and/or take various other forms as well.

Figure 2D:
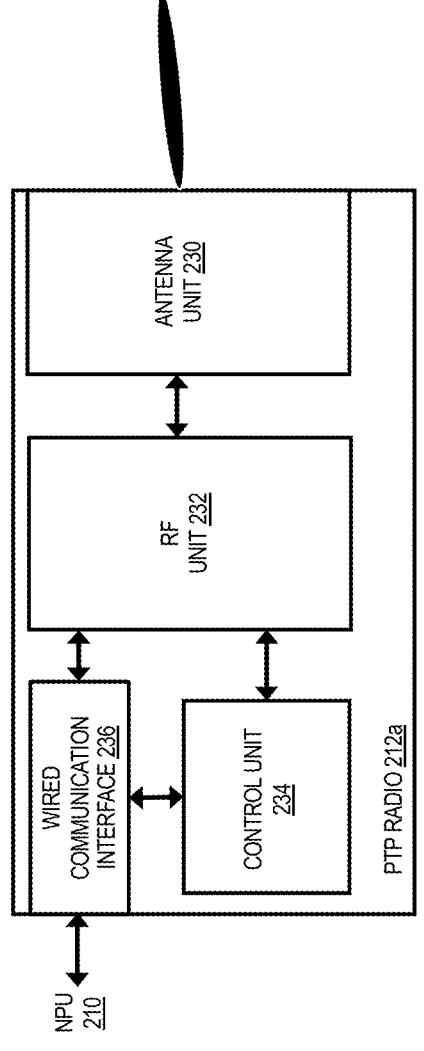
FIG. 2D depicts a block diagram of example components that may be included in an example point-to-point radio of the example wireless communication node of FIG. 2A in accordance with aspects of the disclosed technology.

Returning to FIG. 2B, in general, each ptp radio included within the example wireless communication equipment 202 (e.g., each of ptp radios 212a and 212b) may include components that enable the ptp radio to establish a bi-directional ptp wireless link with another ptp radio and then wirelessly transmit and receive network traffic over the established bi-directional ptp wireless link with another wireless communication node. These components may take any of various forms. One possible example of the components that may be included in an example ptp radio, such as ptp radio 212a, is depicted in FIG. 2D. As shown in FIG. 2D, example ptp radio 212a may include at least (i) an antenna unit 230, (ii) a radio frequency (RF) unit 232, (iii) a control unit 234, and (iv) a wired communication interface 236, among other possible components. Each of these components may take various forms.

The antenna unit 230 of example ptp radio 212a may generally comprise a directional antenna that is configured to transmit and receive directional radio signals having a particular beamwidth, which may take any of various forms in accordance with the present disclosure. For instance, as one possibility, the beamwidth of the directional radio signals that are transmitted and received by the example ptp radio's antenna unit 230 may have a beamwidth considered to be extremely narrow, such as a 3 dB-beamwidth in both the horizontal and vertical directions that is less than 5 degrees, or in some cases, even less than 1 degree. As another possibility, the beamwidth of the directional radio signals that are transmitted and received by the example ptp radio's antenna unit 230 may have a beamwidth that is considered to be narrow, but not necessary extremely narrow, such as a 3 dB-beamwidth in both the horizontal and vertical directions that is within a range of 5 degrees and 10 degrees. As yet another possibility, the beamwidth of the directional radio signals that are transmitted and received by the example ptp radio's antenna unit 230 could have a beamwidth that is wider than these narrower ranges, a 3 dB-beamwidth that is greater than 10 degrees.

Further, the example ptp radio's antenna unit 230 may take any of various forms. For instance, in one implementation, the example ptp radio's antenna unit 230 may take the form of a parabolic antenna that comprises a parabolic reflector (sometimes also referred to as a parabolic dish or mirror). In another implementation, the example ptp radio's antenna unit 230 may take the form of a lens antenna. In yet another implementation, the example ptp radio's antenna unit 230 may take the form of a phased array antenna that comprises multiple individual antenna elements arranged in an array, in which case the antenna unit 230 may also include or be combined with a beam-narrowing unit (e.g., one or more lens or parabolic antennas) that is configured to narrow the beamwidth of the radio signals being output by the phased array antenna by consolidating the radio signals output by the individual antenna elements into a composite radio signal having a narrower beam. In such an implementation, the antenna elements of the phased array antenna could either all have the same polarization, or could comprise different subsets of antenna elements having different polarizations (e.g., a first subset of antenna elements having a first polarization and a second subset of antenna elements having a second polarization). In some implementations, the example ptp radio's antenna unit 230 may also be constructed from metamaterials. The example ptp radio's antenna unit 230 may take various other forms as well.

Further yet, in at least some implementations (e.g., implementations where the antenna unit 230 takes the form of a phased array antenna, the example ptp radio's antenna unit 230 may also have the capability to electronically change the direction of the radio signals being transmitted and received by the antenna unit 230, which is commonly referred to as "beamsteering" or "beamforming." An antenna unit having beamsteering capability may provide advantages over other types of antenna units that only have the capability to transmit and receive directional radio signals in a fixed direction and thus require physical repositioning in order to change the direction of the radio signals being transmitted and received by the antenna unit 230, but an antenna unit having beamsteering capability may also increase the complexity and cost of the antenna unit 230, so these factors should typically be balanced when deciding whether to employ an antenna unit having beamsteering capability.

The antenna unit 230 could take other forms and/or perform other functions as well.

The RF unit 232 of example ptp radio 212a may generally be configured to serve as the interface between centralized NPU 210 and the antenna unit 232. In this respect, the RF unit 232 may comprise one or more chains of components for performing functions such as digital-analog conversion (DAC), analog-to-digital conversion (ADC), amplification functions (e.g., power amplification, low-noise amplification, etc.), and/or filtering functions (e.g., bandpass filtering), among other possible functions carried out by the example ptp radio's RF unit 232 in order to translate the digital data received from centralized NPU 210 into radio signals for transmission by the antenna unit 230 and translate the radio signals received by the antenna unit 230 into digital data for processing by the centralized NPU 210. The RF unit 232 could take other forms and/or perform other functions as well.

The control unit 234 of example ptp radio 212a may generally comprise a hardware component (e.g., a micro-controller) programmed with executable program instructions for controlling the configuration and operation of the antenna unit 230 via the RF unit 232. For instance, the example ptp radio's control unit 234 may function to control the activation state of the RF unit 232, which may in turn control the activation state of the antenna unit 230, among other possible control functions carried out by the control unit 234. Further, the control functions carried out by the control unit 234 may be based at least in part on instructions that are received from centralized NPU 210 via the example ptp radio's wired communication interface 236. The control unit 234 could take other forms and/or perform other functions as well.

The wired communication interface 236 of example ptp radio 212a may facilitate wired communication between example ptp radio 212a and centralized NPU 210 over a wired link. In line with the discussion above, this wired communication interface 236 may take any of various forms, examples of which may include a coaxial interface, an Ethernet interface, a serial bus interface (e.g., PCI/PCIe, Firewire, USB, Thunderbolt, etc.), a glass optical fiber interface, or a plastic optical fiber interface, among other possibilities. In a scenario where the wired communication interface 236 takes the form of a fiber optic interface, example ptp radio 212a may also further include an optical-to-RF converter (e.g., a high-speed photo detector) for converting optical signals received from centralized NPU 210 into RF signals and an RF-to-optical converter (e.g., a plasmonic modulator) for converting RF signals that are to be sent to centralized NPU 210 into optical signals, each of which may be implemented as an integrated circuit (IC) or the like. Further, in some embodiments, the wired communication interface 236 could be replaced with a wireless communication interface, which may take the form of a chipset and antenna adapted to facilitate wireless communication with centralized NPU 210 according to any of various wireless protocols (e.g., Wi-Fi or point-to-point protocols). The wired communication interface 236 may take other forms and/or perform other functions as well.

Example ptp radio 212a may take various other forms as well, including but not limited to the possibility that example ptp radio 212a may include other components in addition to the illustrated components and/or that certain of the illustrated components could be omitted or replaced with a different type of component.

Figure 2E:
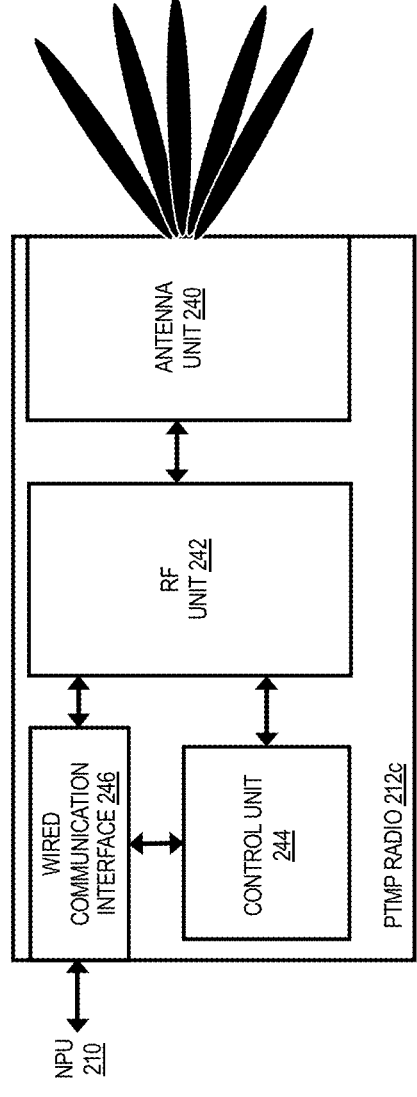
FIG. 2E depicts a block diagram of example components that may be included in an example point-to-multipoint radio of the example wireless communication node of FIG. 2A in accordance with aspects of the disclosed technology.

Returning again to FIG. 2B, in general, each ptmp radio included within the example wireless communication equipment 202 (e.g., ptp radio 212c) may include components that enable the ptmp radio to establish a bi-directional ptmp wireless link with one or more other ptmp radios and then wirelessly transmit and receive network traffic over the established bi-directional ptmp wireless link with one or more other wireless communication. These components may take any of various forms. One possible example of the components that may be included in an example ptmp radio, such as ptmp radio 212c, is depicted in FIG. 2E. As shown in FIG. 2E, example ptmp radio 212c may include at least (i) an antenna unit 240, (ii) an RF unit 242, (iii) a control unit 244, and (iv) a wired communication interface 246, among other possible components. Each of these components may take various forms.

The antenna unit 240 of example ptmp radio 212c may generally comprise a semi-directional antenna that is configured to transmit and receive semi-directional radio signals having a particular beamwidth, which may take any of take various forms in accordance with the present disclosure. For instance, as one possibility, the beamwidth of the semi-directional radio signals that are transmitted and received by the example ptmp radio's antenna unit 240 may have a beamwidth in the horizontal direction that is within a range of 60 degrees to 180 degrees (e.g., 120 degrees), which defines a coverage area of example ptmp radio 212c that is sometimes referred to as a "sector." As another possibility, the beamwidth of the semi-directional radio signals that are transmitted and received by the example ptmp radio's antenna unit 240 may have a beamwidth in the horizontal direction that is either less than 60 degrees (in which case the wireless communication node's ptmp coverage area would be smaller) or greater than 180 degrees (in which case the wireless communication node's ptmp coverage area would be larger).

Further, the example ptmp radio's antenna unit 240 may take any of various forms. For instance, in one implementation, the example ptmp radio's antenna unit 240 may take the form of a phased array antenna that comprises multiple individual antenna elements arranged in an array. In such an implementation, the antenna elements of the phased array antenna could either all have the same polarization, or could comprise different subsets of antenna elements having different polarizations (e.g., a first subset of antenna elements having a first polarization and a second subset of antenna elements having a second polarization). In some implementations, the example ptmp radio's antenna unit 240 may also be constructed from metamaterials. The example ptmp radio's antenna unit 240 may take various other forms as well.

Further yet, in at least some implementations, the example ptmp radio's antenna unit 240 may also have the capability to electronically change the direction of the radio signals being transmitted and received by the antenna unit 240, which as noted above is commonly referred to as "beam-steering" or "beamforming."

The antenna unit 240 could take other forms and/or perform other functions as well.

The RF unit 242 of example ptmp radio 212c may generally be configured to serve as the interface between centralized NPU 210 and the antenna unit 242. In this respect, the RF unit 242 may comprise one or more chains of components for performing functions such as DAC, ADC, amplification functions (e.g., power amplification, low-noise amplification, etc.), and/or filtering functions (e.g., bandpass filtering), among other possible functions carried out by the example ptmp radio's RF unit 242 in order to translate the digital data received from centralized NPU 210 into radio signals for transmission by the antenna unit 240 and translate the radio signals received by the antenna unit 240 into digital data for processing by the centralized NPU 210. The RF unit 242 could take other forms and/or perform other functions as well.

The control unit 244 of example ptmp radio 212c may generally comprise a hardware component (e.g., a micro-controller) programmed with executable program instructions for controlling the configuration and operation of the antenna unit 240 via the RF unit 242. For instance, the example ptmp radio's control unit 244 may function to control the activation state of the RF unit 242, which may in turn control the activation state of the antenna unit 240, among other possible control functions carried out by the control unit 244. Further, the control functions carried out by the control unit 244 may be based at least in part on instructions that are received from centralized NPU 210 via the example ptp radio's wired communication interface 246. The control unit 244 could take other forms and/or perform other functions as well.

The wired communication interface 246 of example ptmp radio 212c may facilitate wired communication between example ptmp radio 212c and centralized NPU 210 over a wired link. In line with the discussion above, this wired communication interface 246 may take any of various forms, examples of which may include a coaxial interface, an Ethernet interface, a serial bus interface (e.g., PCI/PCIe, Firewire, USB, Thunderbolt, etc.), a glass optical fiber interface, or a plastic optical fiber interface, among other possibilities. In a scenario where the wired communication interface 246 takes the form of a fiber optic interface, example ptmp radio 212c may also further include an optical-to-RF converter (e.g., a high-speed photo detector) for converting optical signals received from centralized NPU 210 into RF signals and an RF-to-optical converter (e.g., a plasmonic modulator) for converting RF signals that are to be sent to centralized NPU 210 into optical signals, each of which may be implemented as an IC or the like. Further, in some embodiments, the wired communication interface 246 could be replaced with a wireless communication interface, which may take the form of a chipset and antenna adapted to facilitate wireless communication with centralized NPU 210 according to any of various wireless protocols (e.g., Wi-Fi or point-to-point protocols). The wired communication interface 246 may take various other forms as well.

Example ptmp radio 212c may include various other components and/or take various other forms as well.

Returning once more to FIG. 2B, in line with the discussion above, the wired links 213a-c between centralized NPU 210 and the wireless radios 212 may take any of various forms. For instance, as one possibility, the wired links 213a-c between centralized NPU 210 and the wireless radios 212 may each comprise a copper-based wired link, such as a coaxial cable, an Ethernet cable, or a serial bus cable, among other examples. As another possibility, the wired links 213a-c between centralized NPU 210 and the wireless radios 212 may each comprise a fiber-based wired link, such as a glass optical fiber cable or a plastic optical fiber cable, among other examples. In line with the discussion above, wired links 213a-c may also be designed for outdoor placement. The wired links 213a-c could take other forms as well.

Further, the wired links 213a-c between centralized NPU 210 and the wireless radios 212 may have any of various capacities, which may depend in part on the type of wired link. In a preferred implementation, the wired links 213a-c may each have a capacity that is at least 1 Gbps and is perhaps even higher (e.g., 2.5 Gbps, 5 Gbps, 10 Gbps, etc.). However, in other implementations, the wired links 213a-c may each have a capacity that is below 1 Gbps.

Further yet, the wired links 213a-c between centralized NPU 210 and the wireless radios 212 may have any of various lengths, which may depend in part on the type of wired link. As examples, the wired links 213a-c could have each a shorter length of less than 1 foot (e.g., 3-6 inches), an intermediate length ranging from 1 foot to a few meters (e.g., 3 meters), or a longer length of 5-10 meters or greater, among various other possibilities.

While FIG. 2B shows one illustrative example of the node's wireless mesh equipment 202, as discussed above, various other implementations of the node's wireless mesh equipment 202 are possible as well.

Now returning to FIG. 2A, the node's networking equipment 204 may generally comprise any one or more networking devices that facilitate network communications between the wireless mesh equipment 202 and other devices or systems, which may include end-user devices within the building and perhaps also wired communication nodes and/or the core network (if the node 200 is a first-tier node and core-network communications are routed through the networking equipment 204). These one or more networking devices may take any of various forms, examples of which may include one or more modems, routers, switches, or the like, among other possibilities. In turn, the communication link 203 may comprise any suitable link for carrying network traffic between the wireless mesh equipment 202 and the networking equipment 204, examples of which may include a copper-based wired link (e.g., a coaxial cable, Ethernet cable, a serial bus cable, or the like), a fiber-based wired link (e.g., a glass optical fiber cable, a plastic optical fiber cable, or the like), or perhaps even a wireless link.

Further, the node's power equipment 206 may generally comprise any suitable equipment for supplying power to the node's wireless mesh equipment 202 and/or networking equipment 204, such as power and/or battery units. In turn, the power cable 205 may comprise any suitable cable for delivering power from the node's power equipment 206 to the node's wireless mesh equipment 202 and/or networking equipment 204.

III. Software Tools for Managing and Monitoring Mesh-Based Communication Systems The tasks of managing and/or monitoring a mesh-based communication system (including but not limited to a mesh-based communication system having the example architectures described above) present a number of challenges. For instance, a mesh-based communication system needs to be monitored and managed on a regular basis to ensure that each node is functioning as intended and when the mesh-based communication system experiences any disruptions, that those disruptions are identified and mitigated as expediently as possible. However, given that a mesh-based communication system typically includes a large number of nodes (e.g., several hundreds or even thousands of nodes), managing and monitoring each individual node of the mesh-based communication system, identifying node disruptions within the mesh-based communication system, and coordinating mitigation of identified disruptions can be tedious and laborious, which can result in prolonged network downtime and customer frustration.

Disclosed herein is new software technology comprising various software tools that facilitate tasks related to managing and monitoring a mesh-based communication system. In at least some implementations, the disclosed software tools may be incorporated into a software application designed according to a client-server model, where the software application comprises back-end software that runs on a back-end computing platform and front-end software that runs on end-user devices (e.g., in the form of a native application such as a mobile application, a web application, and/or a hybrid application, etc.) and can be used to access the back-end computing platform via a data network, such as the Internet. However, it should be understood that the disclosed software tools may also be incorporated into software applications that take other forms as well, including a native client application as an example.

Figure 3:
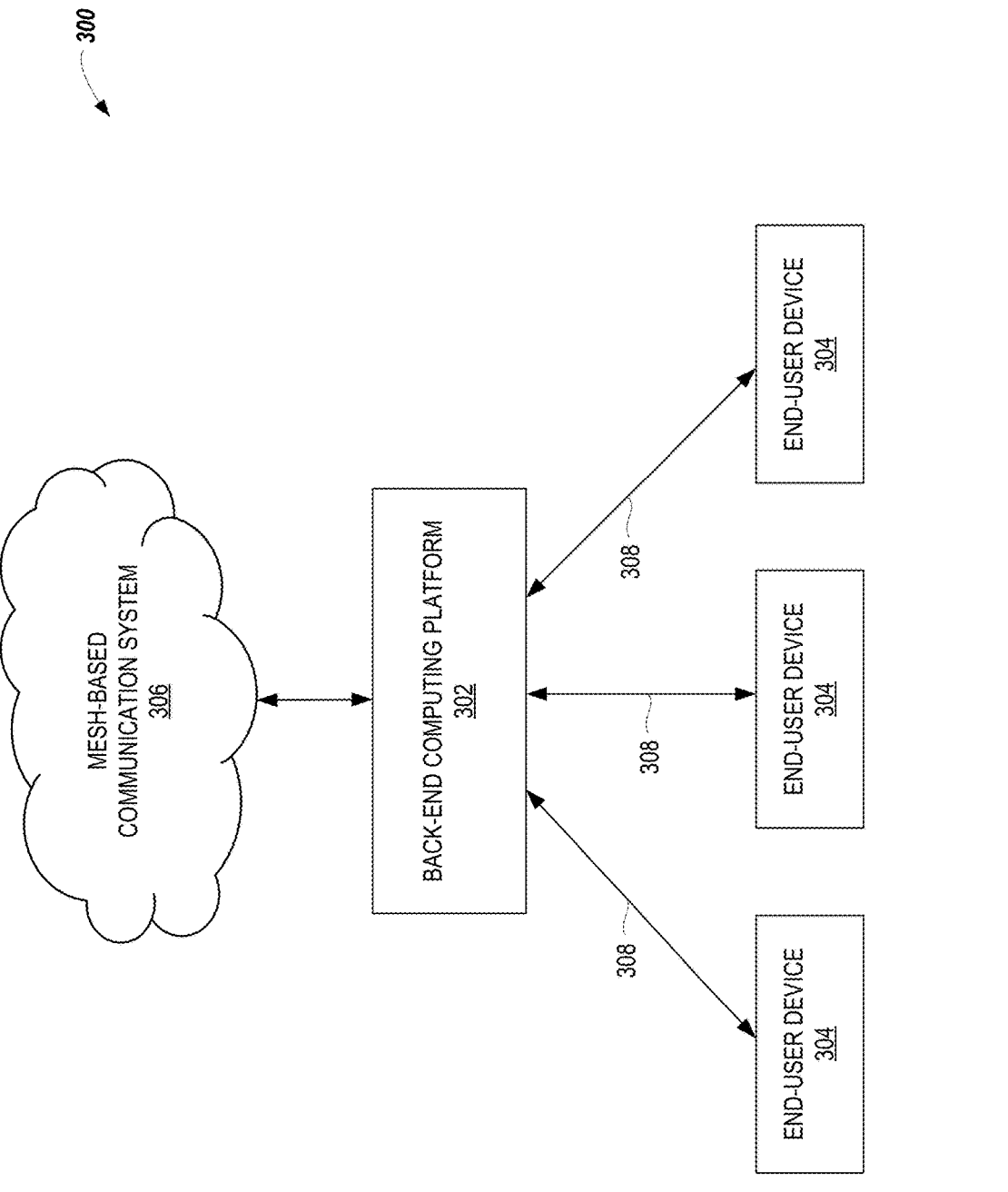
FIG. 3 depicts an example computing environment that includes a mesh-based communication system that is configured to operate in accordance with aspects of the disclosed technology.

One example of a computing environment 300 in which the disclosed software tools may be run is illustrated in FIG. 3. As shown in FIG. 3, the computing environment 300 may include a back-end computing platform 302 that may be communicatively coupled via a respective communication path 308 to any of various end-user devices, depicted here, for the sake of discussion, as end-user devices 304. (While FIG. 1 shows an arrangement in which three end-user devices 304 are communicatively coupled to the back-end computing platform 302, it should be understood that this is merely for purposes of illustration and that any number of end-user devices may communicate with the back-end computing platform 302.) Additionally, as shown in FIG. 3, the back-end computing platform 302 may also be communicatively coupled to any of various communication nodes within a mesh-based communication system 306.

Broadly speaking, the back-end computing platform 302 may comprise one or more computing systems that have been installed with back-end software (e.g., program code) for performing the back-end computing platform functions disclosed herein, including but not limited to the functions associated with providing a software application that incorporates one or more of the disclosed software tools. The one or more computing systems of the back-end computing platform 302 may take various forms and be arranged in various manners.

In practice, the example back-end computing platform 302 may generally comprise some set of physical computing resources (e.g., processors, data storage, etc.) that are configured to host and run back-end software for a software application that incorporates one or more of the disclosed software tools. This set of physical computing resources may take any of various forms. As one possibility, the back-end computing platform 302 may comprise computing infrastructure of a public, private, and/or hybrid cloud (e.g., computing and/or storage clusters). In this respect, the organization that operates the back-end computing platform 302 may either supply its own cloud infrastructure or may obtain the cloud infrastructure from a third-party provider of "on demand" cloud computing resources, such as Amazon Web Services (AWS), Amazon Lambda, Google Cloud Platform (GCP), Microsoft Azure, or the like. As another possibility, the back-end computing platform 302 may comprise one or more servers that are owned and operated by the organization that operates the back-end computing platform 302. Other implementations of the back-end computing platform 302 are possible as well.

In turn, end-user devices 304 may each be any computing device that is capable of running front-end software for a software application that incorporates one or more of the disclosed software tools and communicating with the back-end computing platform 302. In this respect, end-user devices 304 may each include hardware components such as a processor, data storage, a communication interface, and user-interface components (or interfaces for connecting thereto), among other possible hardware components, as well as software components such as the front-end software for a software application that incorporates one or more of the disclosed software tools (e.g., a mobile application or a web application running in a web browser). As representative examples, end-user devices 304 may each take the form of a desktop computer, a laptop, a netbook, a tablet, a smartphone, and/or a personal digital assistant (PDA), among other possibilities.

As further depicted in FIG. 3, the back-end computing platform 302 may be configured to communicate with the end-user devices 304 and the communication nodes of the mesh-based communication system 306 over respective communication paths 308. Each of these communication paths may generally comprise one or more data networks and/or data links, which may take any of various forms. For instance, each respective communication path 308 with the back-end computing platform 302 may include any one or more of Personal Area Networks (PANs), Local Area Networks (LANs), Wide Area Networks (WANs) such as the Internet or cellular networks, cloud networks, and/or point-to-point data links, among other possibilities. Further, the data networks and/or links that make up the communication paths 308 may be wireless, wired, or some combination thereof, and may carry data according to any of various different communication protocols. Although not shown, the communication paths 308 may also include one or more intermediate systems, examples of which may include a data aggregation system and host server, among other possibilities. Many other configurations are also possible.

It should be understood that the computing environment 300 is one example of a computing environment in which embodiments described herein may be implemented. Numerous other arrangements are possible and contemplated herein. For instance, other computing environments may include additional components not pictured and/or more or less of the pictured components.

In accordance with the present disclosure, the software tools for monitoring and/or managing a mesh-based communication system may include any of (i) a first software tool for selectively taking action on communication nodes within a mesh-based communication system, which may also be referred to herein as a "selective-actioning" tool, (ii) a second software tool for generating, managing, and visualizing alerts related to a mesh-based communication system, which may also be referred to herein as a "network alerts" tool, and (iii) a third software tool for identifying communication nodes representing single points of failure within a mesh-based communication system, which may also be referred to herein as a "spur finder" tool. For purposes of illustration, each of these software tools is described in terms of a client-software application being driven by a software subsystem of the back-end computing platform 302 that is configured to implement the disclosed software technology and perform operations related to one or more techniques disclosed herein, but it should be understood that the software tools may take other forms as well.

Each of these software tools will now be described in further detail below.

a. Selective-Actioning Software Tool

A mesh-based communication system, such as the mesh-based communication system 306 shown in FIG. 3, may comprise a large number of nodes that need to be monitored, managed, and/or maintained at any given time. In some instances, one or more nodes of the mesh-based communication system may require some collective action that needs to be performed with respect to the one or more nodes. In this regard, in one aspect, the disclosed software technology may comprise a first software tool for managing a mesh-based communication system. The first software tool may comprise a selective-actioning software tool for taking some action related to selected wireless communication nodes within a mesh-based communication system. The selective-actioning tool may involve a user interface that enables (i) selection of a particular set of nodes of the mesh-based communication system and (ii) an identification of at least one action that is to be performed with respect to the selected set of nodes.

In practice, the selective-actioning tool may be accessed by a user via an end-user device, such as one of the end-user devices 304, that is configured to run front-end software of a software application incorporating the disclosed technology and communicate over a data network with a back-end computing platform, such as the back-end computing platform 302, that is configured to run back-end software of the software application. The selective-actioning tool run by the -end computing platform may then cause the end-user device to display one or more graphical user interface (GUI) views that enable selection of a set of nodes of the mesh-based communication system and an identification of at least one action that is to be performed with respect to the selected set of nodes.

The one or more GUI views that may be provided by the selective-actioning tool to enable selection of the set of nodes of the mesh-based communication system may take various forms. As one possibility, the selective-actioning tool may present an interactive network map of the mesh-based communication system 306 that includes visual representations of the nodes of the mesh-based communication system and visual indications of the interconnections (e.g., links) between those nodes. The network map may be overlaid onto a geographical map of a geographical area in which the mesh-based communication system is deployed. The selective-actioning tool may further comprise a set of navigational controls that enable the user to navigate the network map to display a given portion of the network map and one or more nodes located within that given portion. In this respect, the GUI view of the network map that is being displayed may be dynamically adapted in response to one or more navigational controls selected by the user. For example, the navigational tools may enable a user to adjust a magnification (e.g., zoom in or zoom out) of a given portion of the network map that is being displayed and/or adjust movement within the network map until a desired given portion is displayed (e.g., move along an x- or y-axis, select and drag a portion of the network map, etc.).

The selective-actioning tool may facilitate the selection of a set of one or more nodes of a mesh-based communication system, such as the mesh-based communication system 306, via the GUI view of the network map in various ways. As one possibility, the selective-actioning tool may enable the user to provide one or more selection inputs (e.g., a "point-and-click" input) on the GUI view of the network map that each identifies an individual node of the mesh-based communication system. For example, each point-and-click selection input may comprise an input whereby the user can select (via a mouse input, touch input, touchpad input, etc.) an individual node of the mesh-based communication system, and the nodes that are selected using the point-and-click selection inputs may form the particular set of nodes. As another possibility, the selective-actioning tool may enable the user to provide a drawing input (e.g., a series of click-drag-release inputs) on the GUI view of the network map that enables the user to bulk-select a group of nodes by drawing a polygon (e.g., a square, a rectangle, etc.) on the GUI view of the network map, and any nodes included within the bounds of the drawn polygon may form the set of nodes. In this regard, the selective-actioning tool may display a dynamic representation of the polygon based on the drawing input that indicates which nodes fall within the bounds of the polygon.

Along with enabling the user to select nodes in one or both of the manners described above, the selective-actioning tool may also present the user with one or more filters that may be applied to the GUI view of the network map to dynamically update the network map such that only those nodes that match the criteria of the applied filter(s) are displayed. The one or more filters may take various forms.

As one possibility, nodes may be filtered based on geographic area. For instance, the selective-actioning tool may present a filter option whereby the user may indicate a particular geographical area that is serviced by the mesh-based communication system, such as a particular city or a particular "market," in which case the displayed nodes may be filtered such that only those nodes located within the particular geographic area are displayed.

As another possibility, nodes may be filtered based on a location within the mesh-based communication system—e.g., based on where the nodes are situated within the mesh-based communication system. For example, the selective-actioning tool may present filter options for indicating (i) a particular PoP (or sometimes referred to as a "Fiber Site"), in which case the displayed nodes may be filtered such that only those nodes connected to the particular PoP are displayed, (ii) a particular spine (or sometimes referred to as a "Ring"), in which case the displayed nodes may be filtered such that only those nodes connected to the particular spine are displayed, (iii) a particular sub-mesh (or sometimes referred to as a "Mesh Area"), in which case the displayed nodes may be filtered such that only those nodes connected to the particular sub-mesh are displayed, or (iv) some other particular segment of the mesh-based communication system. In practice, each of these filter options may be presented in the form of a dropdown list showing the available options for the particular type of segment (e.g., available PoPs, available spines, available sub-meshes, etc.). Further, in some implementations, this set of filters may have a hierarchical relationship whereby a selection of a particular PoP may cause the available options for spines to be narrowed only to those spines that connect back to the PoP, a selection of a particular spine may cause the available options for sub-meshes to be narrowed only to those sub-meshes that connect back to the spine, and so on, which allows a user to hone in on the particular segment of the wireless mesh network that is of interest in a more logical manner.

As yet another possibility, nodes may be filtered based on a condition associated with the nodes. For instance, nodes may be filtered to display those nodes that have been identified as requiring a network technician visit and/or as being currently examined by an on-site network technician. Additionally or alternatively, nodes may be filtered to display those nodes that have been identified with an issue, such as a design issue or a performance issue (e.g., power outage, network disruption, etc.). In this regard, the selective-actioning tool may enable the user to filter by nodes that are currently experiencing an issue or have historically experienced an issue. The selective-actioning tool may also enable the user to input timing constraints for such filters. For example, the user may be able to indicate one or more filter options to cause the network map to display nodes that (i) are currently experiencing an issue, (ii) have been experiencing an issue that has been ongoing for a given period of time, or (iii) have experienced a given issue within a given period of time. Other conditions are also possible.

As still another possibility, nodes may be filtered based on configuration information. In this regard, the back-end computing platform 302 may have access to configuration information for each node in the mesh-based communication system and the selective-actioning tool may cause one or more configuration parameters to be displayed as filter options, based on which the user may provide one or more inputs to indicate how the displayed nodes should be filtered.

In instances where one or more filters have been applied, the GUI view of the network map may be updated to display only those nodes that match the conditions of the applied filters. The selective-actioning tool may then enable the user to select all of the displayed nodes to form the set of nodes, or may enable the user to select a subset of the displayed nodes by using one or more of the selection techniques described above (e.g., point-and-click input, or drawing input, etc.) to form the set of nodes.

The one or more GUI views provided by the selective-actioning tool that enable selection of the particular set of nodes of the mesh-based communication system may also include a GUI view comprising a listing of the nodes in the mesh-based communication system. In one implementation, the listing of the nodes may take the form of a linear list without any grouping or hierarchies, where each node is listed in the same hierarchy level and is presented along with a respective selectable GUI option that enables the node to be selected, such as by presenting a selectable checkbox next to each node. Such a linear list may also be sortable based on various attributes of the nodes.

In another implementation, the listing of the nodes may take the form of a nested list in which the nodes in the mesh-based communication system may be grouped together in some logical manner. For instance, as one possibility, the listing of the nodes may take the form of a nested list having different hierarchy levels that are based on different segments of the mesh-based communication system. For instance, the first level of the nested list may comprise the PoPs within the wireless mesh network (i.e., the first-tier nodes), the second level of the nested list underneath each PoP may list the spines (i.e., the pathways extending from the first-tier nodes that are formed by second-tier nodes) that extend off of the PoP, the third level of the nested list underneath each spine may list the sub-meshes that extend off of the spine (i.e., the sub-meshes formed by second- and third-tier nodes), and the fourth level of the nested list underneath each sub-mesh may list the individual customers being served by the sub-mesh. Each item shown at each level of the nested list (e.g., PoP, spine, sub-mesh, or customer) may be presented along with a selectable GUI option (e.g., a selectable checkbox) that enables the user to select the item within the nested list, which may then cause all nodes that fall within the scope of the user's selection (e.g., nested under the selected level) to be selected. For example, if the user selects a given PoP, then all nodes that fall underneath the selected PoP may be automatically selected. As another example, if the user selects a given spine, then all nodes that fall underneath the selected spine may be automatically selected. A nested list of nodes could take other forms as well, including but not limited to the possibility that a nested list could organize the nodes using a different hierarchy.

As with the GUI view of the network map, the selective-actioning tool may also enable the user to apply one or more filters to the GUI view comprising the listing of nodes, including any of the example filters described above. After any such filter is applied, the selective-actioning tool may then enable the user to select all of the remaining (e.g., displayed) nodes to form the set of nodes, or may enable the user to select a subset of the remaining nodes (e.g., via selectable checkboxes) to form the particular set of nodes.

The one or more GUI views provided by the selective-actioning tool that enable selection of the particular set of nodes of the mesh-based communication system may take other forms as well, including but not limited to a combination of both a network map view and a list view that enables nodes to be selected using either or both of those views.

After the selective-actioning tool has received an indication that the particular set of nodes has been selected, the selective-actioning tool may then present the user with options for one or more actions that can be taken with respect to the selected nodes. These actions may take various forms. One type of action that may be taken with respect to the selected set of nodes is a maintenance action, whereby the user may be able to indicate that the selected set of nodes may be in need of maintenance and may additionally be able to select or otherwise provide user input indicating what type of maintenance is to be performed (e.g., running diagnostics, troubleshooting, radio realignment, etc.), which may then trigger the back-end computing platform 302 to take some action—such as notifying other individuals responsible for maintenance, automatically scheduling the maintenance, and/or engaging in some communication with the selected nodes to facilitate the maintenance (e.g., causing the selected nodes to perform a maintenance procedure). In some implementations, the selective-actioning tool may also present the user with an option to participate in coordination (e.g., scheduling, approval, etc.) of the maintenance action by launching or otherwise directing the user to one or more other software tools of the software application running the first software tool.

Another possible action that may be taken with respect to the selected set of nodes is a customer-related action. For example, the user may determine that certain customer service follow-up is required for customers of the service provided by the mesh-based communication system that are associated with infrastructure sites at which the selected set of nodes are installed. The selective-actioning tool may provide an option to generate a customer report for the set of nodes, such as an exportable file (e.g., a spreadsheet)

containing information of those customers that can then be used to complete the customer service follow-up. As another example, the user may determine that certain information (e.g., an update regarding a power outage) should be conveyed to the customers of the service provided by the mesh-based communication system that are associated with infrastructure sites at which the selected set of nodes are installed. The selective-actioning tool may provide an option to generate and send a communication (e.g., email communication, text message, push notification, etc.) to each customer to provide them with that information. If such an option is selected, the back-end computing platform 302 may cause the communication to be generated and provided to the relevant customers, and in some implementations, may also pre-populate certain fields of the communication based on information about the selected nodes and/or other relevant information available to the back-end computing platform. For instance, if the user selected an option to generate and send an email communication notifying customers of a power outage, the back-end computing platform 302 may cause a draft email communication to be generated and perhaps also cause the draft to be pre-populated with certain information (e.g., a subject line, a header, recipient email information, etc.), and then cause the draft to be displayed to the user. The user may then modify one or more fields of the draft and/or provide a further input to cause the back-end computing platform to transmit the email communication for provision to one or more customers.

Yet another possible action that may be taken with respect to the selected set of nodes is enabling and/or disabling alerts related to those nodes. For example, the selective-actioning tool may enable the user to specify whether alerts should be issued for the selected set of nodes, and if so, the nature of those alerts, such as by toggling certain types of alerts on or off for the selected set of nodes, or indicating types of alerts that should be issued if certain criteria are met. In turn, the back-end computing platform 302 may update its alerting functionality in accordance with the user input.

For instance, if the user inputs a request to enable alerting for the selected set of nodes, the back-end computing platform 302 may begin to evaluate certain types of information regarding the status and/or operation of those nodes based on certain alert criteria and then issue alerts for those nodes if the alerting criteria is satisfied. The function of evaluating information regarding the status and/or operation of a node based on certain alerting criteria may take various forms, examples of which may include evaluating (i) whether or not the node is online, (ii) whether or not a node's RSSI satisfies a threshold, (iii) whether or not a node's modulation coding scheme (MCS) rate on a wireless link satisfies a threshold, (iv) whether or not a node's throughput on a wireless link satisfies a threshold, and/or (v) whether or not a connectivity issue is detected at the node, among other possibilities. As part of this functionality, the back-end computing platform 302 may also communicate with the selected nodes to request that the nodes begin reporting certain types of information regarding the status and/or operation of the nodes to the back-end computing platform 302, to the extent that such information is not already being reported. For instance, such reporting may involve each node transmitting information about the node's online status, the node's RSSI, the node's MCS rate, the node's throughput, or the node's connectivity status. In this respect, the nodes may report such information to the back-end computing platform 302 at certain intervals, such as every 10 minutes, every 30 minutes, every 60 minutes, among other possibilities.

Conversely, if the user inputs a request to disable alerting for a particular set of nodes, the back-end computing platform 302 may stop evaluating the nodes based on previously-defined alert criteria (e.g., in line with the discussion above regarding enabling alerts) and stop issuing alerts for those nodes. As part of this functionality, the back-end computing platform 302 may also optionally communicate with the selected nodes to request that the nodes stop reporting certain types of information regarding the status and/or operation of the nodes to the back-end computing platform 302, to the extent that such information is only being sent for alerting purposes.

The functionality for enabling or disabling alerts related to the selected set of nodes may take various other forms as well.

Still another possible action that may be taken with respect to the selected set of nodes is updating of configuration parameters for the nodes. In this regard, the selective-actioning tool may enable the user to input values for one or more configuration parameters that are to be updated for each node in the selected set of nodes, examples of which may include a virtual LAN parameter (e.g., a VLAN identifier) that an NPU may use to form or join a virtual LAN with the various other nodes of the mesh-based communication system, a DNS server address, a host name, a sub-mesh identifier such as a mesh area ID or mesh domain, or an NTP (network time protocol) server parameter, among other possible configuration parameters. Based on the received input, the back-end computing platform 302 may communicate with each node (e.g., each node's respective NPU) to cause the node to update its configuration parameters based on the user input.

Another possible action that may be taken with respect to the selected set of nodes is a reporting action that enables the user to generate a report for the selected set of nodes. In this regard, the selective-actioning tool may display one or more criteria based on which the report should be generated. For example, the selective-actioning tool may enable the user to select one or more categories of information that should be included in the report. Such categories may include for each node in the set, as some examples, certain performance metrics, such as uptime and downtime information, network connectivity information, or power outage information, among other possibilities. The selective-actioning tool may also enable the user to define a time period for which the selected categories of information should be obtained for each node. For instance, the user may wish to generate a report comprising performance metrics of the selected set of nodes on a particular day or during a particular set of days. Based on the user input, the back-end computing platform 302 may then generate the report and cause the report to be presented to (e.g., displayed at an end-user device associated with) the user that requested the report (and/or some other user).

Yet another possible action that may be taken with respect to the selected set of nodes is creating one or more annotations (e.g., a note, a comment, or some other text-based informational blurb) for the selected set of nodes. For instance, the user may wish to record certain information about the selected set of nodes for future reference, and the selective-actioning tool may enable the user to create an annotation whereby the user may enter the information that the user wishes to record. The annotation may then be stored as part of information about the node that is maintained by the back-end computing platform 302 and can later be accessed by an end-user device (e.g., by the user at a later time, by a different user, etc.).

Another possible action that may be taken with respect to the selected set of nodes is viewing of site activity that enables the user to view historical information about node-related activity that has occurred at the infrastructure sites where the nodes are installed and/or information about how any user updates to node configuration parameters affects activity at the infrastructure site. For instance, the back-end computing platform 302 may be configured to track information about each node in the mesh-based communication system (e.g., based on receiving information from each node about the node's activity), such as information about the node's location, information about the node's activity and performance, information about updates to configuration parameters of the node, information about the node's status, etc., and the selective-actioning tool may enable the user to view such information. Based on user input indicating the type of site activity that the user wishes to view, the back-end computing platform 302 may obtain the relevant information and cause it to be presented to the user.

Still another possible action that may be taken with respect to the selected set of nodes is accessing selection history that enables the user to view a history of all sets of nodes that the user has previously selected. The user may then take further action with respect to a previously-selected set of nodes. This may be particularly advantageous when the user wishes to take further action with respect to a previously selected set of nodes that took time and perhaps several layers of filtering. The user may be able to access the user's selection history to identify the previously selected set of nodes without being required to go through the entire process of re-selecting those nodes. Relatedly, in some implementations, the selective-actioning tool may enable the user to view a history of previously-selected selection criteria (e.g., selection criteria defining a particular segment of the mesh-based communication system) such that the user may re-apply those selection criteria (instead of being required to re-select those criteria to display the nodes in the particular segment) to view an updated display of nodes within the particular segment. For instance, additional nodes may have been deployed at the particular segment of the mesh-based communication system since a previous time when the user had viewed nodes based on the previously-selected criteria, and re-applying the previously-selected criteria would cause the selective-actioning tool to provide an updated display of nodes matching the previously-selected criteria.

The selective-actioning tool may enable the user to engage in other types of actions as well, such as "deleting" respective visual representation of selected node(s). Many other actions are also possible.

Additionally, it should be noted that while the above selection techniques and actions have been described with respect to nodes, the selection techniques and action may be similarly utilized to select and take action with respect to one or more wireless links between nodes of the mesh-based communication system that may also be visualized in the GUI view(s) of the network map.

Figure 4A:
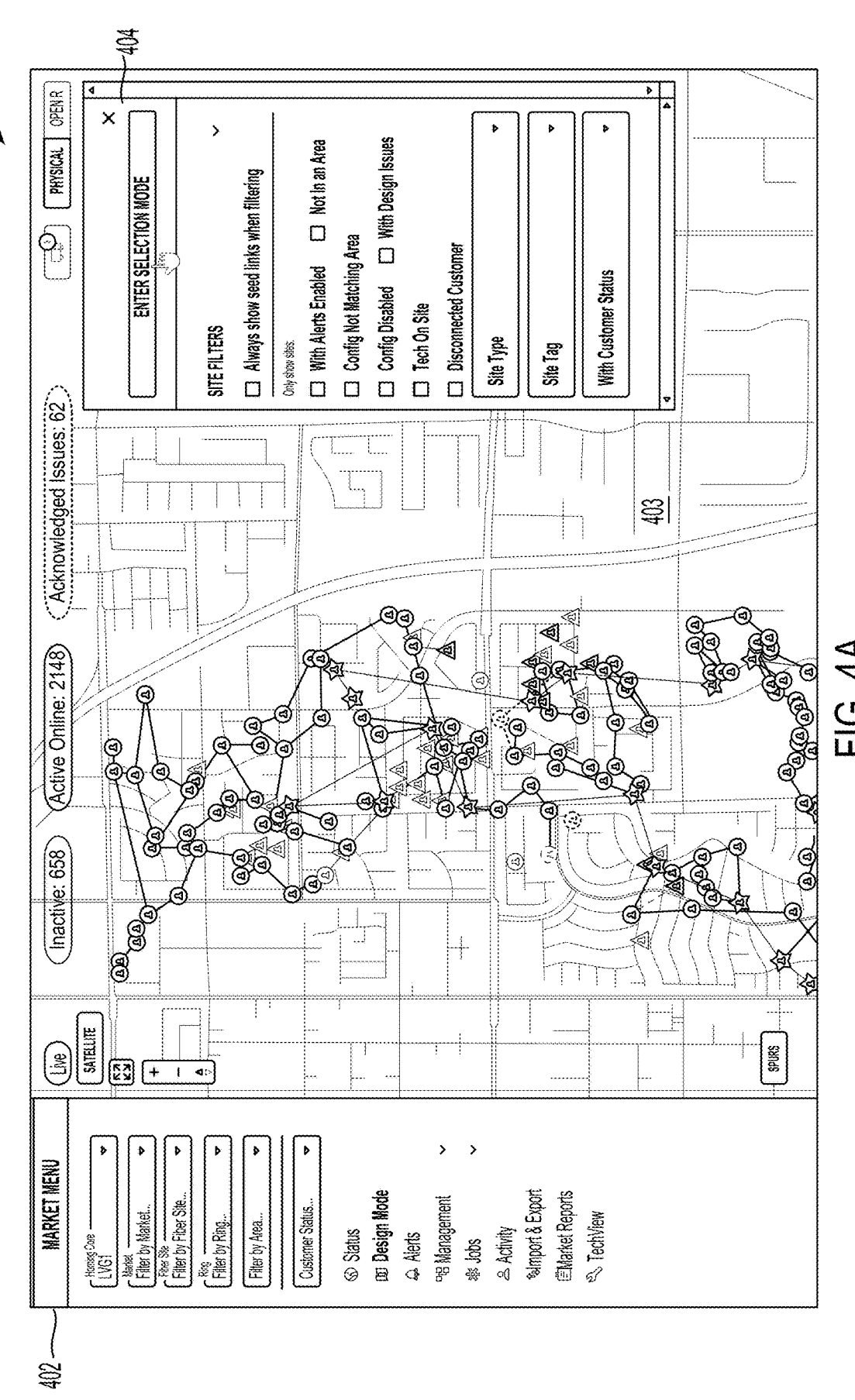
FIG. 4A through 4I depict example graphical user interface (GUI) views that may be displayed at an end-user device to facilitate user interaction with a first software tool for managing and monitoring aspects of a mesh-based communication system in accordance with aspects of the disclosed technology.

Turning now to FIG. 4A, one example of a GUI view 400 that may be displayed to a user interacting with the selective-actioning tool for selecting a set of nodes for which one or more actions are to be performed is shown. The view 400 may include a map view 403 that comprises a map-like visualization of nodes and links within some geographic area of a mesh-based communication system. The geographic area shown in the map view 403 may be dynamically updated based on user inputs received via the GUI view 400, such as one or more navigational controls (e.g., zooming in/out, moving vertically, horizontally, diagonally, etc.), and/or application of one or more filters.

Although not shown, the map view 403 may also include a legend that provides an explanation of various representations that may be depicted in the map view 403, such as different colors and/or symbols, etc., that may be used to display nodes/links in the map view. For instance, different colors and/or symbols may be used to indicate different information about nodes and links displayed in the map view, and the legend may include a brief description of what each color and/or symbol indicates. The map view 403 may include other GUI components as well, including navigational controls, additional information about the nodes and/or links displayed in the map view 403, and options to toggle between different types of visualizations of the map view 403. For example, the user may be able to toggle to a satellite view or a street view of the visualization displayed in the view 400. Other examples are also possible.

The view 400 may include a pane 402 whereby the user can optionally filter the nodes that are to be displayed via the map view 403 and that serve as an initial pool of nodes that can then be used to select the particular set of nodes for which the user desires to perform one or more actions. For example, as shown, the pane 402 may enable a user to specify a particular geographic area using the "homing core" and/or "market" fields. As another example, as shown, the pane 402 may enable a user to specify a particular segment of the wireless mesh network for which to display nodes, such as a particular PoP (referred to in FIG. 4A as a "Fiber Site"), a particular spine (referred to in FIG. 4A as a "Ring"), among other possible fields that may enable a user to filter by segment of the wireless mesh network. As yet another example, as shown, the pane 402 may enable a user to filter the nodes that are to be displayed based on customer status.

Figure 4B:

FIG. 4B depicts an example view 410 including a pane 402*a* similar to the pane 402 in FIG. 4A. The pane 402*a* may provide one or more fields that may be used to filter the nodes that are displayed via the map view 403. As shown, the user may have provided inputs within the pane 402*a* to specify a homing core "LVG1," "Las Vegas" as the market, a fiber site "FS1," and a ring "3." Based on these inputs provided within the pane 402*a*, the back-end computing platform may cause the map view 403 o be updated to include only those nodes that match user's initial filter criteria. The user may then provide additional inputs to select one or more of the nodes displayed within the map view 403.

It should be understood that the user may forgo providing an initial input via the pane 402*a* and may instead interact with the navigational controls of the map view 403 to cause a desired initial pool of nodes to be displayed.

Returning to FIG. 4A, the view 400 may further include a pane 404 that enables the user to apply one or more other filters to the map view. For instance, as shown in FIG. 4A, such filter options may include (i) a filter to show only those nodes that have alerts enabled, (ii) a filter to show only those nodes which are not in an area, (iii) a filter to show only those nodes that have configuration parameters that do not match an area, (iv) a filter to show only those nodes that have one or more disabled configuration parameters, (v) a filter to show only those nodes that currently have a technician on-site, (vi) a filter to show only those nodes that are experiencing design issues, and (vii) a filter to show only those nodes that are disconnected. The pane 404 may additionally include an option to select a given "Site Type" and/or a given "Site Tag" by which to filter, and/or to filter by customer status.

As shown in FIG. 4A, the view 400 may also enable the user to toggle (e.g., into an active or inactive state) a "selection mode" that enables the user to select one or more of the nodes displayed within the map view 403 (e.g., by individual selection or drawing selection). For instance, as shown in FIG. 4A, when the selection mode is not active, the view 400 may include a selectable GUI component, such as the GUI button labeled "ENTER SELECTION MODE," that activates the selection mode and enables the user to select the particular set of nodes.

Figure 4C:
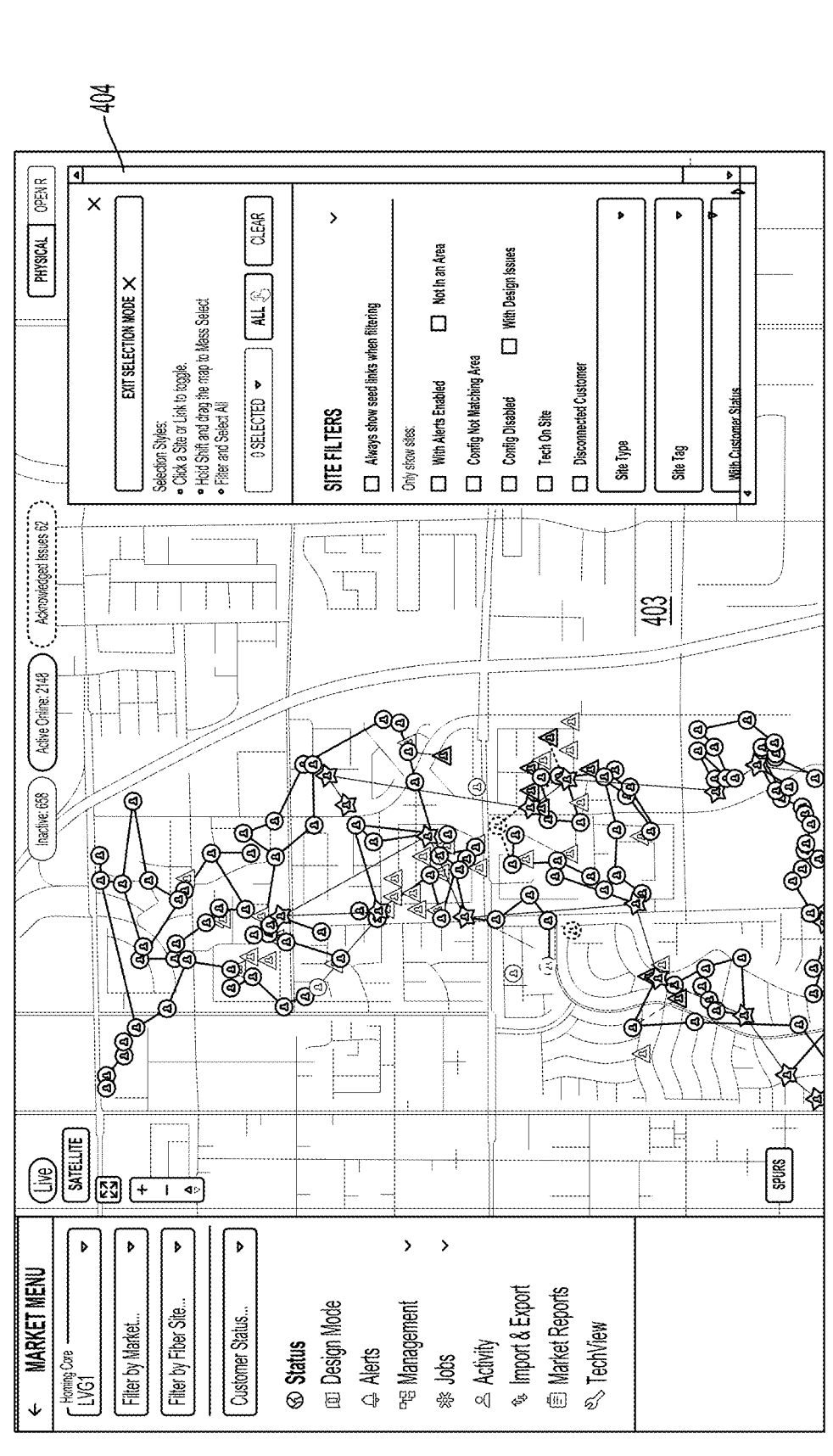

FIG. 4C depicts an example view 420 that may be displayed after the selection mode has been activated. The view 420 may comprise an updated pane 404 that includes instructions on how selections can be made. For example, as shown in FIG. 4C, the updated pane 404 may instruct a user to (i) "Click a Site or Link to toggle" in order to select nodes individually, (ii) "Hold Shift and drag the map to Mass Select" in order to bulk-select nodes, or (iii) "Filter and Select All" in order to select nodes and/or links by applying one or more filters. The user may then be able to select one or more nodes and/or links displayed in the map view 403 to form the particular set of nodes. The updated pane 404 may also include a selectable GUI component, such as the "GUI button labeled EXIT SELECTION MODE," that enables the user to end selection of nodes and exit the selection mode.

Figure 4D:
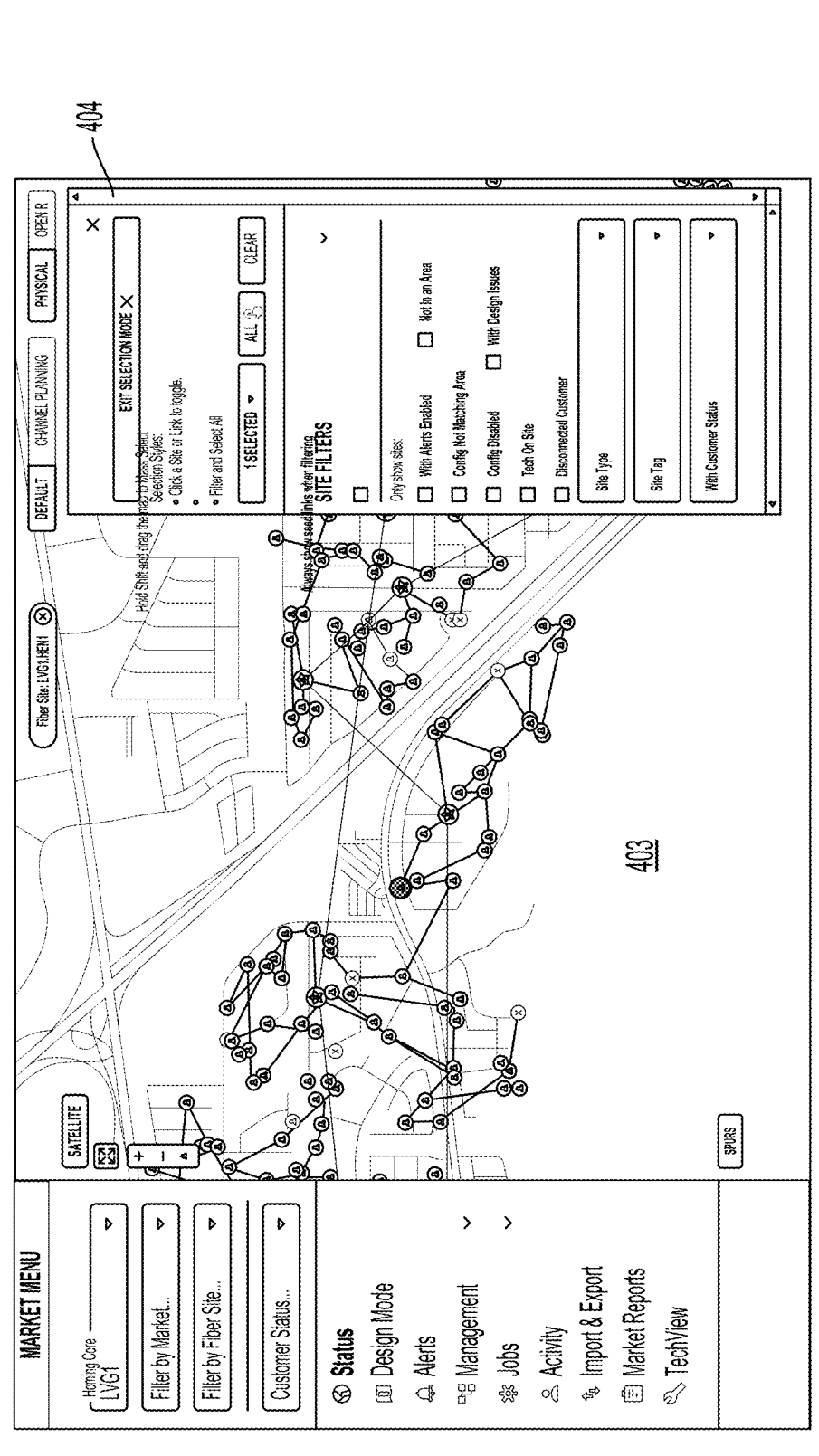

One example of how a user selection may be visualized in a GUI view is shown in FIG. 4D. FIG. 4D depicts an example view 430 wherein the user has selected a single node, perhaps via a point-and-click selection. As shown, the view 430 may include an updated visualization of the map view 403 that depicts the selected node in a manner that distinguishes the selected node from unselected nodes (e.g., by depicting the selected node in a different color and/or with a different symbol than the unselected nodes).

Figure 4E:
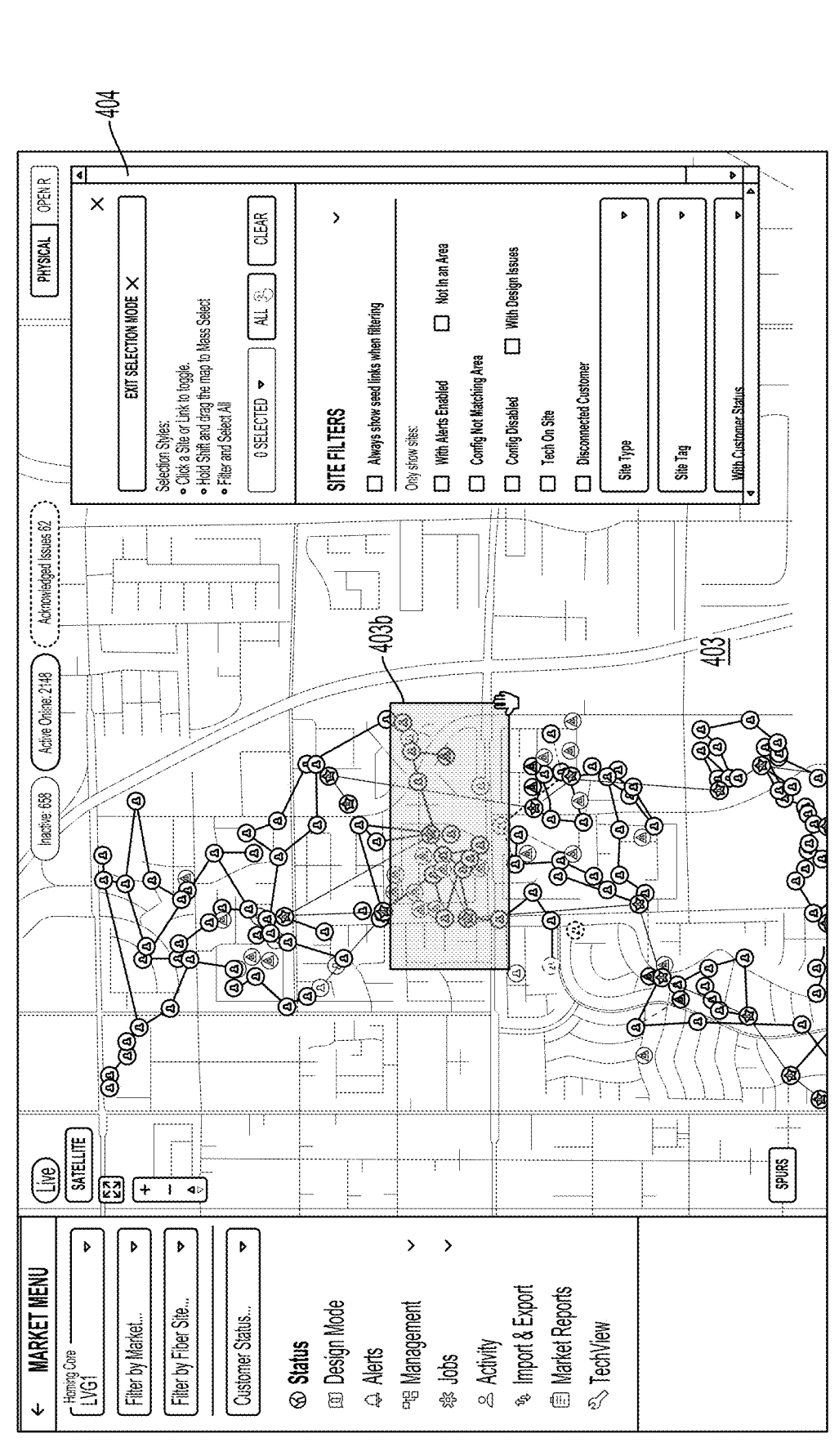
Figure 4F:
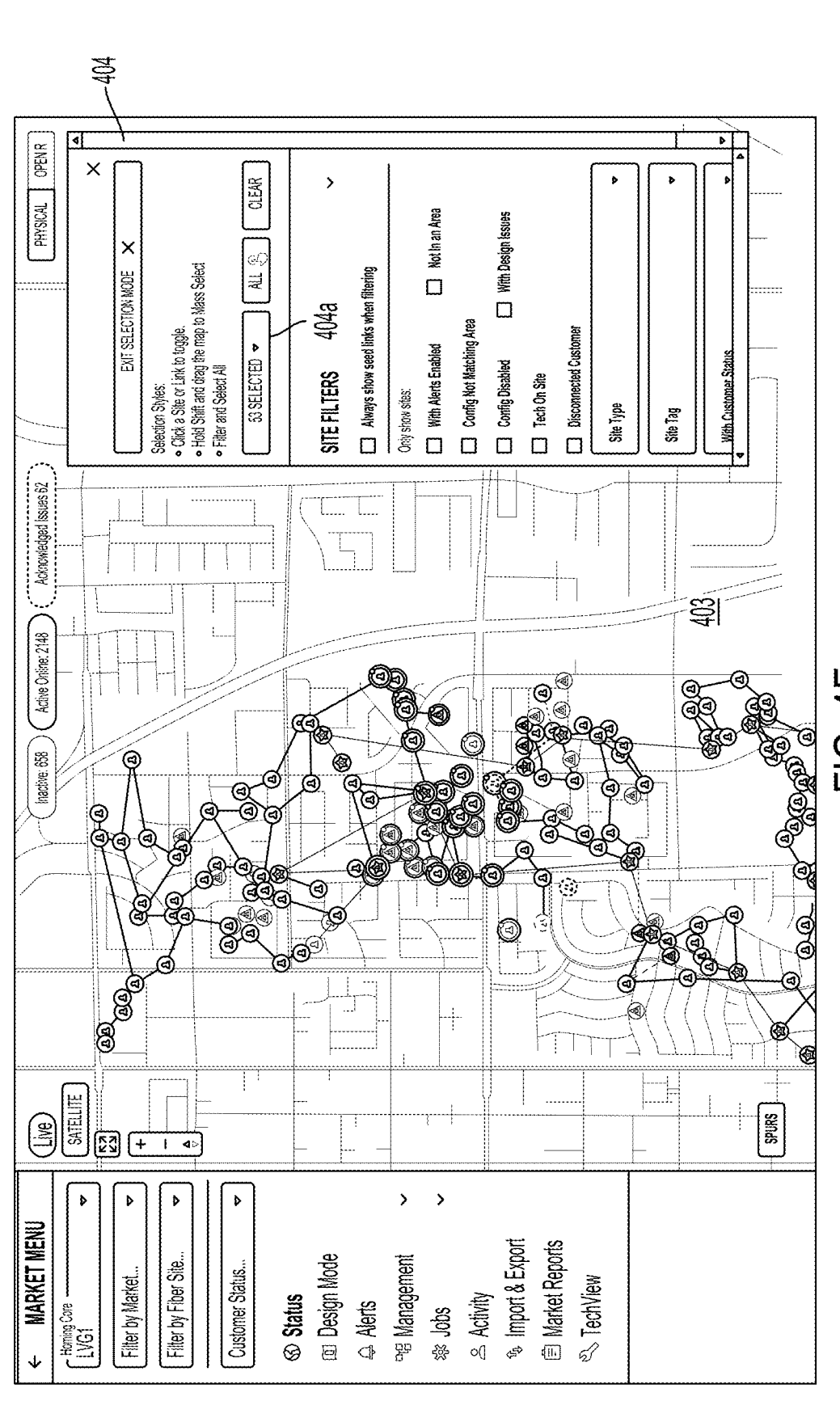

Another example of how a user selection may be visualized in a GUI view is shown in FIG. 4E. FIG. 4E depicts an example view 440 wherein the user has provided a polygon-drawing input 403*b* to select a group of nodes. FIG. 4F depicts an example view 450 wherein the nodes that fell within the polygon-drawing input 403*b* and the links between those nodes were selected (e.g., as a result of the user completing the polygon-drawing input 403*b*). As shown in FIG. 4F, the view 450 may include an updated visualization of the map view 403 that depicts the selected nodes in a manner that distinguishes the selected nodes from unselected nodes (e.g., by depicting the selected nodes in a different color and/or with a different symbol than the unselected nodes).

Based on the selection of the nodes, the pane 404 may further include a visual indication 404*a* that indicates a number of nodes and/or links currently selected. For instance, as shown in FIG. 4F, the visual indication 404*a* may indicate "53 SELECTED" nodes and links in the selected set of nodes. The visual indication 404*a* may be dynamically updated by the selective-actioning tool based on additional selections and/or de-selections that are input within the map view 403. Further, the visual indication 404*a* may be selectable to display one or more actions that may be taken with respect to the selected set of nodes.

Figure 4G:
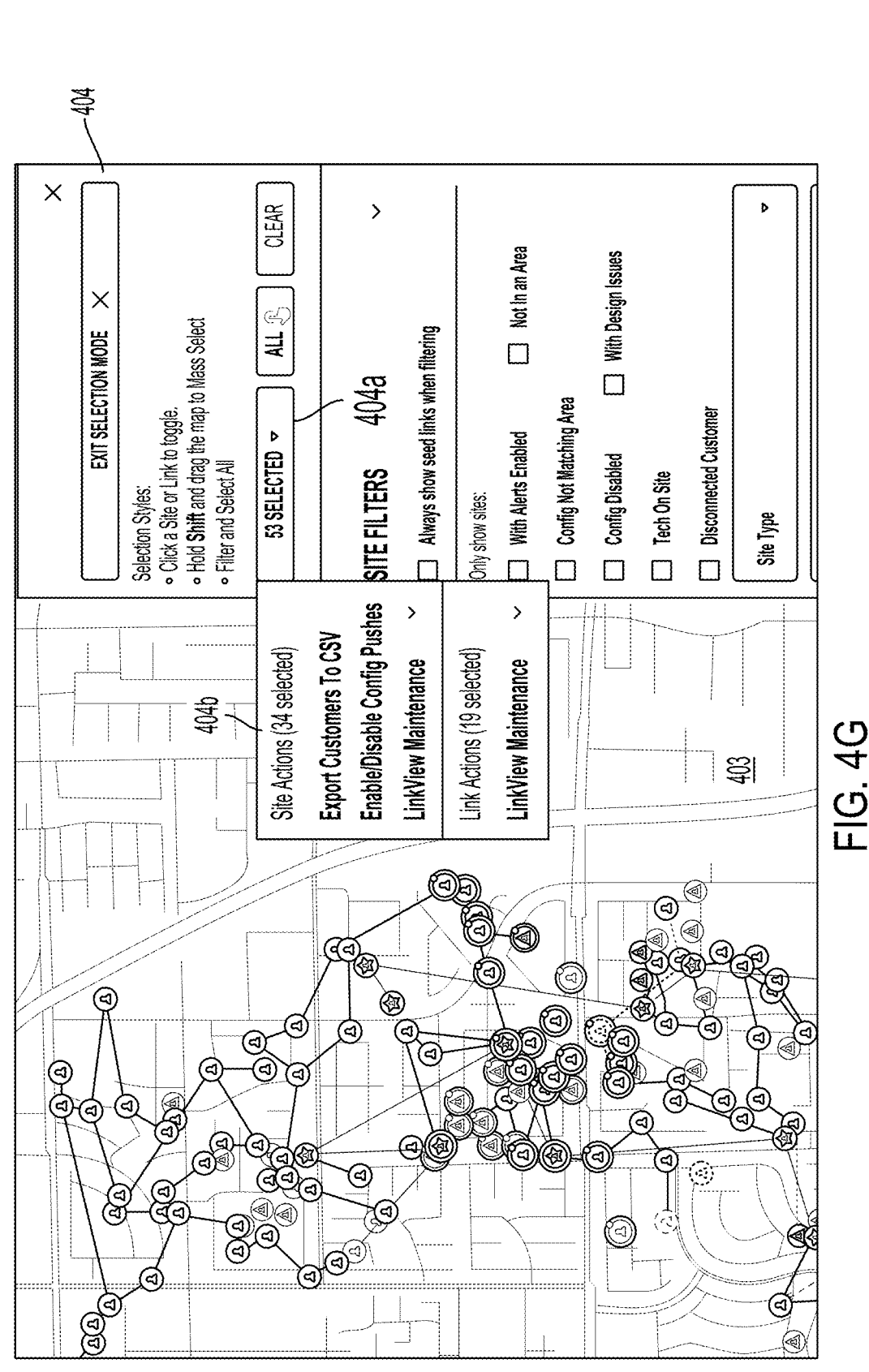

FIG. 4G depicts a view 460 after the user has selected the visual indication 404*a* to display one or more actions with respect to the selected nodes. The view 460 may include a pane 404*b* that displays a list of actions. In some implementations, such as the one shown in FIG. 4G, the list of actions may be categorized by node-actions and link-actions. For example, as shown, the pane 404*b* lists (i) a first set of actions that can be taken with respect to the selected nodes, which may include an action to export customer information associated with the selected nodes in the form of a data storage file, an action to enable or disable configuration-related push notifications for the selected nodes, and a maintenance-related action for the selected nodes, and (ii) a second set of actions that can be taken with respect to the selected links, which may include a maintenance-related action for the selected links. Other examples are also possible.

Figure 4H:
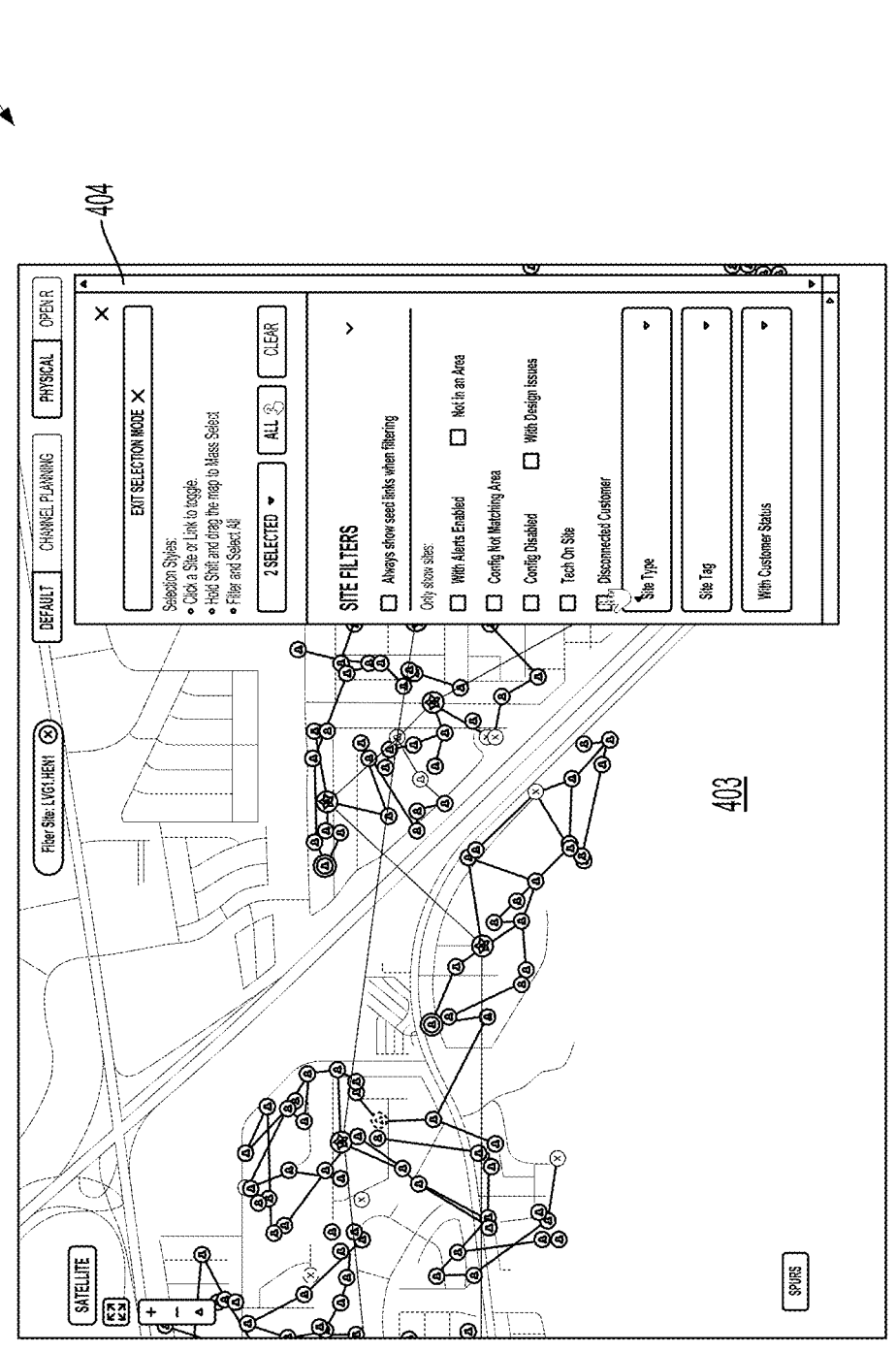
Figure 4I:
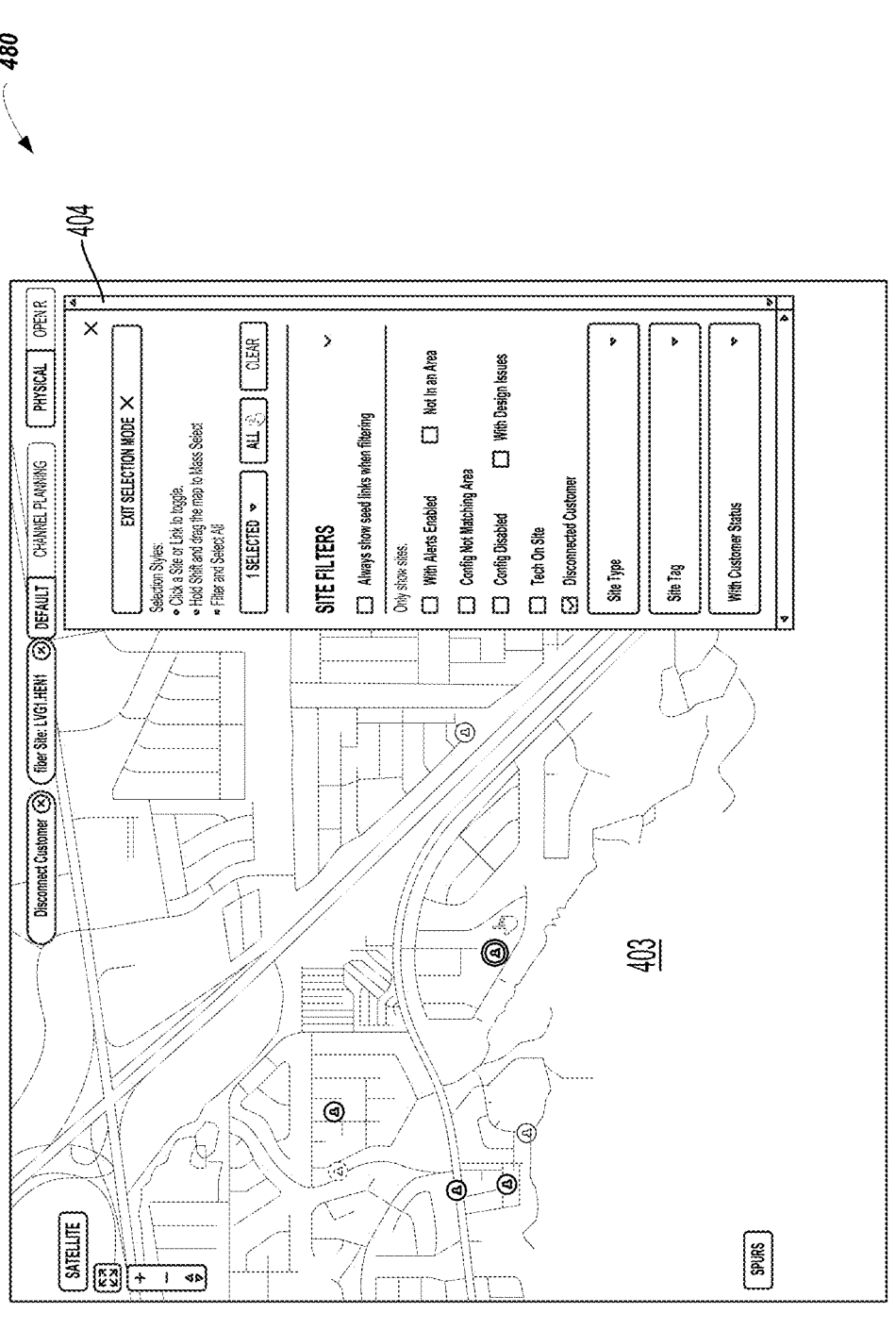

As noted above, the pane 404 also includes filtering options that may be utilized to filter down the nodes displayed in the map view 403, either before or after the selection of nodes within the map view 403. FIGS. 4H-4I illustrate how such a filter option may be utilized. Specifically, FIG. 4H depicts an example view 470 displaying a map view 403 that includes two selected nodes at a time prior to a user's selection of a "Disconnected Customer" filter, and FIG. 4I depicts an example view 480 at a time after a user's selection of the "Disconnected Customer" filter. As shown in these figures, after the "Disconnected Customer" filter has been selected, the selective-actioning tool may dynamically update the map view 403 to show only those nodes that are currently disconnected, and the number of selected nodes has been reduced from two to one. The user may then proceed to select one or more actions that may be taken with respect to the remaining selected node in line with the discussion above.

The GUI views that may be displayed to a user in order to facilitate selection and/or actions with respect to nodes of a mesh-based communication system may take other forms as well.

b. Network Alerts Software Tool

In another aspect, the disclosed software technology may comprise a second software tool for managing a mesh-based communication system. The second software tool may comprise a network alerts software tool for managing alerts related to the mesh-based communication system. The network alerts tool may function to (i) generate alerts related to the status and/or operation of wireless communication nodes in the mesh-based communication system, (ii) cause generated alerts to be presented to one or more users that are responsible for managing and/or monitoring the mesh-based communication system, and (iii) enable user interaction with the generated alerts, among other possible functions.

The function of generating alerts related to the status and/or operation of nodes in the mesh-based communication system may take various forms. In general, the back-end computing platform 302 may be configured to receive certain information from each node of the mesh-based communication system regarding that node's status and/or operation, such as performance metrics, connectivity information, or other information, which each node (and more particularly, each node's NPU) may be configured to send to the back-end computing platform on a regular or semi-regular basis, such as according to some defined interval (e.g., every two minutes, every five minutes, every ten minutes, etc.) or in response to certain triggering events detected at the node. This information may sometimes be referred to as a node's "heartbeat,", in the sense that it may convey information about the node's "health." The information about a node's status and/or operation may include various metrics, examples of which may include a "Link" metric for each wireless link that is established at the node that indicates the signal strength of the link (e.g., an RSSI measurement), a throughput metric for each wireless link that is established at the node, an MCS rate metric for each wireless link that is established at the node, an "Uptime" metric for each wireless link that is established at the node, a "Status" indicator, a "Health" indicator, one or more traffic metrics for the node (e.g., RX and TX traffic rate during some period of time, such as a day, week, month, etc.), or identification information for the node, such as a serial number, an IP address, and a firmware version, among other possibilities. Each instance of status and/or operation information that is sent by each node may be stored by the back-end computing platform.

Figure 5A:

This heartbeat information may be organized by the back-end computing platform such that it may be presented to a user in a visually readable manner. For instance, the heartbeat information may be presented in the form of a graph, a chart, or some other listing of information that provides the user with information about a node's status and/or operation information. FIG. 5A depicts one example of a GUI view 500 that includes a presentation of a node's current status and/or operation information along with the node's configuration information. For instance, the user may have accessed the software application comprising the disclosed technology and navigated to a "Dashboard" view that includes operational and configuration information for a given node. As shown in FIG. 5A, the view 500 may include information about a name, operational status, health status, serial number, IP address, firmware, configuration settings, and usage related to the given node. The view 500 may include other information as well.

As the back-end computing platform receives each node's status and/or operation information, the network alerts tool may evaluate the status and/or operation information (either on an instance-by-instance basis or aggregated across some recent timeframe) to identify any issues that could potentially impact customer service/experience and thereby warrant generation of an alert. In this regard, the back-end computing platform may apply certain alert criteria to certain metrics included in the status and/or operation information that is received from each node. The alert criteria may take various forms. As one example, the alert criteria may take the form of a threshold that is to be applied to a certain metric included in the status and/or operation information that is received from each node. For example, the alert criteria for signal strength may comprise a threshold RSSI value, and if a node's reported RSSI value is below the threshold RSSI value (e.g., due to a blockage in the LOS of the node), the network alerts tool may determine that the alert criteria has been met, and that an alert regarding the node's low RSSI value is to be generated. Along similar lines, the alert criteria may include respective thresholds for other metrics, such as a throughput, traffic rate, an MCS rate, or other similar metrics. As another example, the alert criteria may comprise certain criteria related to connectivity of a wireless communication link, such as a current connectivity status of a wireless link, or a history and/or frequency of disrupted connectivity of the wireless link, and if the connectivity of a node's wireless link satisfies that criteria, the network alerts tool may determine that an alert regarding the node's wireless link is to be generated. As yet another example, the alert criteria may comprise certain criteria related to the "Status" and/or "Health" indicators of the node. The alert criteria may take other forms as well.

The network alerts tool may then proceed to generate an alert for each instance where a metric of a node meets an alerting criteria. The alert may include various information, such as an identifier of the node along with details about why the alert was generated (e.g., an indication of a particular performance metric or connectivity issue related to the node that triggered the alert), and cause each such alert to be presented to at least one user who is responsible for managing and/or monitoring the mesh-based communication system. A generated alert may be presented to a user in various manners.

As one possibility, a generated alert may be presented via a GUI view that displays an interactive network map that depicts the nodes and/or wireless links within a mesh-based wireless communication system, which may be similar to the network map views described above with reference to FIGS. 4A-4I. Such a network map may include various visual indicators that depict different types of alert information about the depicted nodes (and/or links). For example, nodes and/or links that are operating normally may be shown in a first color (e.g., green) or depicted by a first symbol, nodes and/or links for which a first-level alert such as a warning (e.g., a potential issue) has been triggered may be shown in a second color (e.g., yellow) or depicted by a second symbol, and nodes and/or links for which a second-level alert (e.g., a critical issue, an ongoing issue, etc.) has been triggered and urgent mitigation is required may be shown in a third color (e.g., red) or depicted by a third symbol. Other examples are also possible.

Figure 5B:

FIG. 5B depicts an example view 510 of a map view 503 that includes visual indications of alerts for two nodes 501*a* and 501*b* that each indicates a critical level alert (e.g., depicted by a triangle symbol) and visual indications of alerts for two links 502*a* and 502*b* that each indicates a warning level alert (e.g., depicted by a dashed line). In turn, FIG. 5C depicts an example view 520 that includes the alerts for the nodes 501*a* and 501*b* and the links 502*a* and 502*b*, and further includes visual indications of alerts for two additional wireless links 503*a* and 503*b* (e.g., depicted by bolded dashed lines) that each indicates a critical level alert. Each respective alert indication in the views 510 and 520 may be selectable to display more information about the detected alert.

Figure 5D:
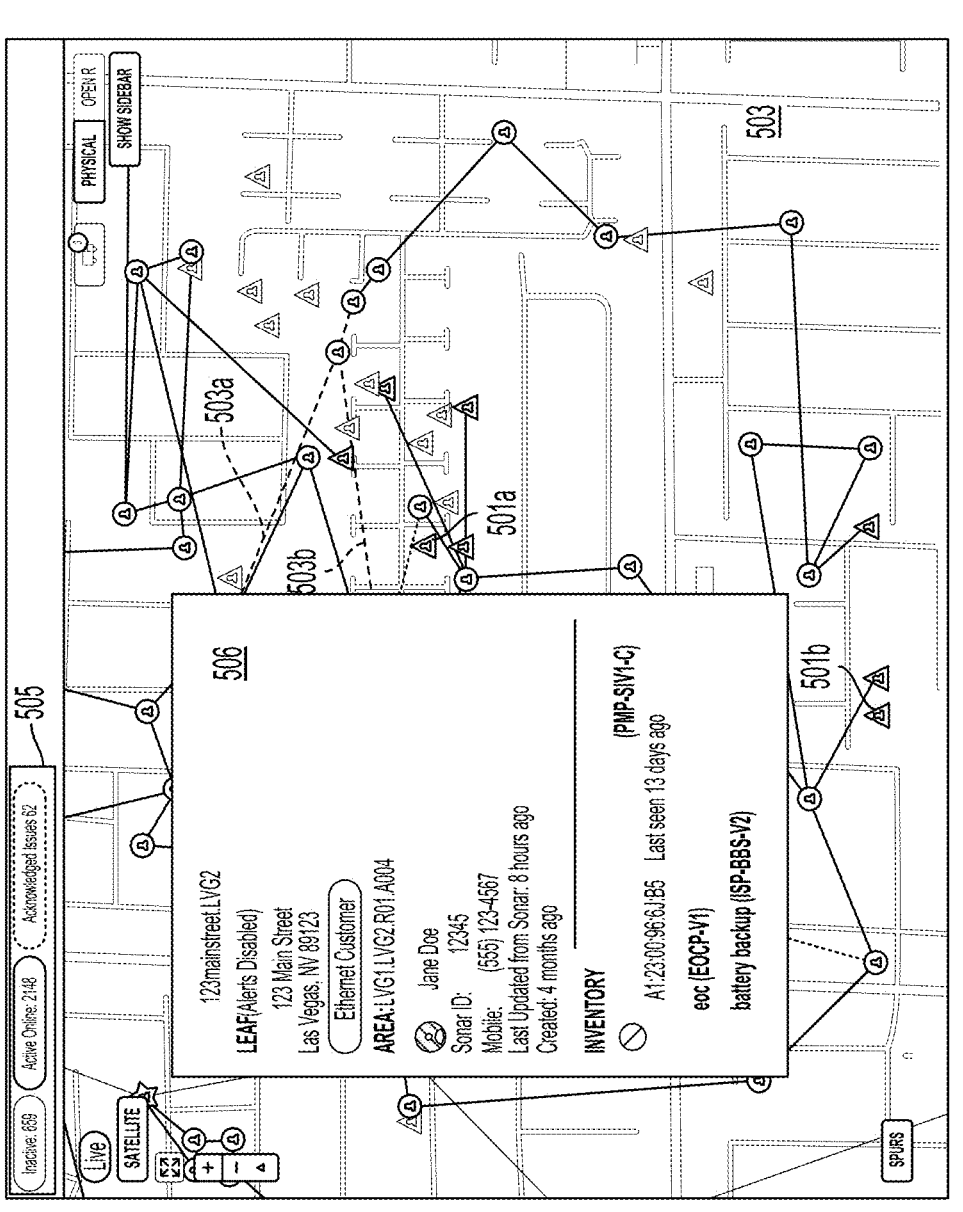

FIG. 5D depicts an example view 530 that may be displayed upon selection of the node 501*a* shown in FIG. 5C. The view 530 may include a pane 506 that includes information regarding the node 501*a*, such as configuration information, a current status of the node (e.g., the node is offline), information about what caused the alert (e.g., the node was powered off), customer information (e.g., the type of service provided to a customer via the node, identifying information for the customer, etc.), among other possibilities.

FIG. 5E depicts an example view 540 that may be displayed upon selection of wireless link 503*a* shown in FIG. 5C. The view 540 may include a pane 507 that includes information regarding the link 503*a*, such as configuration information, a date and time when the impact was detected, a current status of the link (e.g., whether the link is connected between nodes and currently operational), and information about what triggered the alert (e.g., a below-threshold MCS value, frequent loss of connectivity, etc.), among other information.

Figure 5F:
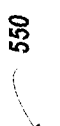

The map view 503 may further include a set of selectable filtering options that can each be selected by the user to update the map view 503 to display only those alerts that fall within the scope of the selected filter. For instance, as shown in an example view 550 of FIG. 5F, the selectable filtering options 505 may include an option to filter by alerts for "Inactive" nodes, alerts for nodes that are "Active Online," and alerts for nodes that have "Acknowledged Issues," and the map view 503 may be updated to show only alerts for active nodes in response to the user's selection. For example, in the view 550, all three filtering options in the set 505 have been selected by the user. Based on the selections, the map view 503 may be updated to include all nodes and links (within the geographical area displayed by the map view 503) that are inactive, active, or experiencing issues. Other examples are also possible.

The network alerts tool may provide other functionality as well.

For instance, information about generated alerts may be stored by the back-end computing platform such that it may be presented in some organized manner for viewing by a user. The alerts information may be presented in various ways. For instance, as one possibility, the alerts information may be presented in the form of a listing of alerts. Such an alerts list may include only active alerts that are outstanding (e.g., have yet to be resolved), or may additionally include inactive alerts that have previously been resolved (or at least have been marked as addressed), depending on alert filter options that may be selected by the user. In some implementations, the alerts list may comprise a linear listing of alerts without any grouping. Such an implementation is shown in FIG. 5G, which depicts an example view 560 that includes a listing of currently-active alerts. The view 560 may display each active alert in a row that includes timing information about when the alert was generated, a severity level of the alert (e.g., a warning, a critical issue, etc.), an alert type (e.g., physical link down, device offline, RSSI warning, etc.), an area in which the impacted node/link is located, and other metrics, among other possibilities. The user may be able to sort the alerts to view them in a particular desired order, and may also select a respective representation of a given alert to take some further action with respect to the alert and/or view additional information. Other examples are also possible.

In other implementations, the alerts list may comprise a listing of alerts in which related alerts are grouped together for presentation in various ways. For instance, alerts may be grouped on a node-by-node basis, such that if there are multiple alerts related to the same node, the alerts are grouped and presented together and the network alerts tool may enable the user to select a given node and thereby expand a list of all alerts for that node. Alternatively, alerts may be grouped by root cause, such that all alerts that were generated based on a given root cause (e.g., loss of LOS due to a common physical element, loss of power from a common source, etc.) may be grouped together underneath that root cause, and the root cause may be selectable to expand a list of all nodes that are impacted by the given root cause. For example, a power outage in a given geographical area may have caused a number of nodes to power off, causing service disruptions as those nodes. Instead of listing a respective alert for each of the number of nodes as an individual alert, the network alerts tool may group all of the alerts for the number of nodes and present them under a "Power Outage" heading. Generated alerts may be grouped in other ways as well.

Generated alerts can be presented to users in other ways as well, including via "push" notifications that are sent to the user (and perhaps one or more other users) via text message, team messaging communication (e.g., Skype or Slack), or email communication, or presented to the user via a mobile application, among other possibilities.

The network alerts tool may also enable a user to interact with the alerts in various ways. As one example, the user may be able to update a status of a given alert to indicate that a given alert is in the process of being resolved. As another example, the user may be able to update a status of a given alert to indicate that the alert is resolved. As another example, the user may be able to cause a notification regarding and/or including the alert to be sent to one or more other users. Further, the network alerts tool may enable individual selection of alerts or bulk-selection of alerts (e.g., by alert type or by cause, etc.) and then enable the user to interact with the selected alert(s) as described above. Other types of interactions are also possible.

c. Spur-Finder Software Tool

As previously mentioned, a mesh-based communication system, such as the mesh-based communication system 306 shown in FIG. 3, may comprise a large number of wireless communication nodes, which complicates the tasks of managing and/or monitoring those nodes. In some scenarios, it may also be the case that certain wireless communication nodes within the mesh-based communication system—which may be referred to herein as "critical nodes"—may represent a single point of failure for one or more other nodes—which may be referred to herein as "impacted" nodes—in the mesh-based communication system, in the sense that each critical node may serve as the sole point of connection to the mesh-based communication system for the one or more other nodes. In this respect, a disruption in operation and/or connectivity of a critical node would adversely impact (e.g., disrupt) operation and/or connectivity of all of the other nodes (e.g., impacted nodes) that are solely dependent on the critical node for their connection to the mesh-based communication system, which is undesirable.

A grouping of nodes comprising at least one critical node and its corresponding impacted nodes may collectively be referred to herein as a "spur." Further, in a spur, the critical node that is most upstream (i.e., closest to the tier-1 and/or tier-2 node that serves as the source for nodes in the spur) may be referred to as a "parent" node of the spur and each other node may be referred to as a "child" node of the spur. In this respect, it should be understood that a spur could include multiple critical nodes (i.e., multiple nodes that each represent a single point of failure for one or more other nodes), but only one of the critical nodes will be considered a parent node for the spur and the rest of the critical nodes in the spur will be considered children nodes of the spur, although those critical nodes may also still be considered parents of other "sub-spurs" that are encompassed by the spur.

Typically, spurs such as these are difficult to identify visually based on a network map (or other representation of a wireless mesh network's arrangement) given the large number of nodes comprising a mesh-based communication system. Thus, it is often the case that spurs are not identified until after a disruption to a critical node—and consequently its impacted nodes—has occurred (e.g., due to a node failure, a link failure, a customer cancellation, or the like), which can lead to undesired downtime in not only operation of the critical node itself, but also to undesired downtime in operation of the critical node's corresponding impacted nodes. For instance, if a spur is not identified until after the spur's critical node experiences a disruption, the other nodes impacted by the critical node's disruption may be knocked offline for an extended period of time because a network operator will likely need to either arrange for physical deployment of a new node that can serve as a replacement connection point for the impacted nodes to be able to establish connections with the mesh-based communication system or arrange for the impacted nodes to be physically re-configured such that they may re-establish their connections with the mesh-based communication system, which may cause customers associated with the impacted nodes to experience disrupted access to a service provided by the mesh-based communication system for the time it takes to make arrangements to get the impacted nodes back online (which could take several hours or even days), which is highly undesirable and can lead to customer frustration and perhaps even cancelation of service.

To address these and other challenges, disclosed herein is improved software technology for identifying sets of critical nodes and corresponding impacted nodes within a mesh-based communication system. The disclosed software technology may take the form of a spur-finder software tool that, at a high level, functions to (i) evaluate a current arrangement of wireless communication nodes in a mesh-based communication system (and more particularly, a given segment of the mesh-based communication system) to identify any "spurs" comprising groupings of wireless communication nodes that each includes a given critical node and a corresponding set of one or more other impacted nodes, wherein the given critical node represents a single point of failure for the corresponding set of one or more impacted nodes and (ii) cause an indication of any identified spur(s), including each identified spur's critical node and its corresponding set of one or more impacted nodes, to be displayed at an end-user device, such as an end-user device that is associated with a user who is responsible for managing and/or monitoring the mesh-based communication system.

The function of evaluating a current arrangement of wireless communication nodes in a mesh-based communication system (and more particularly, a given segment of the mesh-based communication system) to identify a spur may take various forms.

Turning now to FIG. 6, a flow diagram of an example process 600 is shown that illustrates one example implementation of operations that may be carried out to facilitate performing a spur evaluation as discussed herein. The example process 600 may include one or more operations, functions, or actions as illustrated by one or more of blocks 601-608. Although blocks 601-608 are illustrated in sequential order, these blocks may also be performed in parallel, and/or in a different order than those described herein. Also, the various blocks may be combined into fewer blocks, divided into additional blocks, and/or removed based upon the desired implementation. Furthermore, in the examples below, the operations discussed in relation to FIG. 6 may be described as being performed by a certain computing device, such as a computing platform in communication with at least one end-user device, such as the back-end computing platform 302 in communication with an end-user device 304 shown in FIG. 3. However, it should be understood that any of the operations discussed herein might be carried out by some combination of a back-end computing platform and/or an end-user device, or by an end-user device by itself.

In addition, for the flow diagram shown in FIG. 6 and other processes and methods disclosed herein, the diagram shows functionality and operation of one possible implementation of present embodiments. In this regard, each block may represent a module, a segment, or a portion of program code, which includes one or more instructions executable by one or more processors for implementing logical functions or blocks in the process.

The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long-term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the processes and methods disclosed herein, each block in FIG. 6 may represent circuitry and/or machinery that is wired or arranged to perform the specific functions in the process.

FIG. 6 depicts a flow diagram of an example process 600 for performing this spur evaluation comprising functions that may be carried out by a back-end computing platform, such as the back-end computing platform 302, that is configured to run software technology comprising the disclosed spur-finder tool.

In practice, the example process 600 may be initiated by a user (e.g., a network operator that is responsible for managing and/or monitoring a mesh-based communication system) using an end-user device, such as an end-user device 304, that is configured to communicate with the back-end computing platform 302.

The example process 600 may begin at block 601, wherein the back-end computing platform may identify a particular segment of a mesh-based communication system within which spurs are to be identified. The particular segment of the mesh-based communication system may be identified based on an initial set of criteria received by the back-end computing platform. The initial set of criteria may take various forms.

As one possibility, the initial set of criteria may comprise an identification of a particular area of a mesh-based communication system within which spurs are to be identified. The particular area of the mesh-based communication system may be identified in various ways. For instance, the area may be determined based on user input that identifies a physical location covered by the mesh-based communication system or a "network area" within the mesh-based communication system. To illustrate with one example, the user input may be provided using a software tool (e.g., the selective-actioning tool described above) to input filters based on which a physical location covered by the mesh-based communication system or a network area within the mesh-based communication system is identified. The particular area may be identified in other ways as well.

As another possibility, the initial set of criteria may indicate which types of nodes within the particular area are to be considered during the spur evaluation. For example, the user may provide user input indicating that only nodes associated with currently active customers (and not those nodes associated with inactive customers) of a service provided by the mesh-based communication system should be considered when evaluating nodes to identify spurs within the particular segment of the mesh-based communications system. As another example, the user may provide user input indicating that nodes associated with soon-to-be inactive customers (e.g., nodes for which service has been canceled but equipment is still installed and currently operational at an infrastructure site) of the service provided by the mesh-based communication system should not be considered (e.g., should be treated as if those nodes have been uninstalled) when evaluating nodes to identify spurs within the particular segment of the mesh-based communications system. Such criteria may be provided via the spur-finding software tool, as will be described in more detail further below with respect to FIGS. 7A-7E.

The initial set of criteria may take other forms as well.

At block 602, the back-end computing platform may identify a first set of wireless communication nodes within the particular segment of the mesh-based communication system comprising all "source" nodes within the particular segment of the mesh-based communication system, which may comprise the first-tier nodes (e.g., nodes that have high-capacity access to a core network of the mesh-based communication system) and/or second-tier nodes (e.g., nodes that extend the high-capacity access to the core network from the first-tier nodes to other nodes of the mesh-based communication system) within the particular segment of the mesh-based communication system. In this respect, in line with the discussion above, the back-end computing platform may have access to a network topology of the mesh-based communication system, including information about each wireless communication node of the mesh-based communication system and its tier and physical location within the mesh-based communication system, and the back-end computing platform may use such information to identify the source nodes within the particular segment of the mesh-based communication system.

At block 603, the back-end computing platform may identify a second set of wireless communication nodes within the particular segment of the mesh-based communication system comprising all nodes within the particular segment of the mesh-based communication system that are connected (either directly or indirectly) to at least one source node from the first set of nodes. In this respect, the back-end computing platform may distinguish between nodes within the particular segment of the mesh-based communication system that have an existing connection to at least one source nodes, which may be referred to herein as "connected" nodes, and nodes within the particular segment of the mesh-based communication system that do not have an existing connection to any source node, which may be referred to herein as "disconnected" nodes.

At block 604, the back-end computing platform may iteratively simulate an operational disruption (e.g., offline status, removal, etc.) of each identified node in the first and second sets and thereby determine a third set of wireless communication nodes comprising critical nodes. The function of iteratively simulating an operational disruption of each identified node in the first and second sets may enable the back-end computing platform to determine whether or not a disruption of the node would disconnect any other node in the first and second sets (e.g., cause any other nodes to lose their connection to the network). Simulating operational disruption of a given node may take various forms. In one implementation, simulating operational disruption of a given node may involve analyzing data about the given node to determine how removing the given node from the mesh-based communication system would impact other nodes in the mesh-based communication system. For instance, the back-end computing platform may have access to information about each node in the mesh-based communication system, including information about each node's connections with other nodes. Based on the information about the given node, the back-end computing platform may determine if removing moving the node would cause any other nodes to become disconnected. To illustrate with an example, the given node may be connected to one given source node and two other given connected nodes. Based on the information about the given node, the back-end computing platform may determine that removing the given node from the network would cause the two other given connected nodes to become disconnected from the network. Simulating operation disruption of a node may take other forms as well.

Based on performing an operational simulation, for each respective node, the back-end computing platform may determine whether operational disruption of node would disconnect any other node in the first and second sets, and if so, the back-end computing platform may identify the respective node as a critical node and then store data indicating (i) that the respective node is a critical node and (ii) which one or more other nodes would be disconnected if the respective node experienced an operational disruption, which may be considered the respective node's corresponding set of one or more impacted node. The critical nodes identified from the first and second sets of wireless communication nodes may form the third set of wireless communication nodes identified by the back-end computing platform.

At block 605, the back-end computing platform may evaluate each critical node in the third set of wireless communication nodes to determine if the critical node has also been identified as an impacted node for any other critical node. For instance, the back-end computing platform may compare each respective critical node against the other critical nodes' corresponding sets of one or more impacted nodes to determine whether or not the respective critical node also comprises an impacted node of another critical node, which in turn dictates whether the respective critical node is considered to be a parent node that defines a given spur or a child node of some other spur. For instance, if the respective critical node is not an impacted node of another critical node, the back-end computing platform may identify the respective critical node as a parent node of a given spur, and may identify the respective critical node's corresponding set of one or more impacted nodes to be child nodes for the given spur. On the other hand, if the respective critical node is an impacted node of another critical node, the back-end computing platform may identify the critical node as a child node of a spur that is defined by some other critical node.

At block 606, based on the evaluation at block 605, the back-end computing platform may determine the spurs within the given segment of the mesh-based communication system and store data that identifies the spurs, which may include, for each respective spur, (i) an identification of the parent node of the spur and (ii) an identification of each child node of the spur, among other possible data.

At block 607, the back-end computing platform may decide which of the spurs determined at block 606 are to be presented to the user. This function may take various forms.

As one possible implementation, the back-end computing platform may decide that all of the spurs determined at block 606 are to be presented to the user. As another possible implementation, the back-end computing platform may decide that only a select subset of the spurs determined at block 606 are to be presented to the user. In this respect, the criteria utilized by the back-end computing platform when selecting the subset of the spurs determined at block 606 that are to be presented to the user may take various forms.

According to one possibility, the criteria utilized by the back-end computing platform when selecting the subset of the spurs determined at block 606 that are to be presented to the user may comprise user input indicating a minimum size of the spurs that are to be presented to the user. The user input indicating the minimum spur size may have been provided by the user (e.g., the network operator), via one or more user input options provided by the spur-finder software tool. For instance, the spur-finder software tool may enable the user to input a minimum spur size (e.g., spurs having a threshold number of nodes), which may then be utilized by the back-end computing platform to decide which of the spurs determined at block 606 are to be presented to the user. In this respect, the spur-finder software tool may enable the user to input the minimum spur size in various ways, such as by selecting a size option from a list of options (e.g., drop-down list, checkbox list, radio button list, etc.) or by inputting a numerical value in a text field, among other possibilities. The back-end computing platform may select spurs having a threshold number of nodes based on the minimum spur size provided by the user. For instance, if the minimum spur size provided by the user indicated a threshold size of "3," the back-end computing platform may select any spur comprising at least three nodes (including a parent node). In this respect, the back-end computing platform may identify the spurs having the user-defined minimum spur size based on evaluating the spur information that is stored as part of block 606, which indicates each spur's parent and child nodes.

At block 608, the back-end computing platform may cause the end-user device associated with the user to display one or more spurs in accordance with the decision made at block 607. The display of a spur may comprise a visual representation of the spur, including respective indications of the spur's parent node and each corresponding child node, as well as respective indications of the connections (e.g., wireless links) between the nodes in the spur. In some implementations, the different types of nodes in a spur may be depicted by different colors/symbols. For instance, parent nodes may be depicted by a first color and/or symbol and child nodes may be depicted by a second color and/or symbol (or in some implementations, child nodes could be further broken down into child nodes that were themselves also identified as critical nodes, which may be depicted by a second color and/or symbol, and child nodes that were not identified as critical nodes, which may be depicted by a third color and/or symbol). Further, the respective indications may be selectable such that the user may provide an input selecting a given node to display information about the given node, based on which the user may take one or more other actions, including any of the actions discussed above with respect to the selective-actioning and alerting tools disclosed herein.

Turning now to FIG. 7A-7E, some example GUI views that may be displayed in connection with performing a spur evaluation as described above are shown. In line with the discussion above, the disclosed technology for the spur-finder tool may enable a user to access a user interface for performing various tasks related to managing and/or monitoring a mesh-based communication system, including but not limited to inputting requests to view spurs within a given segment of a mesh-based communication system, viewing spurs within the given segment of the mesh-based communication system, and interacting with the user interface to perform actions related to spurs displayed via the interface. In one implementation, the user interface for interacting with spurs may take comprise a map-like view, similar to the map views 403 and 503 discussed above.

Figure 7A:
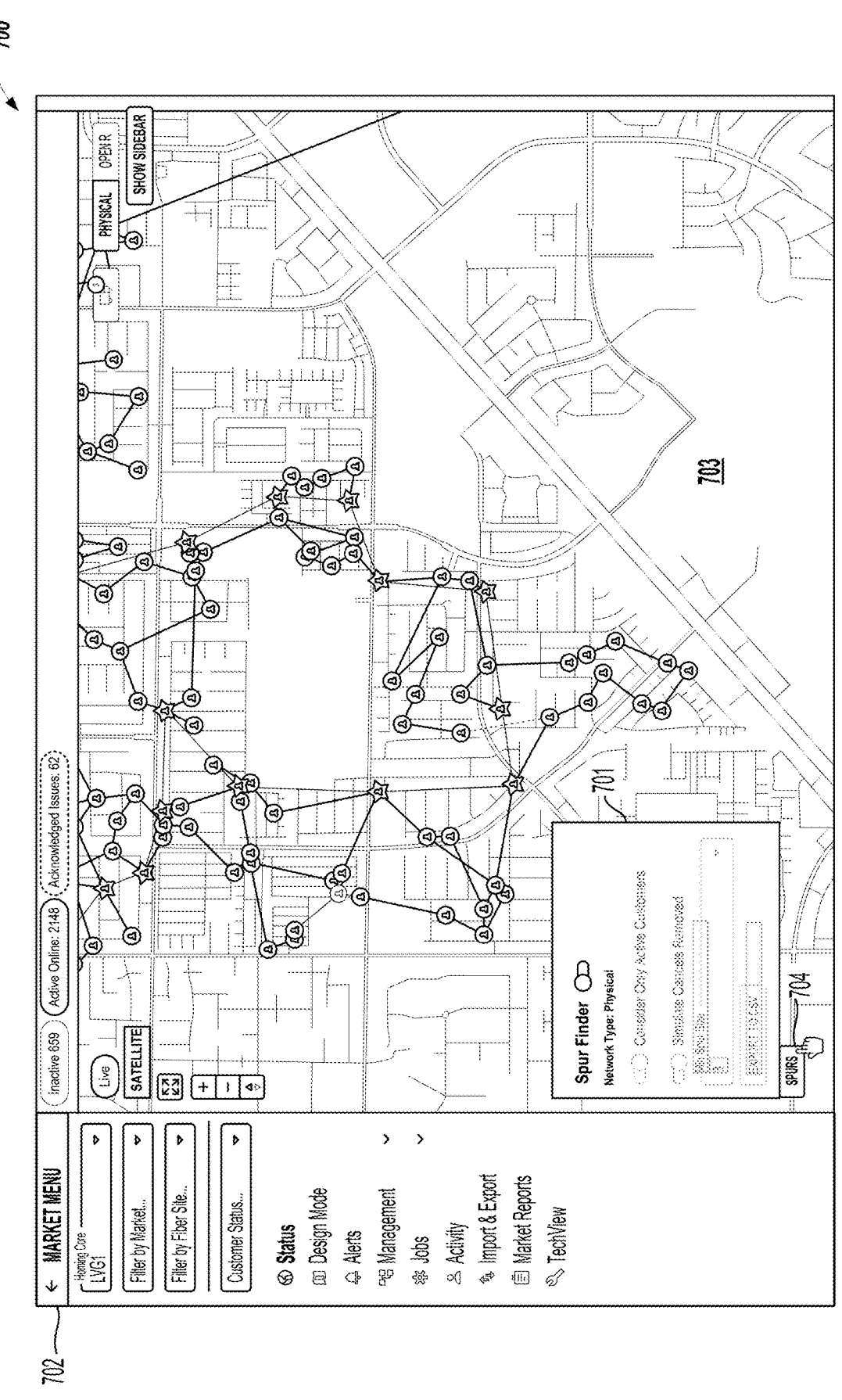
FIGS. 7A through 7E depict example GUI views that may be displayed at an end-user device to facilitate user interaction with a third software tool for managing and monitoring aspects of a mesh-based communication system in accordance with aspects of the disclosed technology.

With reference first to FIG. 7A, an example view 700 is shown. The view 700 may be displayed at an end-user device to a user for facilitating interaction with the spur-finder tool. As shown in FIG. 7A, the view 700 may include a pane 701 that enables the user to select a GUI component to activate the spur-finder tool and provide criteria based on which the back-end computing platform is to perform the spur evaluation. The pane 701 may be displayed in response to selection of a GUI component representing the spur-finder tool functionality, such as the selectable button 704, that cause the pane 701 to be displayed. Further, the view 700 may include a map-like view 703 that depicts nodes in a particular segment of a mesh-based communication system. In line with the discussion above, the particular segment of the mesh-based communication system that is displayed in the map view 703 may be determined based on user input indicating a location covered by the mesh-based communication system or a network area within the mesh-based communication system, such as user input provided via one or more fields of a pane 702, which may resemble the pane 402 described above, and/or user input provided via one or more navigational controls, among other possibilities.

As shown in FIG. 7A, the pane 701 may enable the user to activate and deactivate the spur-finder tool, such as by selecting a GUI component to toggle the spur-finder tool on or off. In the view 700, the spur-finder tool is turned off, and other user input fields in the pane 701 are unavailable for selection. Although not shown in FIG. 7A, the pane 701 may additionally include a menu that enables the user to select or otherwise input a frequency at which a spur-finder analysis is to be run. For example, the user may indicate that the spur analysis is to be run periodically in the background according to a defined schedule (e.g., once per day, once per week, etc.). As another example, the user may indicate that the analysis is to be run in response to a specific user request. The pane 701 may display other options as well.

Figure 7B:
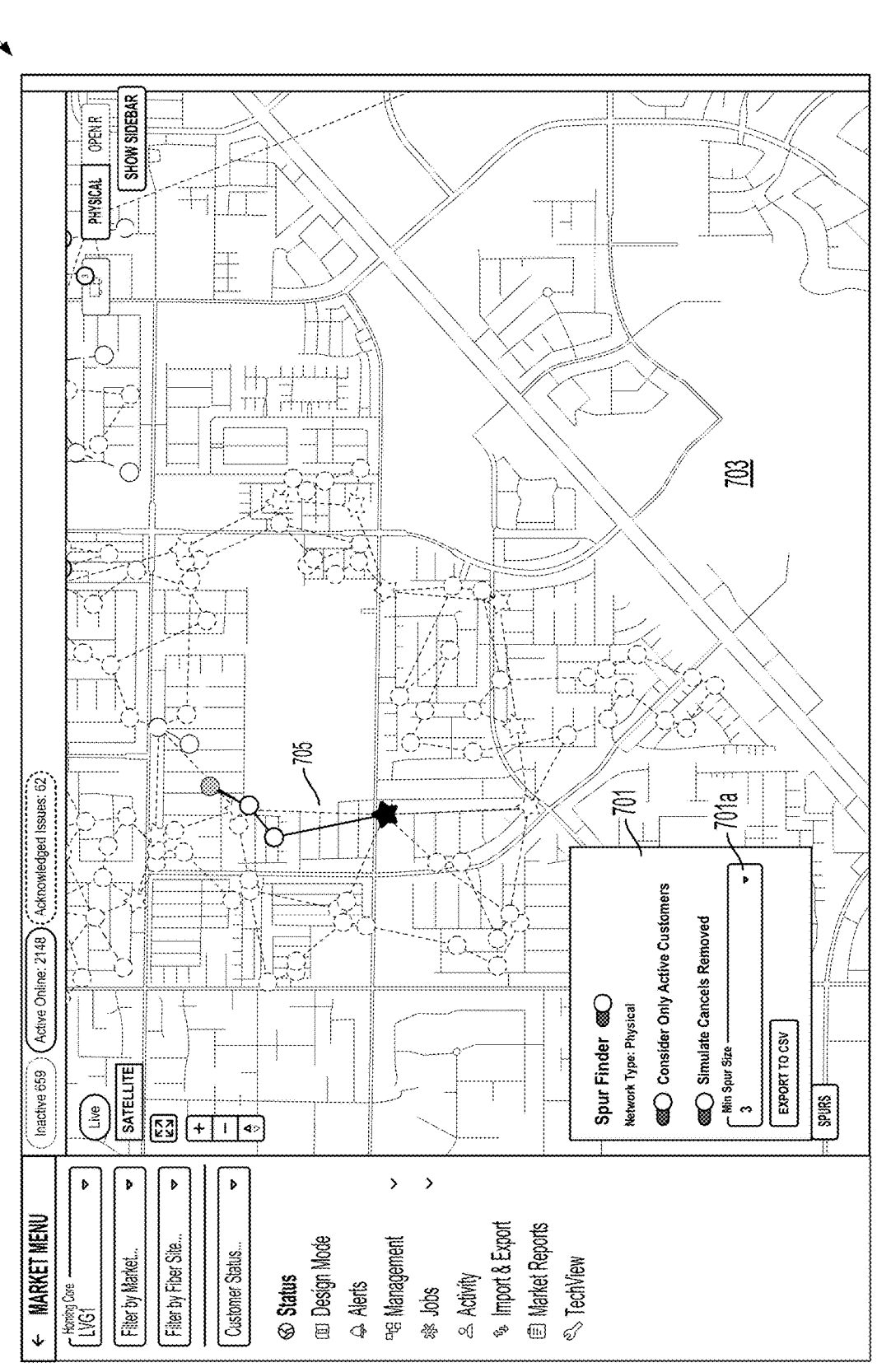

FIG. 7B depicts an example view 710 after the user has turned on the spur-finder tool and provided initial criteria based on which the back-end computing platform is to identify nodes for the spur evaluation. As shown in FIG. 7B, the GUI component to toggle the spur-finder tool on or off is selected, and the user input options in the pane 701 are available for selection. As shown in FIG. 7B, the user input options may enable the user to select certain criteria that should be considered when performing the spur evaluation. For instance, in FIG. 7B, the user has selected an option indicating that the back-end computing platform is to evaluate only nodes associated with active customers for the spur evaluation. Further, the user has selected an option indicating that the back-end computing platform is to simulate removal of nodes associated with soon-to-be inactive customers—that is, the back-end computing platform is to treat those nodes as if they were removed from the mesh-based communication system. In some implementations, one or both of these options may be selected by default. In line with the discussion above, these user inputs may form part of the initial criteria that is used by the back-end computing platform to run the spur evaluation. Further yet, the user may interact with a field 701a to provide user input (e.g., a selection input, a text input, etc.) indicating a threshold spur size for the spurs that are displayed in the map view 703. As shown in FIG. 7B the user may have provided user input defining a minimum spur size of "3," indicating that the user wishes to view spurs having at least three nodes.

Based on the various user inputs provided by the user (e.g., the particular area, the types of nodes, the minimum spur size), the back-end computing platform may perform the spur-finder analysis in line with the discussion above with respect to FIG. 6 to identify spurs within the particular segment and cause the identified spurs to be displayed to the user in a map view 703. For instance, as shown in FIG. 7B, the map view 703 has been updated to indicate an identified spur 705 within the particular segment displayed in the map view 703. The spur 705 may comprise four nodes including one parent node and three child nodes. Further, in line with the discussion above, the nodes of the spur 705 may be depicted based on their node type. For instance, in the example of FIG. 7B, the parent node of the spur 705 are depicted by a solid star, two child nodes that are also critical nodes are depicted by bolded white circles, and one child node that is not also a critical node is depicted by a gray circle. Each node in the spur 705 may be selectable to view information about the node and/or take one or more actions with respect to the selected node.

Although not shown, the map view 703 may also include an updated legend that provides an explanation of various colors and/or symbols depicted in the map view 703. For example, the legend may explain depictions of the different types of nodes within a spur, or depictions of nodes for which service has been canceled. Other examples are also possible.

Figure 7C:

In some implementations, the GUI component 704 may be selected to hide and show the pane 701. For instance, the user may wish to zoom in on a given portion of the map view 703 and may wish to hide the pane 701 in order to obtain a less obstructed view of the map view 703. FIG. 7C depicts an example view 720 that may be displayed after the user has selected the GUI component 704 to hide the pane 701 and zoomed in on a portion of the map view 703 comprising the spur 705. As shown, the map view 703 may be dynamically updated based on navigational control inputs provided by the user (e.g., zoom in, zoom out, click-and-drag, etc.).

Figure 7D:
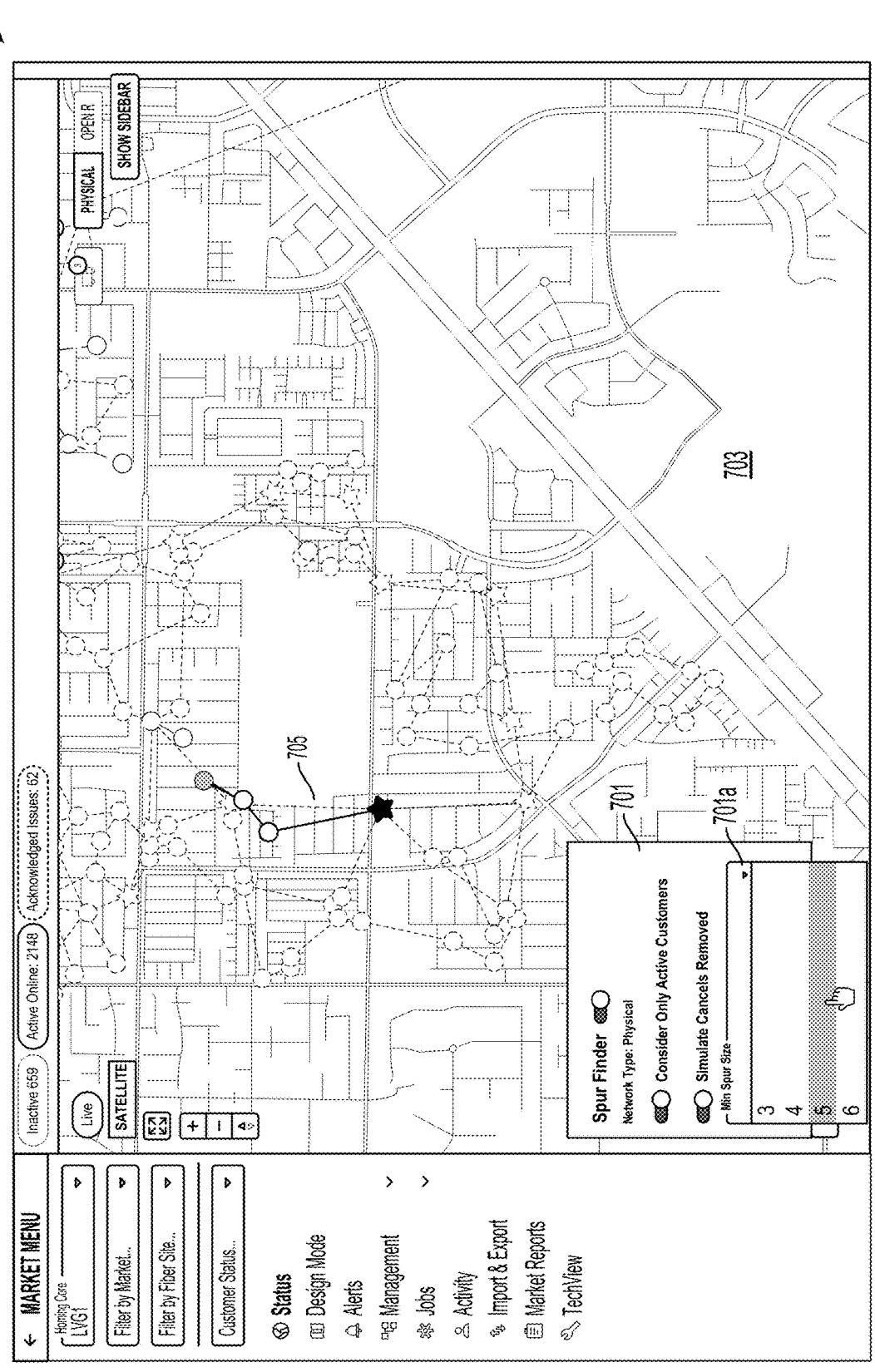

The user may continue to interact with the pane 701 to update the map view 703 and the spurs displayed therein. For example, the user may wish to view spurs having a different minimum spur size. For instance, as shown in FIG. 7D, the user may interact with the pane 701 to select a field 701a in order to input a different minimum spur size based on which spurs are to be displayed in the map view 703. In line with the discussion above, the input may be provided in any of various ways, such as by selecting a drop-down menu option, selecting a checkbox or radio button option, or providing a text input, etc. In the example view 730 shown in FIG. 7D, the field 701a may be selected to display a drop-down menu with a listing of other numerical options based on which the user may select a different minimum spur size, such as "5." Based on the updated minimum spur size, the back-end computing platform (e.g., the spur-finder tool) may determine if any spurs identified during the spur evaluation comprise at least five nodes (in line with the discussion above with reference to FIG. 6) and then cause the map view 703 to be updated to display one or more such spurs.

Figure 7E:

FIG. 7E depicts an example view 740 that may be displayed after the back-end computing platform has identified spurs that meet a minimum spur size criteria of five nodes as indicated by the user in FIG. 7D. The view 740 includes an updated map view 703 that depicts a spur 706 having five nodes, including one parent node (depicted by a solid star), three critical child nodes that are also critical nodes (each depicted by a bolded white circle), and one child node that is not also a critical node (depicted by a gray circle). In line with the discussion above, the visual representation of each node in the spur 706 may be selected to display information about the node and/or additional actions that may be taken with the respect to the selected node. Other examples are also possible.

In some implementations, the spur-finder tool may be activated while running a different software tool, such as the selective-actioning tool or the network alerts tool described above, and may enable selection of a given node for which a spur evaluation is to be run in order to determine whether or not the given node is part of a spur, and if so, whether the spur is a parent not or a child node of the spur.

Advantageously, in the ways described above, the spur-finder tool may enable identification of wireless communication nodes representing single points of failure for one or more other wireless communication nodes that may lead to an undesirable adverse impact on connectivity of the one or more other nodes in the event of an operational, which may then help guide decision-making regarding node deployment and/or updates to the arrangement of the mesh-based communication system.

IV. Example Computing Platform

Figure 8:
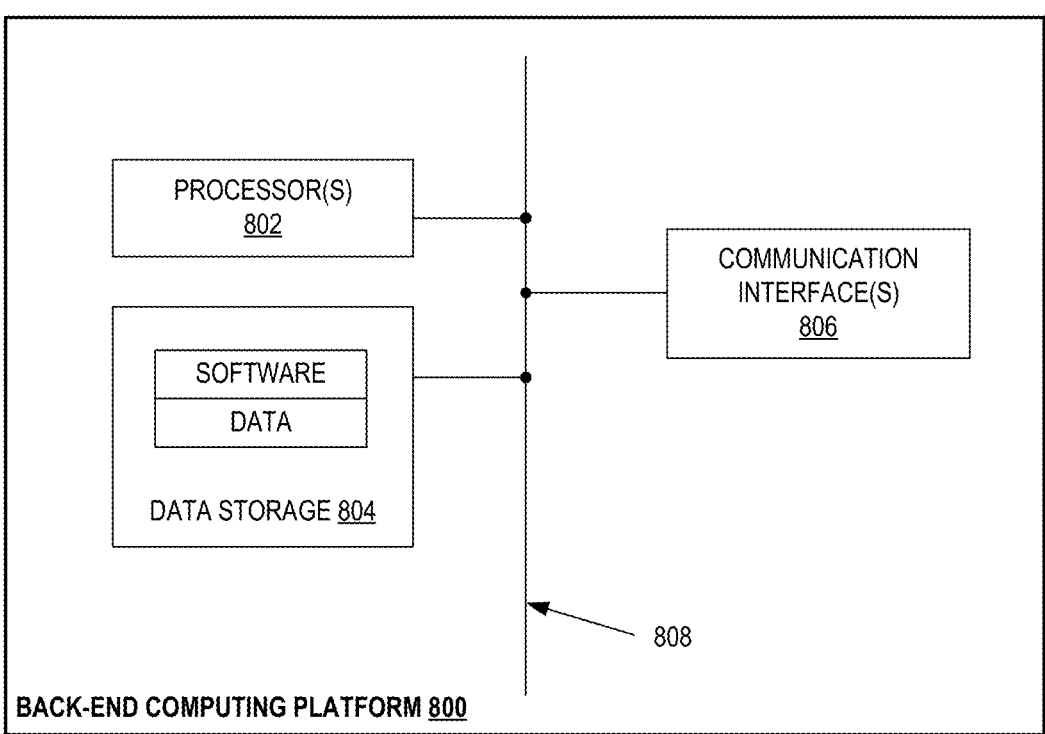
FIG. 8 depicts a structural diagram of an example back-end computing platform that may be configured to carry out one or more functions according to the disclosed software technology.

Turning now to FIG. 8, a simplified block diagram is provided to illustrate some structural components that may be included in an example back-end computing platform 800 that may be configured to carry out any of the various functions disclosed herein, including but not limited to any of the functions described herein, including the functions described above with reference to FIG. 6. At a high level, the example back-end computing platform 800 may generally comprise any one or more computing systems that collectively include one or more processors 802, data storage 804, and one or more communication interfaces 806, all of which may be communicatively linked by a communication link 808 that may take the form of a system bus, a communication network such as a public, private, or hybrid cloud, or some other connection mechanism. Each of these components may take various forms.

The one or more processors 802 may each comprise one or more processing components, such as general-purpose processors (e.g., a single- or a multi-core central processing unit (CPU)), special-purpose processors (e.g., a graphics processing unit (GPU), application-specific integrated circuit, or digital-signal processor), programmable logic devices (e.g., a field programmable gate array), controllers (e.g., microcontrollers), and/or any other processor components now known or later developed. In line with the discussion above, it should also be understood that the one or more processors 802 could comprise processing components that are distributed across a plurality of physical computing systems connected via a network.

In turn, the data storage 804 may comprise one or more non-transitory computer-readable storage mediums that are collectively configured to store (i) program instructions that are executable by one or more processors 802 such that back-end computing platform 800 is configured to perform any of the various functions disclosed herein, and (ii) data that may be received, derived, or otherwise stored, for example, in one or more databases, file systems, repositories, or the like, by back-end computing platform 800, in connection with performing any of the various functions disclosed herein. In this respect, the one or more non-transitory computer-readable storage mediums of the data storage 804 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that the data storage 804 may comprise computer-readable storage mediums that are distributed across a plurality of physical computing systems connected via a network.

Figure 9:
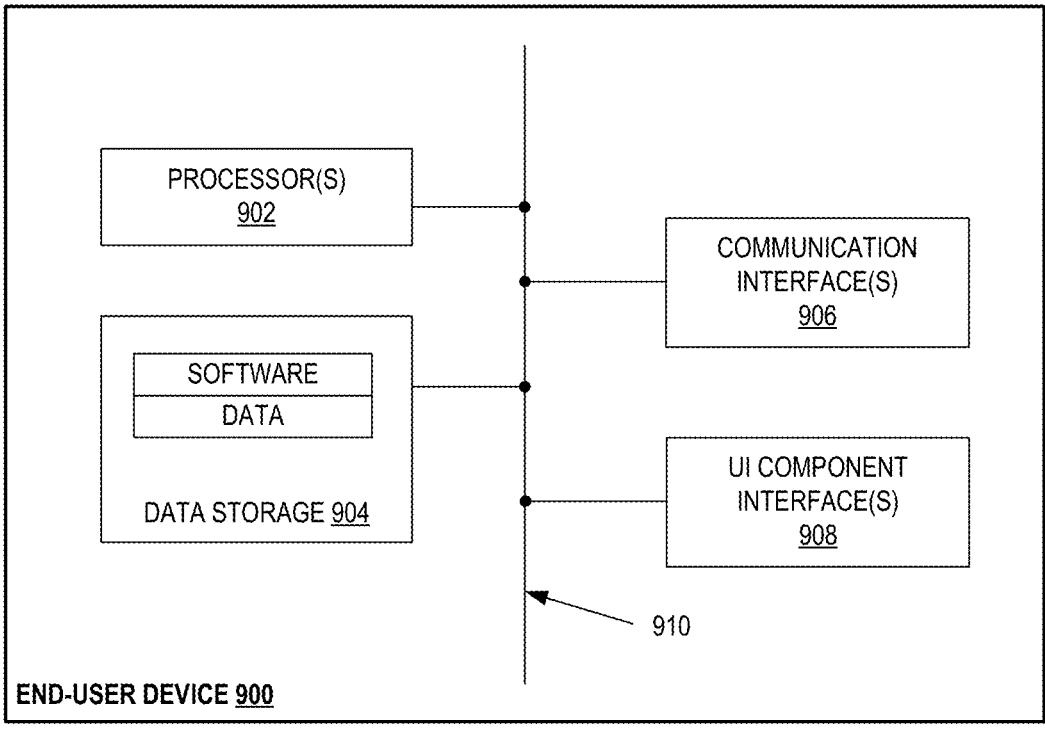
FIG. 9 depicts a structural diagram of an example end-user device that may be configured to communicate with the example computing platform of FIG. 8 and also carry out one or more functions in accordance with aspects of the disclosed technology.

The one or more communication interfaces 806 may be configured to facilitate wireless and/or wired communication with other systems and/or devices, such as end-user devices (e.g., one or more end-user devices 900 of FIG. 9). Additionally, in an implementation where the back-end computing platform 800 comprises a plurality of physical computing systems connected via a network, the one or more communication interfaces 806 may be configured to facilitate wireless and/or wired communication between these physical computing systems (e.g., between computing and storage clusters in a cloud network). As such, the one or more communication interfaces 806 may each take any suitable form for carrying out these functions, examples of which may include an Ethernet interface, a serial bus interface (e.g., Firewire, USB 3.0, etc.), a chipset and antenna adapted to facilitate wireless communication, and/or any other interface that provides for any of various types of wireless communication (e.g., Wi-Fi communication, cellular communication, short-range wireless protocols, etc.) and/or wired communication. Other configurations are possible as well.

Although not shown, the back-end computing platform 800 may additionally include or have an interface for connecting to one or more user-interface components that facilitate user interaction with the back-end computing platform 800, such as a keyboard, a mouse, a trackpad, a display screen, a touch-sensitive interface, a stylus, a virtual-reality headset, and/or one or more speaker components, among other possibilities.

It should be understood that the back-end computing platform 800 is one example of a computing platform that may be used with the embodiments described herein. Numerous other arrangements are possible and contemplated herein. For instance, in other embodiments, the back-end computing platform 800 may include additional components not pictured and/or more or fewer of the pictured components.

V. Example End-User Device

Turning next to FIG. 9, a simplified block diagram is provided to illustrate some structural components that may be included in an example end-user device 900 that is configured to communicate with the back-end computing platform 900, such as an end-user device used by a network operation who is responsible for managing and/or monitoring a mesh-based communication system as described above. As shown in FIG. 9, the end-user device 900 may include one or more processors 902, data storage 904, one or more communication interfaces 906, and one or more user-interface components 908, all of which may be communicatively linked by a communication link 810 that may take the form of a system bus or some other connection mechanism. Each of these components may take various forms.

The one or more processors 902 may comprise one or more processing components, such as general-purpose processors (e.g., a single- or a multi-core CPU), special-purpose processors (e.g., a GPU, application-specific integrated circuit, or digital-signal processor), programmable logic devices (e.g., a field programmable gate array), controllers (e.g., microcontrollers), and/or any other processor components now known or later developed.

In turn, the data storage 904 may comprise one or more non-transitory computer-readable storage mediums that are collectively configured to store (i) program instructions that are executable by the processor(s) 902 such that the end-user device 900 is configured to perform certain functions related to interacting with and accessing services provided by a computing platform, and (ii) data that may be received, derived, or otherwise stored, for example, in one or more databases, file systems, repositories, or the like, by the end-user device 900, related to interacting with and access- ing services provided by a computing platform. In this respect, the one or more non-transitory computer-readable storage mediums of the data storage 904 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. The data storage 904 may take other forms and/or store data in other manners as well.

The one or more communication interfaces 906 may be configured to facilitate wireless and/or wired communica- tion with other computing devices. The communication interface(s) 906 may take any of various forms, examples of which may include an Ethernet interface, a serial bus inter- face (e.g., Firewire, USB 3.0, etc.), a chipset and antenna adapted to facilitate wireless communication, and/or any other interface that provides for any of various types of wireless communication (e.g., Wi-Fi communication, cellu- lar communication, short-range wireless protocols, etc.) and/or wired communication. Other configurations are pos- sible as well.

The end-user device 900 may additionally include or have interfaces for one or more user-interface components 908 that facilitate user interaction with the end-user device 900, such as a keyboard, a mouse, a trackpad, a display screen, a touch-sensitive interface, a stylus, a virtual-reality headset, and/or one or more speaker components, among other pos- sibilities.

It should be understood that the end-user device 900 is one example of an end-user device that may be used to interact with an example computing platform as described herein. Numerous other arrangements are possible and con- templated herein. For instance, in other embodiments, the end-user device 900 may include additional components not pictured and/or more or fewer of the pictured components.

CONCLUSION

Example embodiments of the disclosed innovations have been described above. At noted above, it should be under- stood that the figures are provided for the purpose of illustration and description only and that various compo- nents (e.g., modules) illustrated in the figures above can be added, removed, and/or rearranged into different configura- tions, or utilized as a basis for modifying and/or designing other configurations for carrying out the example operations disclosed herein. In this respect, those skilled in the art will understand that changes and modifications may be made to the embodiments described above without departing from the true scope and spirit of the present invention, which will be defined by the claims.

Further, to the extent that examples described herein involve operations performed or initiated by actors, such as humans, operators, users or other entities, this is for pur- poses of example and explanation only. Claims should not be construed as requiring action by such actors unless explicitly recited in claim language.

The invention claimed is:
1. A computing platform comprising:
at least one processor;
non-transitory computer-readable medium; and program instructions stored on the non-transitory com- puter-readable medium that are executable by the at least one processor such that the computing platform is configured to:
receive, from an end-user device associated with a user, a request to view spurs within a given segment of a mesh-based wireless communication system, wherein the given segment of the mesh-based wire- less communication system comprises a given set of wireless communication nodes;
after receiving the request to view spurs within the given segment of the mesh-based wireless commu- nication system, identify one or more spurs within the given segment of the mesh-based wireless com- munication system by:
(i) identifying a first subset of wireless communica- tion nodes within the given segment of the mesh- based communication system comprising source wireless communication nodes within the given segment of the mesh-based communication sys- tem;
(ii) identifying a second subset of wireless commu- nication nodes comprising any wireless commu- nication node that is connected to at least one source wireless communication node of the first subset of wireless communication nodes;
(iii) iteratively simulating an operational disruption of each identified node in the first and second subsets of wireless communication nodes and thereby determining a third subset of wireless communication nodes comprising critical nodes;
(iv) for each respective critical node in the third subset of wireless communication nodes, evaluat- ing the respective critical node and thereby deter- mining if the respective critical node is an impacted node for any other critical node in the third subset of wireless communication nodes;
(v) based on the evaluation, identifying a fourth subset of wireless communication nodes compris- ing any wireless communication node that (i) serves as a critical node for at least one other impacted node but (ii) is not an impacted node for any other critical node; and
(vi) identifying a respective spur corresponding to each wireless communication node in the fourth subset of wireless communication nodes; and
cause the end-user device to display an interface com- prising a respective visual representation of each identified spur.
2. The computing platform of claim 1, wherein each identified spur comprises a parent node and at least one child node.
3. The computing platform of claim 1, wherein the respective visual representation of each identified spur includes indications of (i) a parent node of the spur, and (ii) one or more child nodes of the spur.
4. The computing platform of claim 1, wherein the request to view the spurs within the given segment of the mesh- based wireless communication system comprises a request to filter the given set of wireless communication nodes to include only wireless communication nodes that are asso- ciated with active customers of a service provided by the mesh-based wireless communication system.
5. The computing platform of claim 1, wherein the request to view the spurs within the given segment of the mesh- based wireless communication system comprises a request to filter out, from the given set of wireless communication nodes, any wireless communication nodes for which a service provided by the mesh-based wireless communication system has been canceled.

6. The computing platform of claim 1, wherein the request to view the spurs within the given segment of the mesh-based wireless communication system comprises a request to view spurs having a given minimum size.

7. The computing platform of claim 1, wherein the interface comprises an interactive network map of the given segment of the mesh-based wireless communication system, and wherein the program instructions that are executable by the at least one processor such that the computing platform is configured to cause the end-user device to display the respective visual representation of each identified spur comprise program instructions that are executable by the at least one processor such that the computing platform is configured to:

cause the end-user device to update the interactive network map to show the respective visual representation of each identified spur.

8. The computing platform of claim 1, further comprising program instructions stored on the non-transitory computer-readable medium that are executable by the at least one processor such that the computing platform is configured to:

receive, from the end-user device, an indication of a selection of a given node within a spur;

obtain a set of information for the given node; and cause the end-user device to update the interface to include the set of information for the given node.

9. The computing platform of claim 1, wherein the source nodes comprise one or more of (i) first-tier nodes that have high-capacity access to a core network of the mesh-based wireless communication system or (ii) second-tier nodes that extend the high-capacity access to the core network from the first-tier nodes to other nodes of the mesh-based wireless communication system.

10. The computing platform of claim 1, wherein the source nodes comprise (i) first-tier nodes that have high-capacity access to a core network of the mesh-based wireless communication system and (ii) second-tier nodes that extend the high-capacity access to the core network from the first-tier nodes to other nodes of the mesh-based wireless communication system.

11. A non-transitory computer-readable medium, wherein the non-transitory computer-readable medium is provisioned with program instructions that, when executed by at least one processor, cause a computing platform to:

receive, from an end-user device associated with a user, a request to view spurs within a given segment of a mesh-based wireless communication system, wherein the given segment of the mesh-based wireless communication system comprises a given set of wireless communication nodes;

after receiving the request to view spurs within the given segment of the mesh-based wireless communication system, identify one or more spurs within the given segment of the mesh-based wireless communication system by:

(i) identifying a first subset of wireless communication nodes within the given segment of the mesh-based communication system comprising source wireless communication nodes within the given segment of the mesh-based communication system;

(ii) identifying a second subset of wireless communication nodes comprising any wireless communication node that is connected to at least one source wireless communication node of the first subset of wireless communication nodes;

(iii) iteratively simulating an operational disruption of each identified node in the first and second subsets of wireless communication nodes and thereby determining a third subset of wireless communication nodes comprising critical nodes;

(iv) for each respective critical node in the third subset of wireless communication nodes, evaluating the respective critical node and thereby determining if the respective critical node is an impacted node for any other critical node in the third subset of wireless communication nodes;

(v) based on the evaluation, identifying a fourth subset of wireless communication nodes comprising any wireless communication node that (i) serves as a critical node for at least one other impacted node but (ii) is not an impacted node for any other critical node; and (vi) identifying a respective spur corresponding to each wireless communication node in the fourth subset of wireless communication nodes; and cause the end-user device to display an interface comprising a respective visual representation of each identified spur.

12. The non-transitory computer-readable medium of claim 11, wherein each identified spur comprises a parent node and at least one child node.

13. The non-transitory computer-readable medium of claim 11, wherein the respective visual representation of each identified spur includes indications of (i) a parent node of the spur, and (ii) one or more child nodes of the spur.

14. The non-transitory computer-readable medium of claim 11, wherein the request to view the spurs within the given segment of the mesh-based wireless communication system comprises a request to filter the given set of wireless communication nodes to include only wireless communication nodes that are associated with active customers of a service provided by the mesh-based wireless communication system.

15. The non-transitory computer-readable medium of claim 11, wherein the request to view the spurs within the given segment of the mesh-based wireless communication system comprises a request to filter out, from the given set of wireless communication nodes, any wireless communication nodes for which a service provided by the mesh-based wireless communication system has been canceled.

16. The non-transitory computer-readable medium of claim 11, wherein the request to view the spurs within the given segment of the mesh-based wireless communication system comprises a request to view spurs having a given minimum size.

17. The non-transitory computer-readable medium of claim 11, wherein the interface comprises an interactive network map of the given segment of the mesh-based communication system, and wherein the program instructions that, when executed by at least one processor, cause the computing platform to cause the end-user device to display the respective visual representation of each identified spur comprise program instructions that, when executed by at least one processor, cause the computing platform to:

cause the end-user device to update the interactive network map to show the respective visual representation of each identified spur.

18. The non-transitory computer-readable medium of claim 11, wherein the non-transitory computer-readable medium is also provisioned with program instructions that, when executed by at least one processor, cause the computing platform to:

receive, from the end-user device, an indication of a selection of a given node within a spur;

obtain a set of information for the given node; and cause the end-user device to update the interface to include the set of information for the given node.

19. A method carried out by a computing platform, the method comprising:

receiving, from an end-user device associated with a user, a request to view spurs within a given segment of a mesh-based wireless communication system, wherein the given segment of the mesh-based wireless communication system comprises a given set of wireless communication nodes;

after receiving the request to view spurs within the given segment of the mesh-based wireless communication system, identifying one or more spurs within the given segment of the mesh-based wireless communication system by:

(i) identifying a first subset of wireless communication nodes within the given segment of the mesh-based communication system comprising source wireless communication nodes within the given segment of the mesh-based communication system;

(ii) identifying a second subset of wireless communication nodes comprising any wireless communication node that is connected to at least one source wireless communication node of the first subset of wireless communication nodes;

(iii) iteratively simulating an operational disruption of each identified node in the first and second subsets of wireless communication nodes and thereby determining a third subset of wireless communication nodes comprising critical nodes;

(iv) for each respective critical node in the third subset of wireless communication nodes, evaluating the respective critical node and thereby determining if the respective critical node is an impacted node for any other critical node in the third subset of wireless communication nodes;

(v) based on the evaluation, identifying a fourth subset of wireless communication nodes comprising any wireless communication node that (i) serves as a critical node for at least one other impacted node but (ii) is not an impacted node for any other critical node; and (vi) identifying a respective spur corresponding to each wireless communication node in the fourth subset of wireless communication nodes; and causing the end-user device to display an interface comprising a respective visual representation of each identified spur.

20. The method of claim 19, wherein each identified spur comprises a parent node and at least one child node.

* * * * *